United States Patent
Ono

(10) Patent No.: US 6,501,769 B2
(45) Date of Patent: *Dec. 31, 2002

(54) PACKAGE HAVING FACILITY FOR PERFORMING MUTUAL CONVERSION AMONG DIFFERENT KINDS OF SIGNALING SIGNALS, TIME-DIVISION MULTIPLEXER EQUIPPED WITH PACKAGE, AND SPEECH HANDLING NETWORK USING TIME-DIVISION MULTIPLEXER

(75) Inventor: Kimihide Ono, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,258

(22) Filed: Sep. 26, 1997

(65) Prior Publication Data

US 2002/0044566 A1 Apr. 18, 2002

(30) Foreign Application Priority Data

Mar. 19, 1997 (JP) .............................................. 9-066724

(51) Int. Cl.⁷ .................................................. H04J 3/16
(52) U.S. Cl. ........................ 370/467; 370/426; 370/522
(58) Field of Search ................................ 370/466, 467, 370/410, 426, 442, 522, 537, 468

(56) References Cited

U.S. PATENT DOCUMENTS

| 5,077,735 A | * 12/1991 | Myung et al. ............... 370/467 |
| 5,239,542 A | * 8/1993 | Breidenstein et al. ....... 370/376 |
| 5,420,916 A | * 5/1995 | Sekiguchi .................... 379/230 |
| 5,546,398 A | * 8/1996 | Tucker et al. ............... 370/389 |
| 5,826,017 A | * 10/1998 | Holzmann ................... 709/230 |

* cited by examiner

Primary Examiner—Hassan Kizou
Assistant Examiner—Saba Tsegaye
(74) Attorney, Agent, or Firm—Katten, Muchin, Zavis, Rosenman

(57) ABSTRACT

A package for performing mutual conversion between a first signaling signal and a second signaling signal, including a first signaling signal converting unit for outputting mutually converted first and second signaling signals and outputting a current state information based on preceding state information and current first and second signaling signals; a second signaling state holding unit for holding the current state information up to the next frame; and a timer unit for detecting that a current state information matching with the predetermined state information appears and outputting a time-out signal after an elapse of a predetermined time. Further, this package is included to realize a time-division multiplexer. By this, in a speech handling network in which exchanges of different kinds of signaling signal systems are mixed, the mixing thereof is easily and simply enabled by an introduction of the package equipped with the signaling signal conversion facility.

13 Claims, 51 Drawing Sheets

Fig. 26

| STATE NUMBER | STATE NAME | POLARITIES OF SIGNALING SIGNALS |
|---|---|---|
| 18 | ABNORMALITY-1 | A, B (F)　*, *→1　SS<br>A, B (B)　0, 0→0　SR<br>A, B (B)　1, 0→1　SR |
| 19 | ABNORMALITY-2 | A, B (F)　*, *→0　SS<br>A, B (B)　1, 0→1　SS<br>A, B (B)　1, 0→*　SR |
| 20 | ABNORMALITY-3 | A, B (F)　*, *→0　SS<br>A, B (B)　1, 0→1　SS<br>A, B (B)　0, 0→0　SR<br>A, B (B)　1, 0→1　SR |
| 21 | ABNORMALITY-4 | A, B (F)　*, *→0　SS<br>A, B (F)　1, 0→1　SS<br>A, B (B)　0, 1→0　SR<br>A, B (B)　1, 0→1　SR |
| 22 | ABNORMALITY-5 | A, B (F)　*, *→1　SS<br>A, B (B)　0, 1→0　SR<br>A, B (B)　1, 0→1　SR |

Fig. 27

| | | | | | |
|---|---|---|---|---|---|
| 23 | ABNORMALITY-6 | A, B (F)<br>A, B (F)<br>A, B (B)<br>A, B (B) | *, 0 SS<br>1, 0 SS<br>0, 0 SR<br>1, 1 SR | A, B (F) 1, 0→1 SS<br>A, B (B) 1, 0→1 SR<br>ONLY IDLE | |
| 24 | ABNORMALITY-7 | A, B (F)<br>A, B (B)<br>A, B (B) | *, 1 SS<br>0, 0 SR<br>1, 1 SR | A, B (F) 1, 0→1 SS<br>A, B (B) 1, 0→1 SR<br>ONLY IDLE | |
| 25 | ABNORMALITY-8 | A, B (F)<br>A, B (F)<br>A, B (B)<br>A, B (B) | *, 0 SS<br>1, 1 SS<br>0, 1 SR<br>1, 0 SR | | |
| 26 | ABNORMALITY-9 | A, B (F)<br>A, B (F)<br>A, B (B)<br>A, B (B) | *, 1 SS<br>0, 0 SS<br>0, 0 SR<br>1, 1 SR | | |

Fig. 38

| FRAME No. | BIT No. 1 | 2 | 3 | 4 | 5 | 6 | 7 | 8 |
|---|---|---|---|---|---|---|---|---|
| FR0 | 0 | 0 | MAS 0 | 0 | x5 | Y | x7 | x8 |
| FR1 | A | SIGNALING CH1 B | C | D | A | SIGNALING CH16 B | C | D |
| FR2 | A | SIGNALING CH2 B | C | D | A | SIGNALING CH17 B | C | D |
| FR3 | A | SIGNALING CH3 B | C | D | A | SIGNALING CH18 B | C | D |
| FR4 | A | SIGNALING CH4 B | C | D | A | SIGNALING CH19 B | C | D |
| FR5 | A | SIGNALING CH5 B | C | D | A | SIGNALING CH20 B | C | D |
| FR6 | A | SIGNALING CH6 B | C | D | A | SIGNALING CH21 B | C | D |
| FR7 | A | SIGNALING CH7 B | C | D | A | SIGNALING CH22 B | C | D |
| FR8 | A | SIGNALING CH8 B | C | D | A | SIGNALING CH23 B | C | D |

Fig. 39

| | | | | | | | |
|---|---|---|---|---|---|---|---|
| FR9 | A | SIGNALING CH9<br>B　　C | D | A | SIGNALING CH24<br>B　　C | D |
| FR10 | A | SIGNALING CH10<br>B　　C | D | A | SIGNALING CH25<br>B　　C | D |
| FR11 | A | SIGNALING CH11<br>B　　C | D | A | SIGNALING CH26<br>B　　C | D |
| FR12 | A | SIGNALING CH12<br>B　　C | D | A | SIGNALING CH27<br>B　　C | D |
| FR13 | A | SIGNALING CH13<br>B　　C | D | A | SIGNALING CH28<br>B　　C | D |
| FR14 | A | SIGNALING CH14<br>B　　C | D | A | SIGNALING CH29<br>B　　C | D |
| FR15 | A | SIGNALING CH15<br>B　　C | D | A | SIGNALING CH30<br>B　　C | D |

Fig. 43

"1" FIXED (UNUSED)

| FR10 | FR11 | FR12 | FR13 | FR14 | FR15 | FR16 | FR17 | FR18 | FR19 |
|------|------|------|------|------|------|------|------|------|------|
|      | CH10 | CH11 | CH12 | CH13 | CH14 | CH15 | CH16 | CH17 | CH18 |
|      | CH28 | CH29 | CH30 | UNUSED | UNUSED | UNUSED | UNUSED | UNUSED | UNUSED |

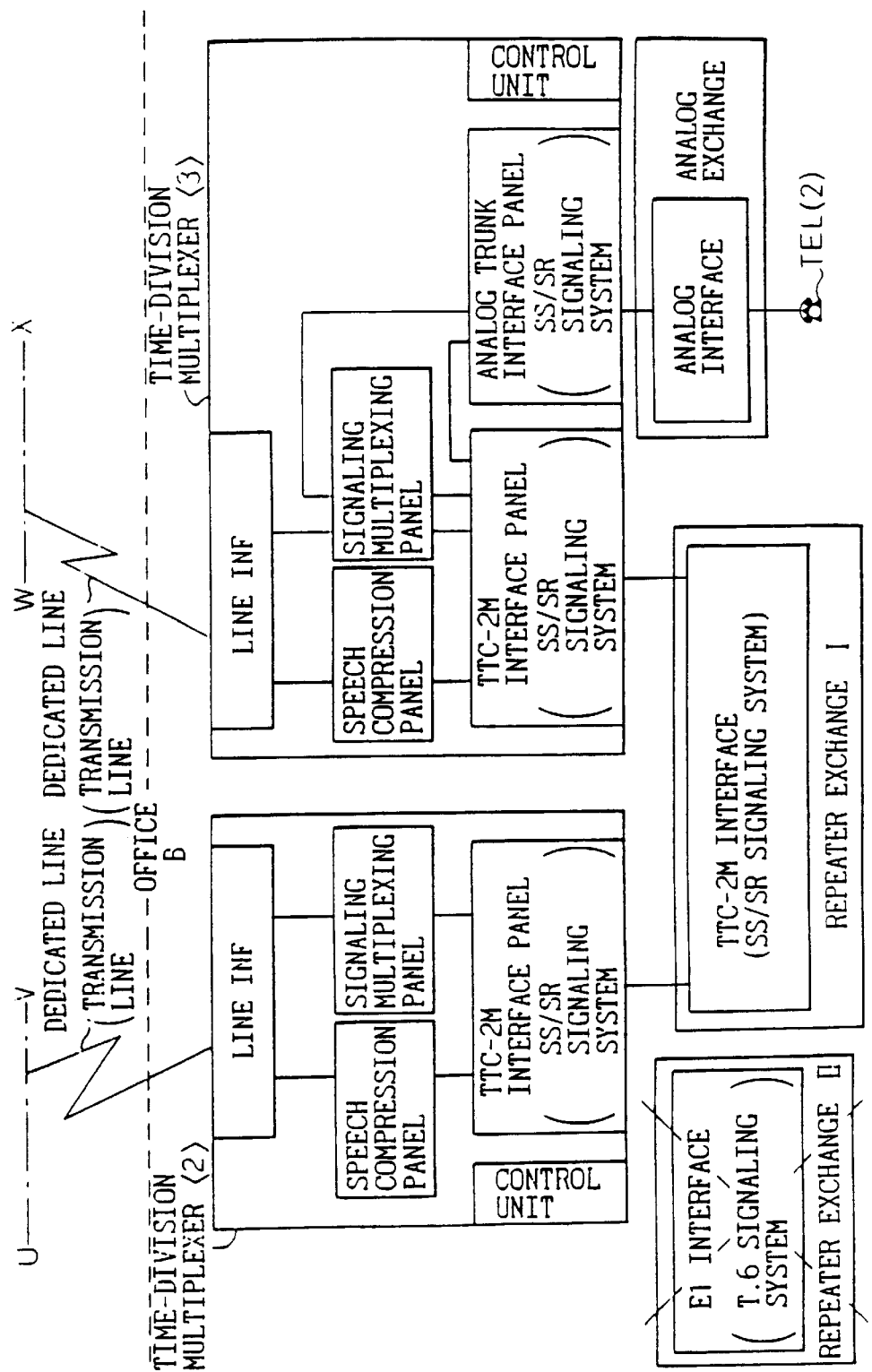

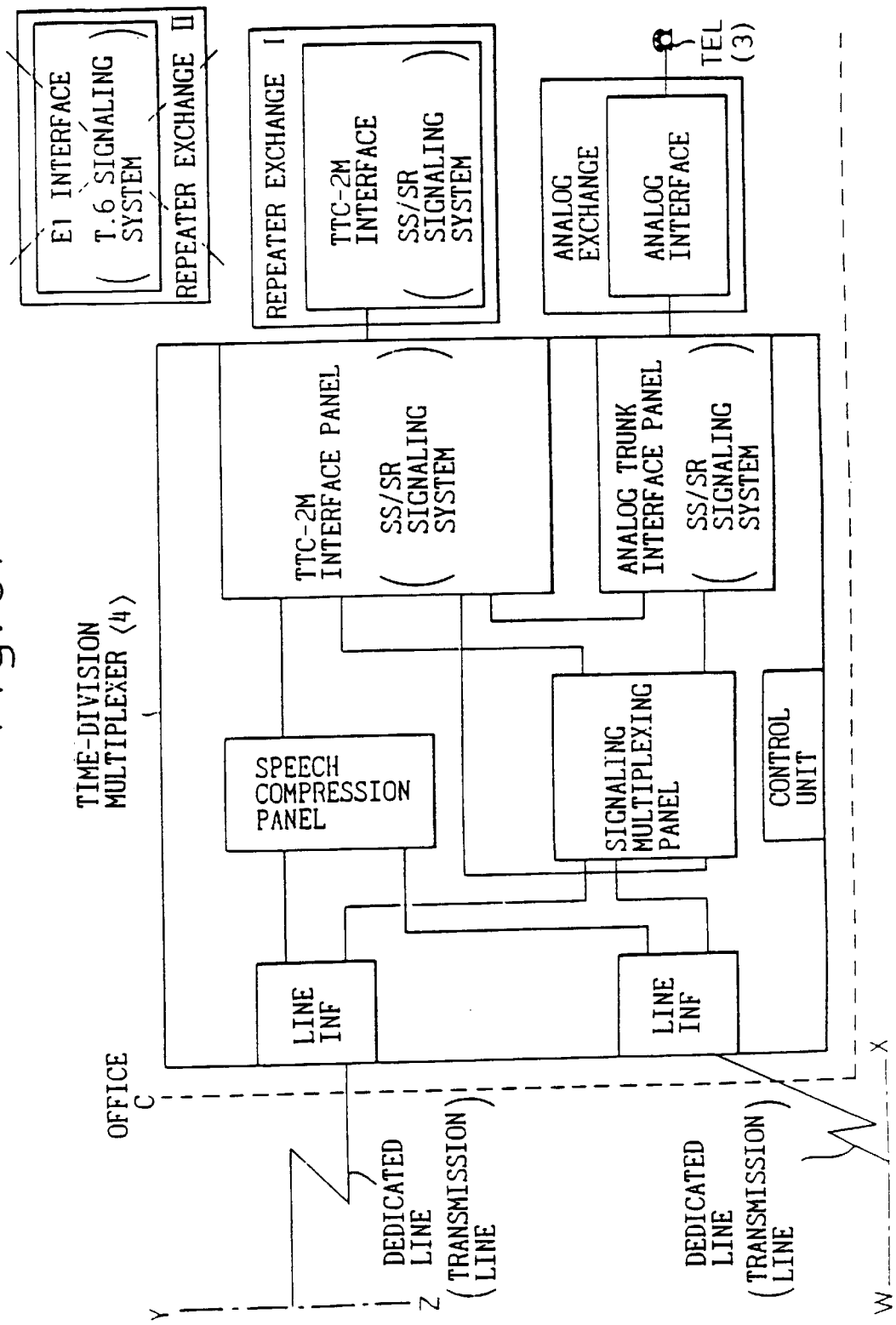

PACKAGE HAVING FACILITY FOR PERFORMING MUTUAL CONVERSION AMONG DIFFERENT KINDS OF SIGNALING SIGNALS, TIME-DIVISION MULTIPLEXER EQUIPPED WITH PACKAGE, AND SPEECH HANDLING NETWORK USING TIME-DIVISION MULTIPLEXER

BACKGROUND OF THE INVENTION

1. Field of the Invention

The present invention relates to a package having a facility for performing mutual conversion among different kinds of signaling signals and further relates to a time-division multiplexer equipped with the package and a speech handling network using the time-division multiplexer.

When a speech handling network is constructed among a large number of subscribers, one exchange and another exchange for respectively accommodating one group of subscribers and another group of subscribers are employed and are connected by dedicated lines. In order to transfer transmission signals onto the dedicated lines with a high efficiency, time-division multiplexers are respectively provided in the exchanges. The transmission signals are transferred on the dedicated lines via these time-division multiplexers.

Each of the transmission signals is composed of the original speech data to be transmitted and signaling signals for controlling the transmission and reception of the speech data between the above exchanges. These speech data and signaling signals are transferred onto the dedicated lines under a time-division multiplex mode.

Looking here at the signaling signals, the signaling signal is generated according to a signaling system determined in advance by the communication standard used etc. As such a signaling system, there are the T.1 signaling system, T.6 signaling system, SS/SR signaling system, etc. The system differs for every country or region in many cases.

Accordingly, where constructing the above speech handling network, if the plurality of the exchanges are located not only in a single country or region, but are also located dispersed in other countries or areas, the signaling signals will be handled under different signaling systems. Therefore the differences of the signaling systems must be absorbed in some way or another.

The present invention relates to the techniques for promoting common use of such different kinds of signaling signals.

2. Description of the Related Art

As will be explained in detail later by using the drawings, assume that a speech handling network based on a signaling system I has been constructed in Japan and that it has become necessary to expand the speech handling network to overseas subscribers. In this case, it is necessary to construct an additional one or more offices abroad too. In constructing additional offices, the signaling system I on which the speech handling network is based and a signaling system II used as the standard of the overseas offices additionally constructed will no longer match, therefore it will not be possible to use the originally used repeater exchanges II of the overseas standard. This is because, the repeater exchange I and the repeater exchanges II have different signaling systems from each other, therefore they cannot communicate with each other as they are.

As a result, in a conventional speech handling network, time-division multiplexers <2>, <3>, and <4>, mentioned later, to be additionally installed overseas are constituted by using an interface panel (TTC-2M interface) currently used in the time-division multiplexer <1>, also mentioned later, actually used in Japan. In keeping with this, in the repeater exchanges, it is necessary to go to the trouble of replacing the repeater exchanges II of the overseas standard by repeater exchanges I of the Japanese standard. This means that the capital investment of new exchanges must be made in the additional installation of an office B and office C mentioned later regardless of the fact that there are already existing exchanges. This causes a problem in that it is uneconomical for the overseas users.

SUMMARY OF THE INVENTION

Accordingly, in consideration with the above problem, an object of the present invention is to enable the easy construction of a speech handling network capable of handling a mixture of different kinds of signaling systems by just adding extremely simple hardware to the time-division multiplexers and to provide a package having a facility for mutual conversion among different kinds of signaling signals, a time-division multiplexer including this package, and a speech handling network built by using the time-division multiplexer.

To attain the above object, the present invention provides a package for performing mutual conversion between a first signaling signal and a second signaling signal. This package comprises a first signaling signal converting means for outputting mutually converted first and second signaling signals and outputting current state information based on preceding state information and current first and second signaling signals; a second signaling state holding means for holding the current state information up to the next frame; and a timer means for detecting an appearance of current state information matching predetermined state information and outputting a time-out signal after an elapse of a predetermined time. Further, a time-division multiplexer is realized by including this package.

BRIEF DESCRIPTION OF THE DRAWINGS

The above object and features of the present invention will be more apparent from the following description of the preferred embodiments with reference to the accompanying drawings, wherein:

FIG. 26 is a first part of a view of a variety of abnormal states envisioned as occurring in the conversion process of the signaling signal;

FIG. 27 is a second part of a view of a variety of abnormal states envisioned as occurring in the conversion process of the signaling signal;

FIG. 38 is a first part of a format diagram of a bit configuration of a time slot TS16 in FIG. 36 for each frame (FR);

FIG. 39 is a second part of a format diagram of the bit configuration of the time slot TS16 in FIG. 36 for each frame (FR);

FIG. 43 is a second part of a format diagram representing the signaling bit in the time slot TS0 in FIG. 40 by correspondence with each channel for each frame;

FIG. 50 is a second part of a view of an example of the configuration of a conventional speech handling network; and FIG. 51 is a is a third part of a view of an example of the configuration of a conventional speech handling network.

DESCRIPTION OF THE PREFERRED EMBODIMENTS

Before describing the embodiments of the present invention, the related art and the disadvantages therein will be described in further detail with reference to the related figures.

Figure 49:
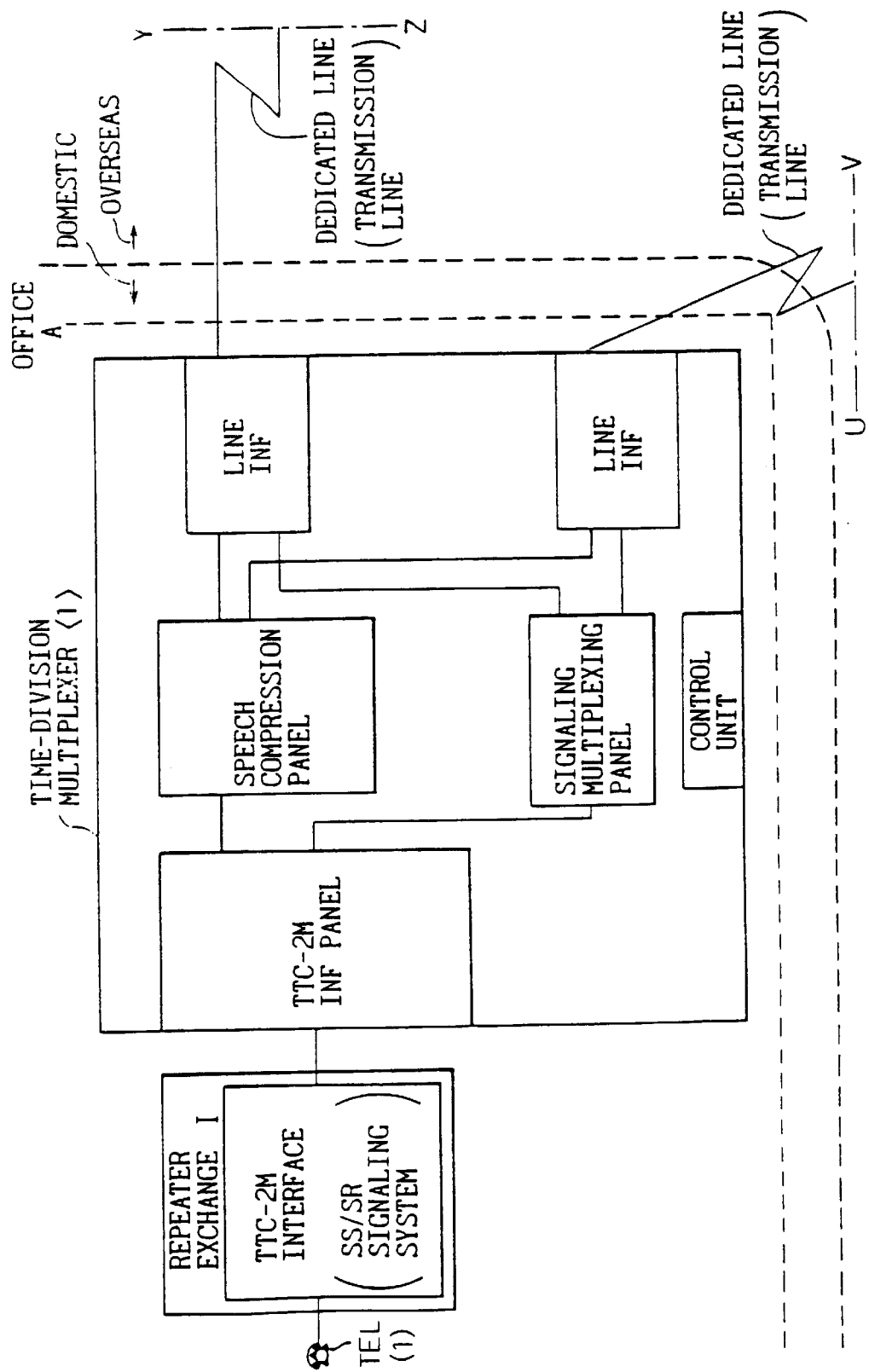
FIG. 49 is a first part of a view of an example of the configuration of a conventional speech handling network.

FIGS. 49 to 51 are parts of a view of an example of the configuration of a conventional speech handling network.

FIG. 49 shows for example a domestic office A; and FIGS. 50 and 51 show overseas offices B and C. The office A and the office B are connected by dedicated lines (transmission lines). The office B and the office C are also connected by dedicated lines (transmission lines), and the office C and the office A are connected by dedicated lines (transmission lines).

The office A is equipped with a repeater exchange I accommodating a subscriber TEL (1) and a time-division multiplexer <1> employed between this repeater exchange I and the dedicated lines.

The office B is equipped with an analog exchange, having an analog interface therein, accommodating a subscriber TEL (2) and repeater exchange I, a time-division multiplexer <2> coupled to a dedicated line for connection with the opposing office A, and a time-division multiplexer <3> coupled to a dedicated line for connection with the opposing office C.

The office C is equipped with the analog exchange accommodating a subscriber TEL (3) and a repeater exchange I and a time-division multiplexer <4> coupled to dedicated lines for connection with the opposing office A and the opposing office B.

In the above conventional speech handling network, it should be particularly noted that, in the overseas office B (FIG. 50), regardless of the existence of the standard repeater exchange II designed for the overseas signaling system II, that exchange II is unused (indicated by x in the figure). Rather, use is made of the repeater exchange I designed for the signaling system I used as the standard of the office A of Japan. It should be similarly noted that, in the overseas office C (FIG. 51), regardless of the existence of the standard repeater exchange II designed for the overseas signaling system II, that exchange II is unused (indicated by x in the figure) and instead use is made of a repeater exchange I designed for the signaling system I used as the standard of the office A of Japan.

Assume, as mentioned above, that a speech handling network based on the signaling system I has been built in Japan, but it becomes necessary to expand the speech handling network to overseas subscribers. In this case, it is necessary to additionally construct one or more offices abroad too. In additionally constructing the offices, the signaling system I on which the speech handling network is based and the signaling system II used as the standard of the overseas offices to be additionally constructed do not match, therefore the originally used repeater exchanges II of the overseas standard cannot be utilized. This is because the repeater exchange I and the repeater exchanges II have different signaling systems from each other, therefore they cannot communicate with each other as they are.

As a result, in a conventional speech handling network shown in FIGS. 49 to 51, the time-division multiplexers <2>, <3>, and <4> to be additionally installed overseas are constituted by using interface panels (TTC-2M interfaces) currently used in the time-division multiplexer <1> used in Japan. In keeping with this, it is necessary to go to the trouble of replacing the repeater exchanges II of the overseas standard by repeater exchanges I of the Japanese standard. This means that the capital investment of new exchanges must be made in the additional installation of the offices B and C regardless of the fact that there are already existing exchanges. This causes the above mentioned problem that it becomes uneconomical for the overseas users.

The present invention solves the above problem by enabling easy construction of a speech handling network including a mixture of different kinds of signaling systems by just adding extremely simple hardware to the time-division multiplexer and providing a package having a facility for mutual conversion among different kinds of signaling signals, a time-division multiplexer including this package, and a speech handling network built by using the time-division multiplexer for this purpose.

Figure 1:
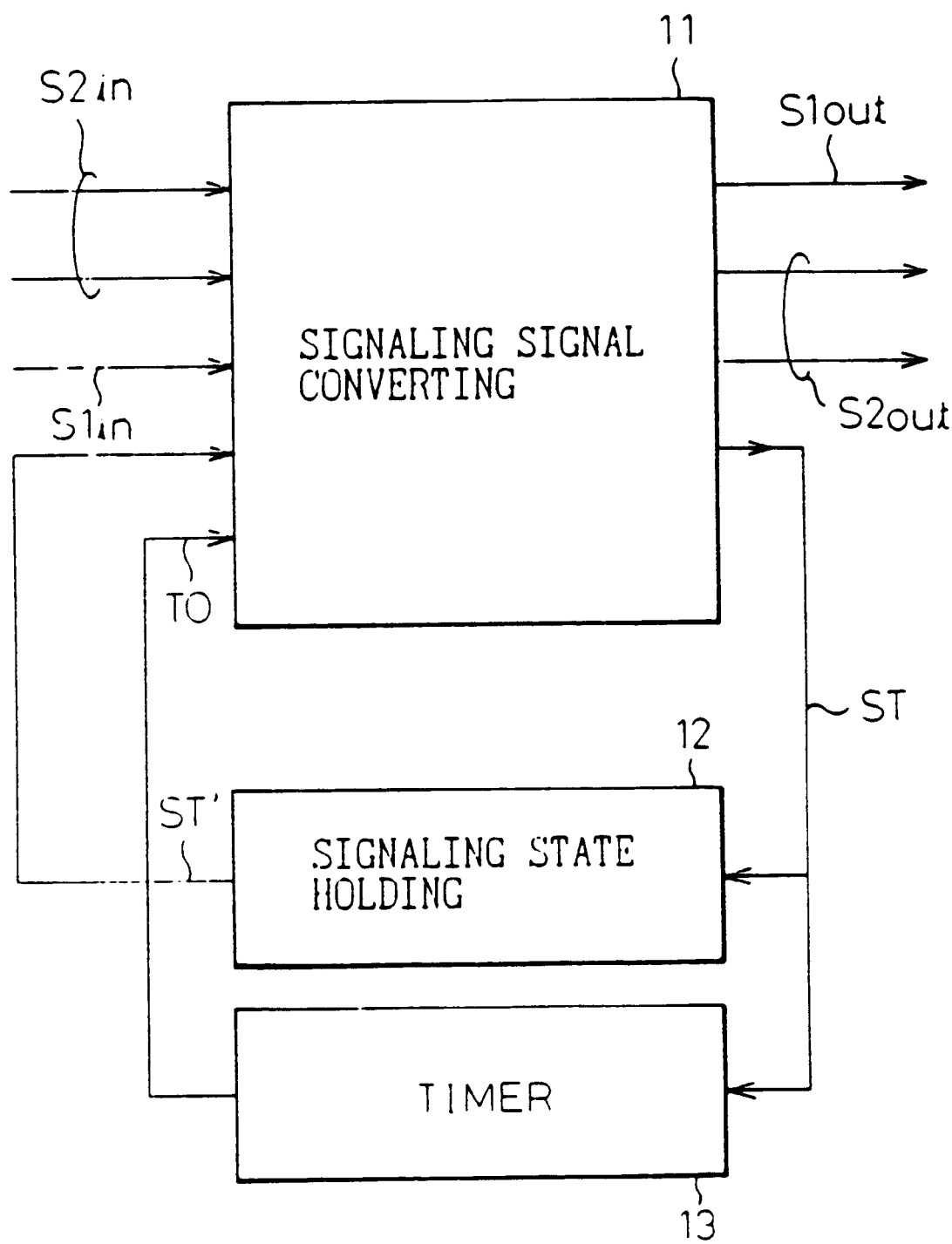
FIG. 1 is a view of the basic configuration of a package having a facility for mutual conversion among different kinds of signaling signals according to a first aspect of the present invention.

FIG. 1 is a view of the basic configuration of a package having the facility for mutual conversion among different kinds of signaling signals according to a first aspect of the present invention.

The package 10 shown in FIG. 1 is a package for performing mutual conversion between a first signaling signal S1in and a second signaling signal S2in and comprises a signaling signal converting means 11; a signaling state holding means 12; and a timer means 13.

The signaling signal converting means 11 outputs mutually converted both first signaling signal S1out and second signaling signal S2out and outputs current state information ST based on preceding state information ST' represented by the preceding both first signaling signal and second signaling signal and the current first signaling signal and current second signaling signal.

The signaling state holding means 12 holds the current state information ST up to the frame in which next signaling signal appears.

The timer means 13 is started when detecting an appearance of current state information ST matching with predetermined state information and outputs a time-out signal TO after an elapse of a predetermined time.

Here, the signaling signal converting means 11 receives as input both the first signaling signal S1in and second signaling signal S2in to be mutually converted, receives the current state information ST held in the signaling state holding means 12 as the preceding state information ST', and further receives the time-out signal TO from the timer means 13, thereby to respectively output the mutually converted both first signaling signal S1out and second signaling signal S2out and current state information ST in accordance with a combination of these received signals.

Figure 2:
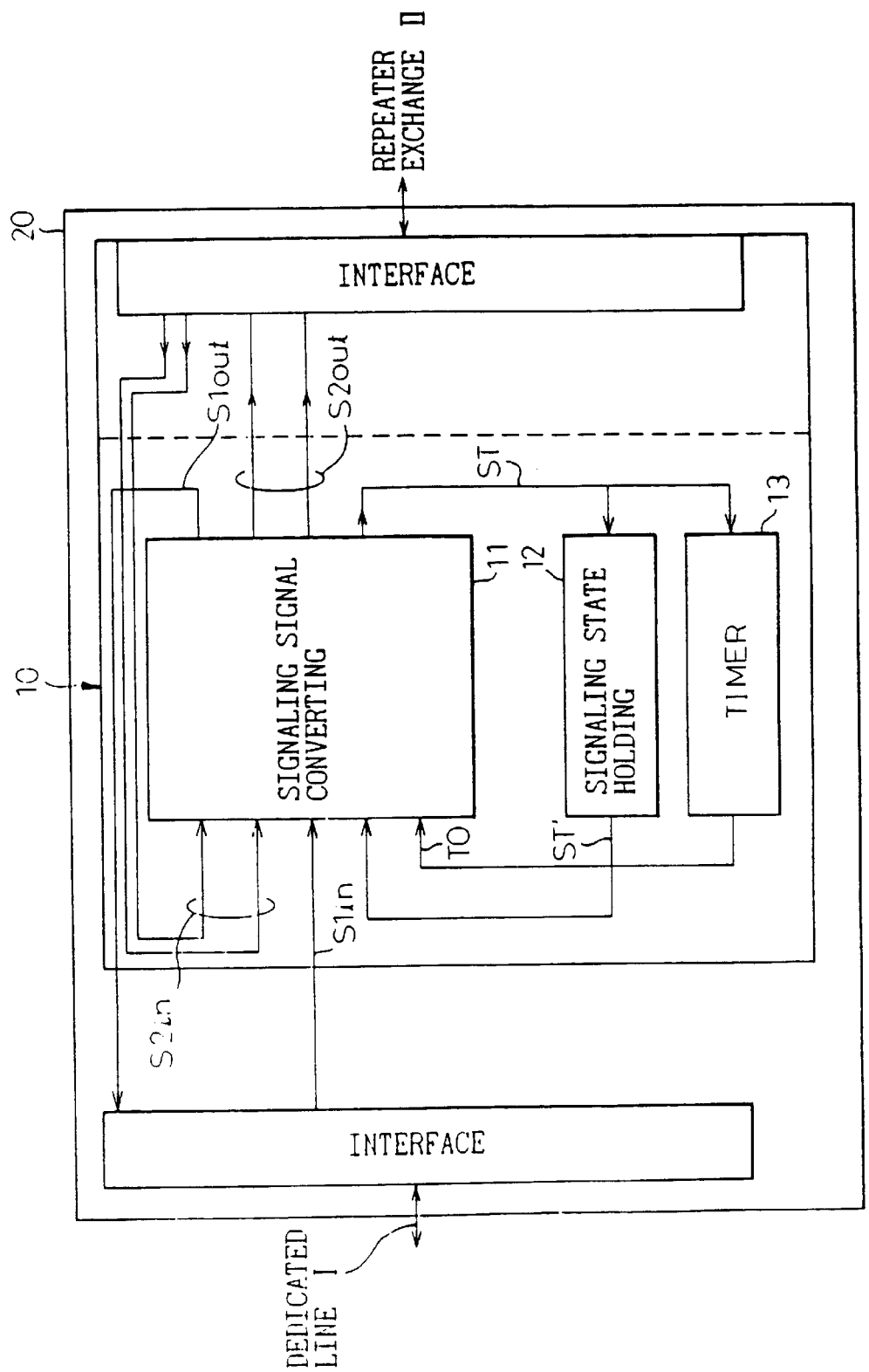
FIG. 2 is a view of the basic configuration of a time-division multiplexer having a facility for mutual conversion among different kinds of signaling signals according to a second aspect of the present invention.

FIG. 2 is a view of the basic configuration of a time-division multiplexer having a facility for mutual conversion among different kinds of signaling signals according to the second aspect of the present invention. This time-division multiplexer 20 is characterized in that the package 10 for performing the mutual conversion between the first signaling signal S1 and the second signaling signal S2 is integrally included.

This package 10 comprises, as shown in FIG. 1, the signaling signal converting means 11 which outputs the mutually converted both first signaling signal S1out and second signaling signal S2out and outputs the current state information ST based on the preceding state information ST' represented by the preceding both first signaling signal S1in and second signaling signal S2in and the current both first signaling signal S1in and second signaling signal S2in; the signaling state holding means 12 which holds the current state information ST up to the frame in which next signaling signal appears; and the timer means 13 which is started when detecting an appearance of the current state information ST matching with the predetermined state information and outputs a time-out signal TO after an elapse of a predetermined time. The above signaling signal converting means 11 is constituted so as to receive as input both the first signaling signal S1in and second signaling signal S2in which should be mutually converted, receive the current state information ST held in the signaling state holding means 12 as the preceding state information ST', and further receive the time-out signal TO from the timer means 13, thereby to output both the mutually converted first signaling signal S1out and second signaling signal S2out and the current state information ST in accordance with the combination of these received signals.

Figure 3:
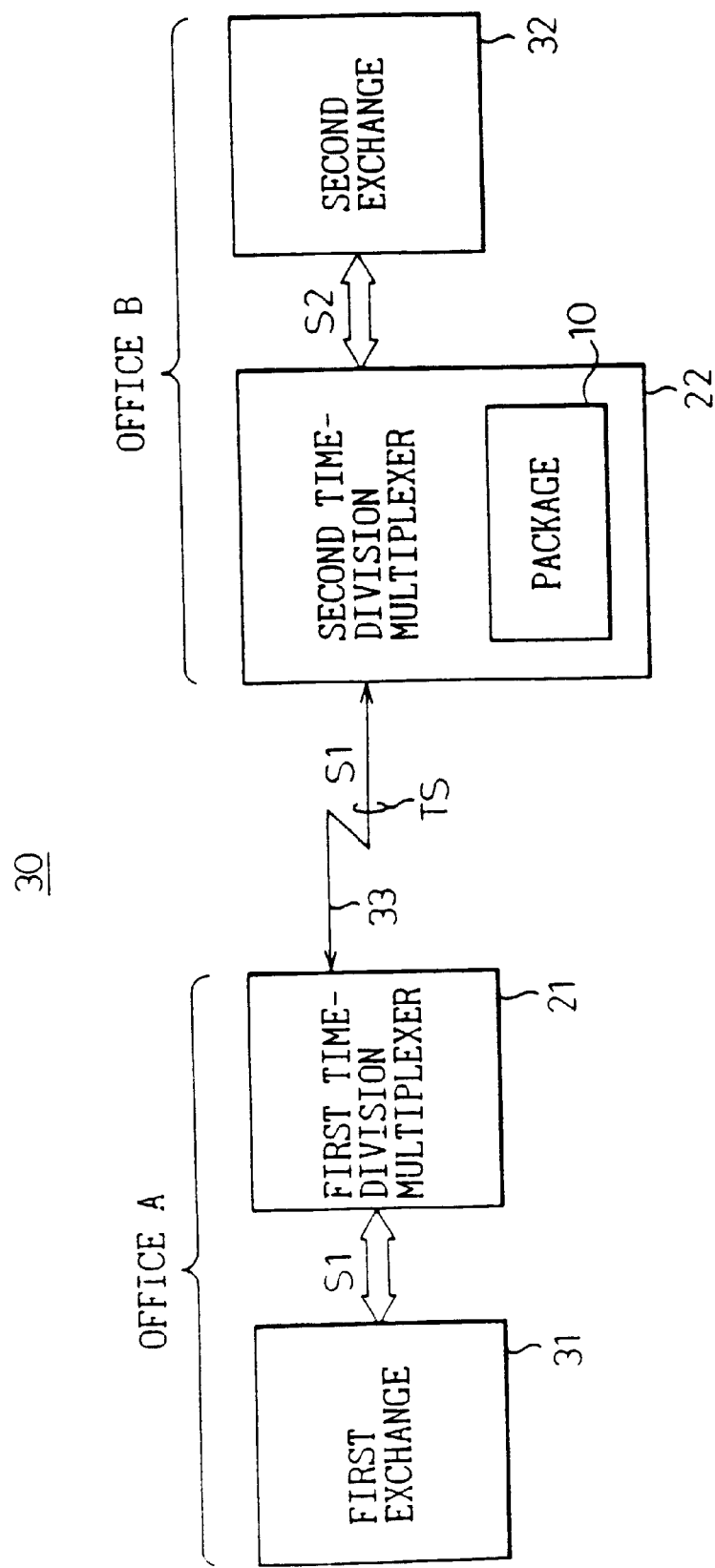
FIG. 3 is a view of the basic configuration of a speech handling network having a facility for mutual conversion among different kinds of signaling signals according to a third aspect of the present invention.

FIG. 3 is a view of the basic configuration of the speech handling network having a facility for mutual conversion among different kinds of signaling signals according to a third aspect of the present invention.

The speech handling network 30 is a speech handling network which is based on a network comprising a first exchange 31 which is equipped with a first time-division multiplexer 21 and performs transmission/reception control by the first signaling signal S1, a second exchange 32 which is equipped with a second time-division multiplexer 22 and performs transmission/reception control by the second signaling signal S2, and a dedicated line 33 for connecting the first and second exchanges 31 and 32 via the first and second time-division multiplexers 21 and 22. Here, the second time-division multiplexer 22 integrally includes the package 10 for performing the mutual conversion between the first signaling signal S1 and the second signaling signal S2. Only the transmission signal TS controlled by the first signaling signal S1 is transferred on the dedicated line 33.

Before explaining the embodiment of the present invention, an explanation will be made of well known different kinds of signaling systems used in the embodiment of the present invention. Here, referring to FIG. 49 to FIG. 51, in the speech handling network shown in these figures, when the inter-repeater exchange signaling signals are standardized as SS/SR (signaling send/signaling receive) signaling signals of a one-bit configuration, if there is a request for additional installation of an office of the network after this, there is no way to satisfy that request other than to use a repeater exchange I using the same SS/SR signaling signal to construct the speech handling network. It was not possible to use repeater exchanges II using different signaling systems.

Particularly when a speech handling network is constructed to be operated under the signaling system of the domestic Japanese standard and it becomes necessary to additionally construct offices overseas, if the repeater exchanges II originally already existing overseas do not use the SS/SR signaling system, there is the above problem that new repeater exchanges I must be bought and the repeater exchanges II must be replaced by the repeater exchanges I. The most inconvenient combination of different kinds of signaling systems in such a case is the SS/SR signaling system and the T.6 signaling system.

Therefore, conventionally, in the case of a speech handling network configured using the SS/SR signaling system for performing signaling control between repeater exchanges by one bit, offices equipped with exchanges of different signaling systems such as the T.6 signaling system for performing the signaling control between exchanges by 2 bits cannot be used, that is, there is the inconvenience that exchanges of the same signaling system must be employed in all offices of the network.

Figure 4:
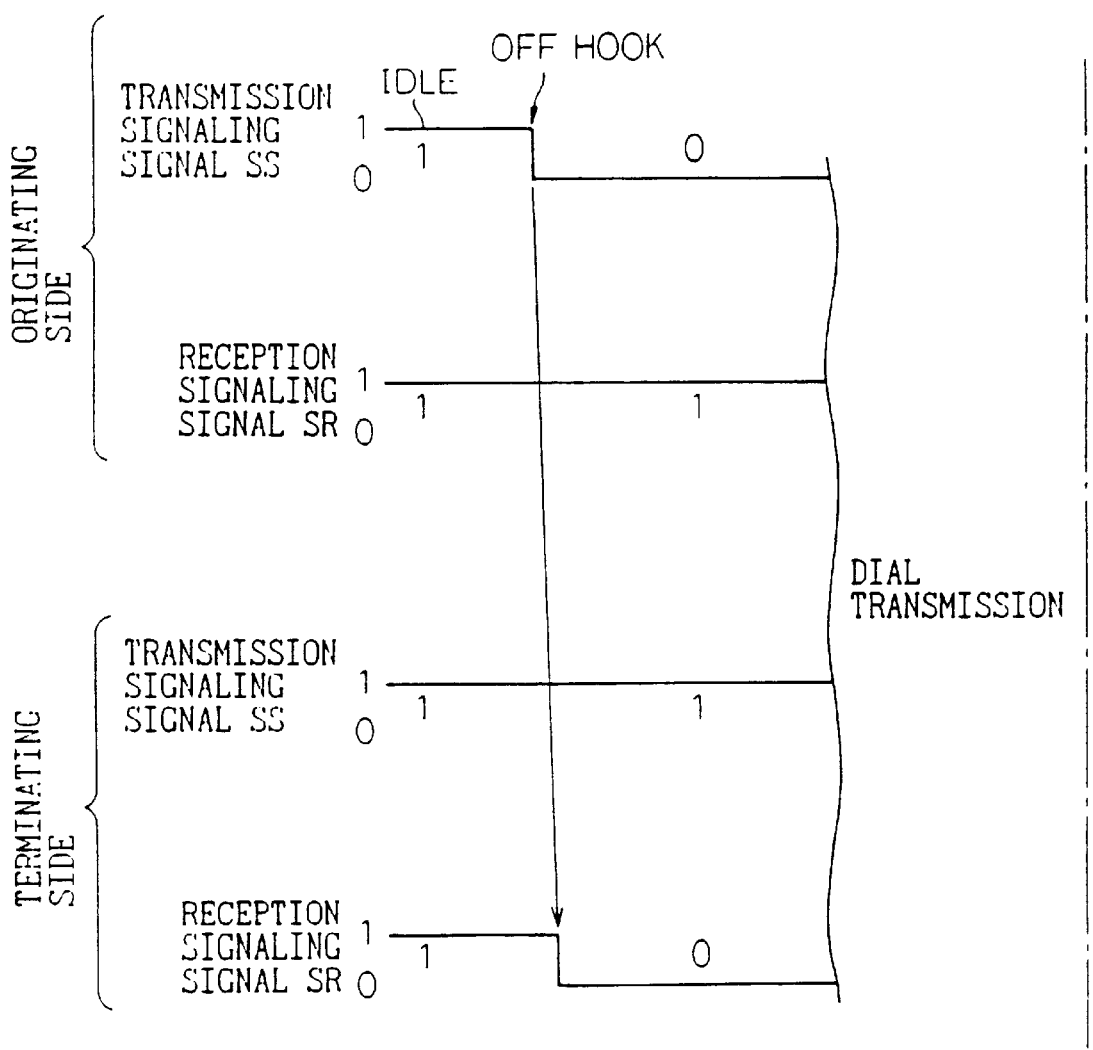
FIG. 4 is a first part of a sequence diagram explaining a well known SS/SR signaling system.
Figure 5:
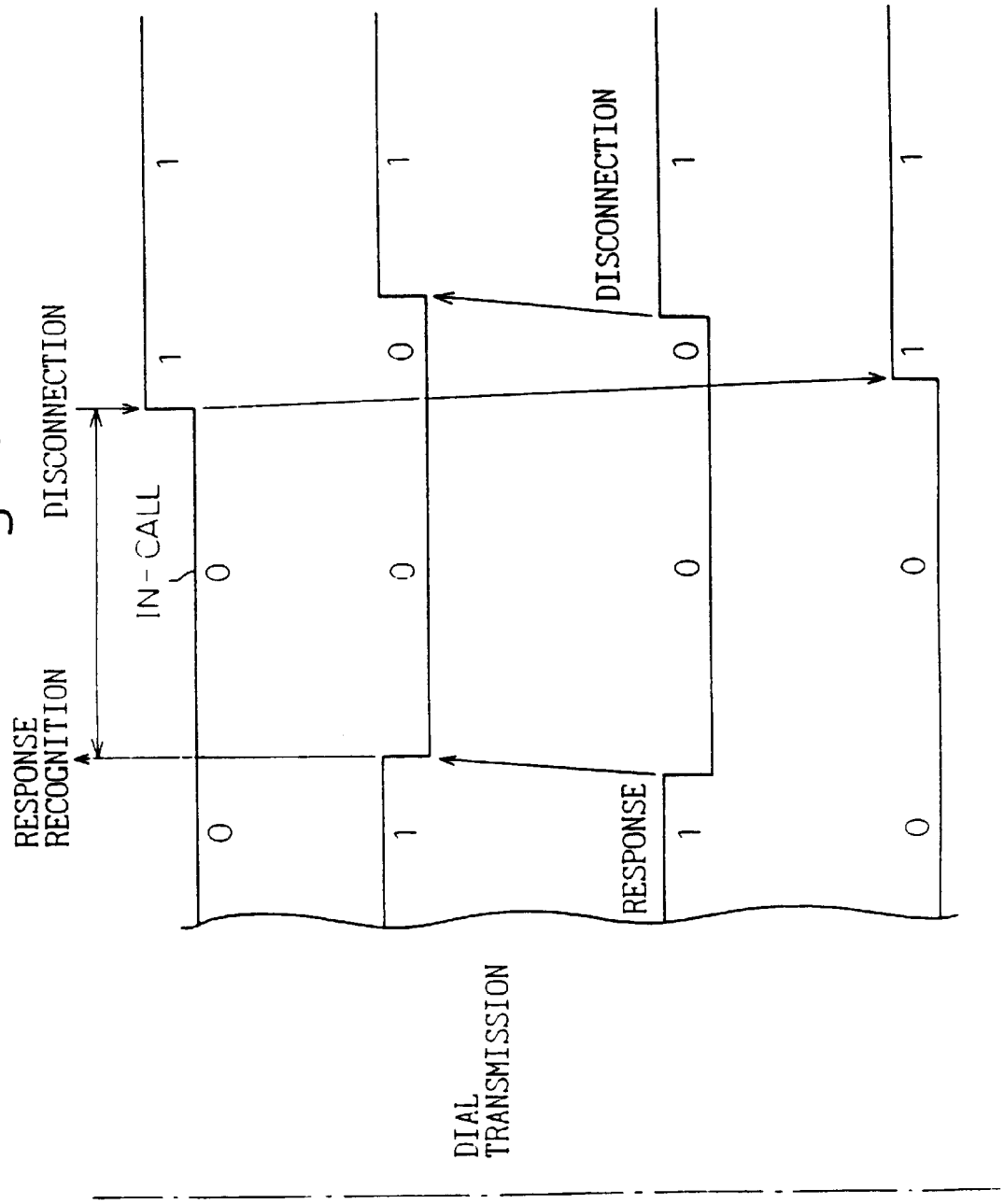
FIG. 5 is a second part of a sequence diagram explaining the well known SS/SR signaling system.
Figure 6:
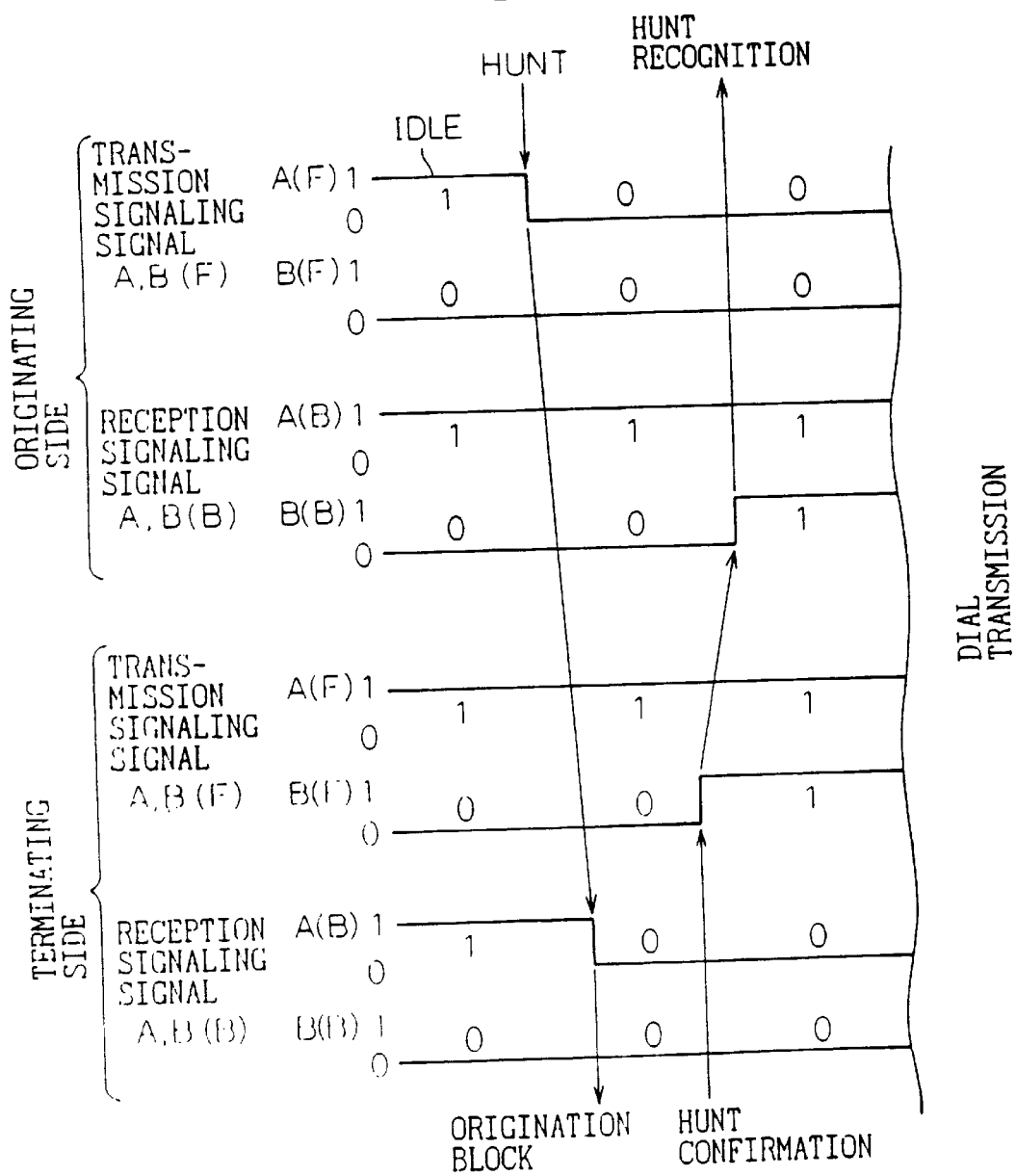
FIG. 6 is a first part of a sequence diagram explaining a well known T.6 signaling system.
Figure 7:
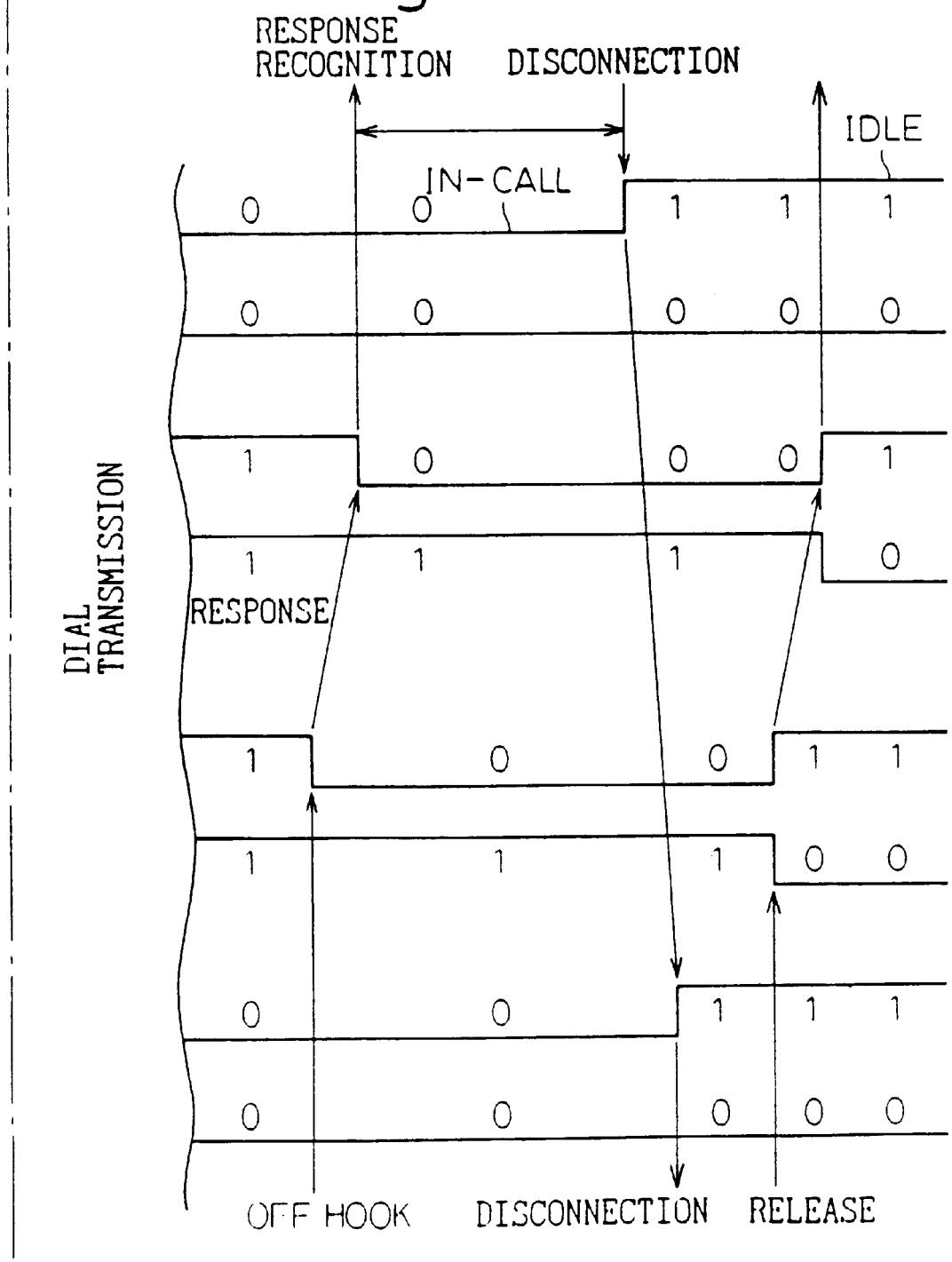
FIG. 7 a second part of a sequence diagram explaining the well known T.6 signaling system.

FIG. 4 and FIG. 5 are parts of a sequence diagram for explaining the well known SS/SR signaling system. FIG. 6 and FIG. 7 are parts of a sequence diagram for explaining the well known T.6 signaling system.

First, referring to FIG. 4 and FIG. 5, "ORIGINATING SIDE" in the upper section of each figure represents the change of logic (0, 1) of each of the transmitting signaling signal SS transmitted from the originating side repeater exchange I and the reception signaling signal SR received at this originating side repeater exchange I, while "TERMINATING SIDE" in the lower section of each figure represents the change of logic (0, 1) of each of the transmitting signaling signal SS transmitted from the terminating side repeater exchange I and the reception signaling signal SR received at this terminating side repeater exchange I.

Thus, the state of the signaling control is represented by each logic (0, 1) of the 1-bit transmitting signaling signal SS and 1-bit reception signaling signal SR.

An "IDLE" state is (1, 1). When the subscriber activates the telephone, that is, performs an "off hook" operation, the off hook (OFF HOOK) state (0, 1) is entered. The subscriber on the originating side dials a number ("DIAL TRANSMISSION" in the figure) to call the opposing side subscriber. When the opposing subscriber responds to that call ("RESPONSE" in the lower section of FIG. 5 and logic (0, 0)), a response is returned to the originating side repeater exchange where the response is recognized (state of "RESPONSE RECOGNITION" in FIG. 5). By this, both subscribers enter into "IN-CALL" states and the logic on the originating side becomes (0, 0).

When that in-call is terminated, that is, when the originating side subscriber disconnects the telephone, that is, performs an "on hook" operation, the "DISCONNECTION" state is entered (logic on the originating side becomes (1, 0)). Responding to this, the SR on the terminating side changes in logic from 0 to 1. When that subscriber performs the on hook operation, the SS on the terminating side changes in logic from 0 to 1. On the originating side receiving this, the SR changes in logic from 0 to 1, and the state of both side returns to the original "IDLE" state (1,1).

Next, FIG. 6 and FIG. 7 will be referred to. The way of looking at these figures representing the sequence of the T.6 signaling system is similar to the case of FIG. 4 and FIG. 5. The "ORIGINATING SIDE" in the upper section of each figure represents the change of the logic (0, 1) of each of a pair of transmitting signaling signals A (F) and B (F) (hereinafter, also abbreviated as A, B (F)) transmitted from the originating side repeater exchange II and a pair of reception signaling signals A (B) and B (B) received at this originating side repeater exchange II, while "TERMINATING SIDE" in the lower section of each figure represents the change of the logic (0, 1) of each of a pair of transmitting signaling signals A (F) and B (F) (hereinafter, also abbreviated as A, B (F)) transmitted from the terminating side repeater exchange II and a pair of reception signaling signals A (B) and B (B) received at this terminating side repeater exchange II.

Thus, the signaling control state is represented by the logics (0, 1) of the 2-bit transmitting signaling signals A (F) and B (F) and 2-bit received signaling signals A (B) and B (B). Note that, the above (F) represents "Forward", and (B) represents "Backward". Further, the signaling signals A (F) and B (F) are not respectively separately transferred through two lines, but are transferred in time series on a one line (transmission line) for every frame as A (F)→B (F).

In the "IDLE" state, the logic of the originating side signaling signals [A (F), B (F), A (B), B (B)] is [1, 0, 1, 0]. Here, when assuming here that the originating side subscriber originates a call; the logic of the originating side signaling signals [A (F), B (F), A (B), B (B)] becomes [0, 0, 1, 0]. This is the "HUNT" state. The change of the above transmitting signaling signal A (F) (1→0) is sent to the terminating side, and the logic of the terminating side signaling signal changes to [1, 0, 0, 0]. Here, the terminating side becomes the "ORIGINATION BLOCK" state.

Subsequently, the terminating side repeater exchange II notifies the confirmation of the hunt (state of "HUNT CONFIRMATION") to the originating side. This state has the logic [1, 1, 0, 0]. The state of the originating side repeater exchange II receiving this becomes [0, 0, 1, 1]. This is the "HUNT RECOGNITION" state. By this hunt recognition, the originating side repeater exchange II is notified that the transfer of the dial information becomes possible (this point is different from the above SS/SR signaling system sending out the dial information immediately after the off hook action of the subscriber regardless of the situation on the opposing side).

After the hunt recognition, the dialing to the opposing subscriber starts, and the system enters into the "DIAL TRANSMISSION" state in the figure. By this dialing, the opposing side performs an off hook operation (OFF HOOK) and enters into the "RESPONSE" state. The logic at this time, in terminating side, is [0, 1, 0, 0]. Further, the originating side recognizes the response from the terminating side, whereupon the logic becomes [0, 0, 0, 1]. This is the "IN-CALL" state.

Then, as illustrated in FIG. 7, by the on hook action of the originating side subscriber, the "DISCONNECTION" state is entered. The logic at this time is [1, 0, 0, 1]. The terminating side repeater exchange II receiving this disconnects the path, and the state becomes the "DISCONNECTION" state. The logic at this time is [0, 1, 1, 0]. Subsequently, the terminating side subscriber performs an off hook operation and releases the state to the original idle state. The logic of this "RELEASE" state is [1, 0, 1, 0]. Upon receipt of this, the originating side also returns to the original "IDLE" state. The logic is [1, 0, 1, 0].

The SS/SR signaling system represents the signaling control state by one bit of the transmitting signaling signal (SS) and one bit of the received signaling signal (SR) as represented in the sequences of FIG. 4 and FIG. 5 to perform the control between exchanges. On the other hand, the T.6 signaling system represents the signaling control state by the 2-bit transmitting signaling signals (A (F), B (F)) and 2-bit received signaling signals (A (B), B (B)) as represented in the sequences in FIG. 6 and FIG. 7 to perform the control between exchanges. Accordingly, in order to mix the repeater exchanges I and II of these two different kinds of signaling systems in the same speech handling network, a device for mutually converting two different kinds of signaling signals must be realized, for example, a device for converting the two bits A (F) and B (F) received from the repeater exchange II to one bit of SS and conversely one bit of SR received from the repeater exchange I of the opposing office to 2 bits of A (F) and B (F) and transmitting the same to the repeater exchange II.

Therefore, the present invention realizes a facility of mutually converting the SS/SR signaling signal and T.6 signaling signal according to two different kinds of signaling systems. In this case, that facility is realized by a "package", that is, a small hardware structure (not according to control of software). It is possible to easily install this package in an already existing time-division multiplexer in the form of a digital trunk card of an E1 interface for supporting the T.6 signaling system in the time-division multiplexer. By this, a time-division multiplexer also including a facility for mutual signal conversion between a T.6 signaling signal and a SS/SR signaling signal is easily realized. Furthermore, it is possible to easily mix repeater exchanges II of the T.6 signaling system in a speech handling network using repeater exchanges I of the SS/SR signaling system.

Thus, according to the present invention, in order to reduce the path settings of the time-division multiplexer and raise the multiplexing efficiency on the transmission line, mutual signaling signal conversion is always carried out without recognition as to the signaling system of the opposing exchange, and the transmission of the signaling signals is carried out by only one bit of the SS/SR signaling signal on this transmission line.

Therefore, the present invention creates a mutual conversion sequence among different kinds of signaling signals as will be mentioned in detail below.

Figure 8:
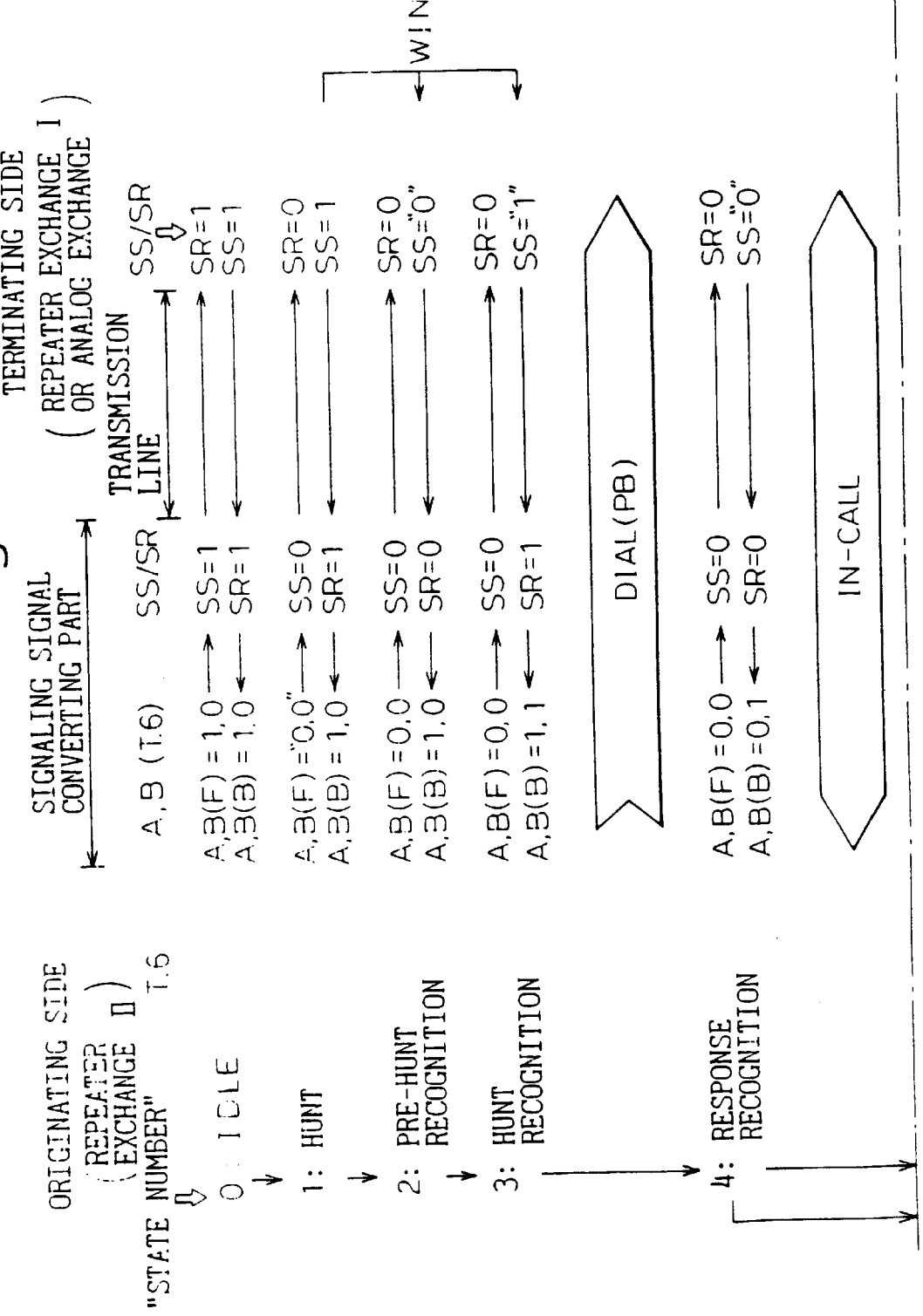
FIG. 8 is a first part of a view of a signaling signal conversion sequence from the T.6 (originating side) to SS/SR (terminating side)
Figure 9:
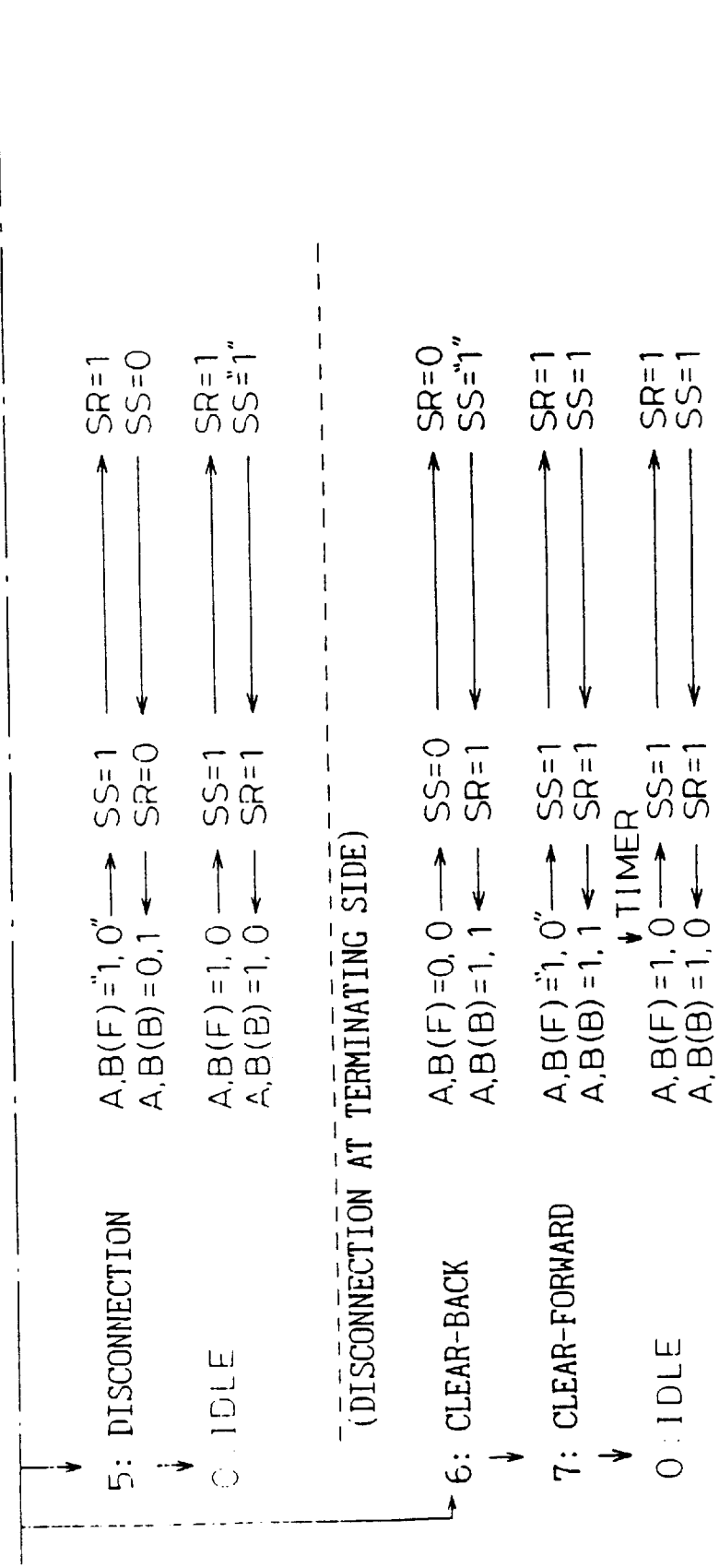
FIG. 9 is a second part of a view of the signaling signal conversion sequence from the T.6 (originating side) to SS/SR (terminating side)
Figure 10:
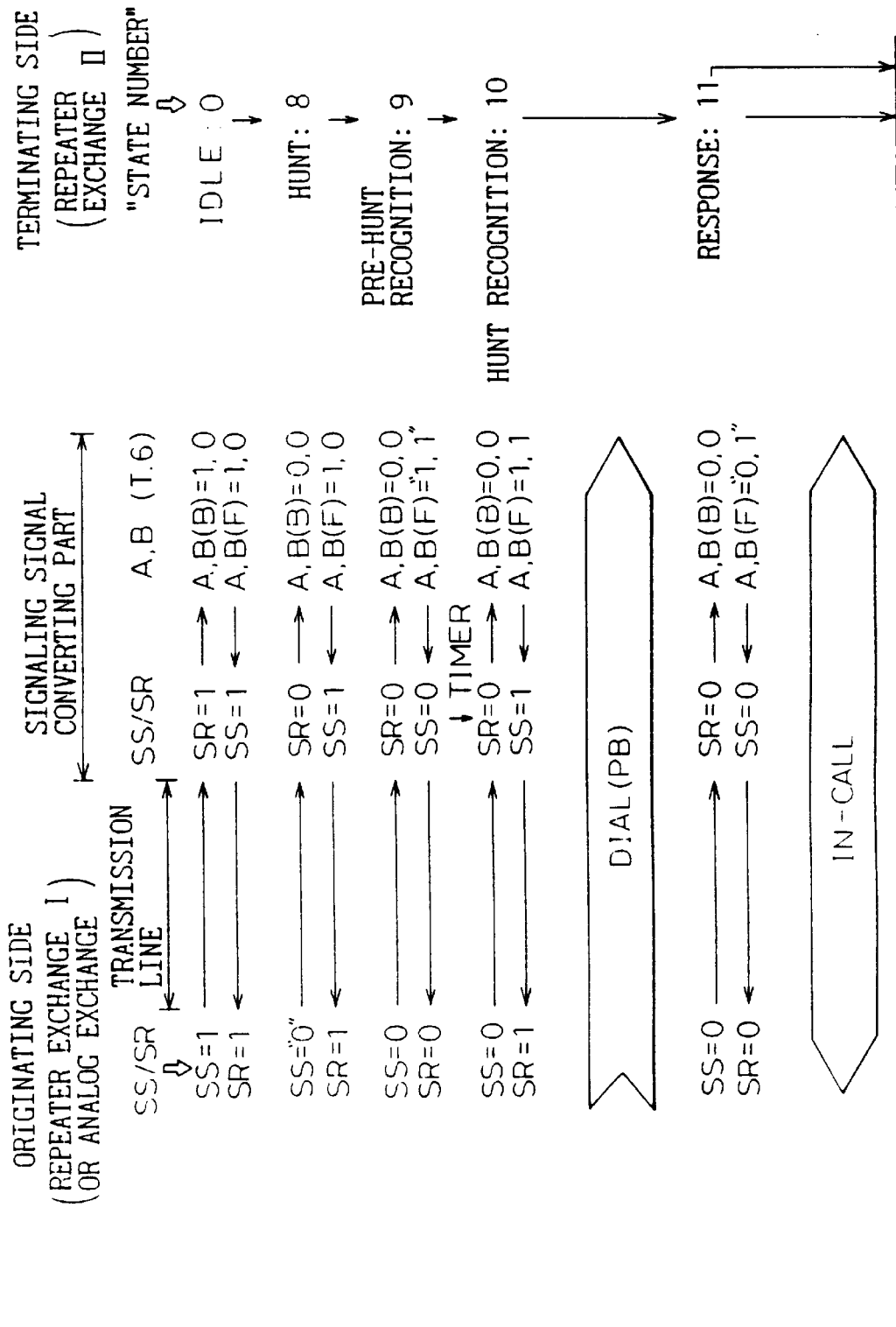
FIG. 10 is a first part of a view of a signaling signal conversion sequence from the SS/SR (originating side) to T.6 (terminating side)
Figure 11:
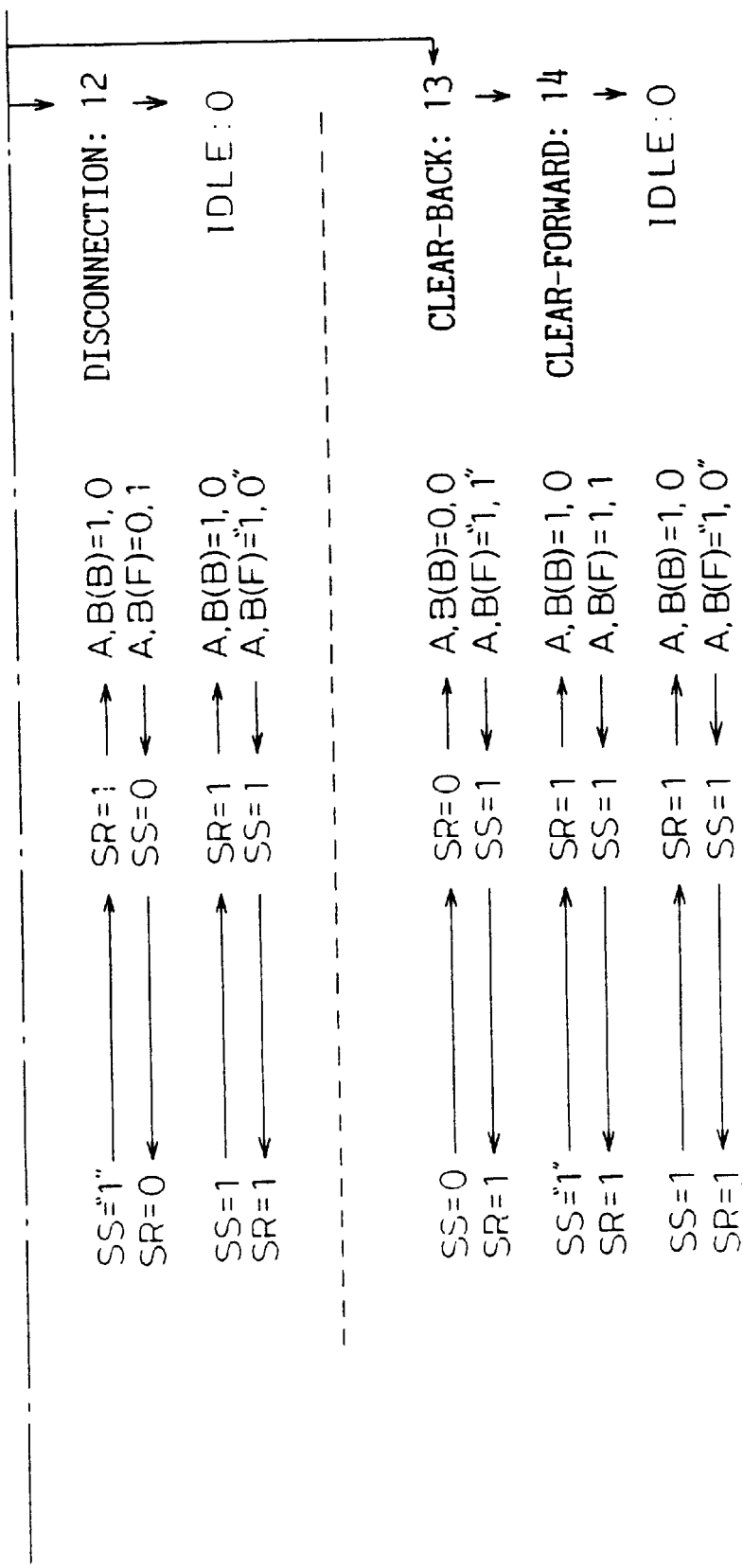
FIG. 11 is a second part of a view of the signaling signal conversion sequence from the SS/SR (originating side) to T.6 (terminating side)
Figure 12:
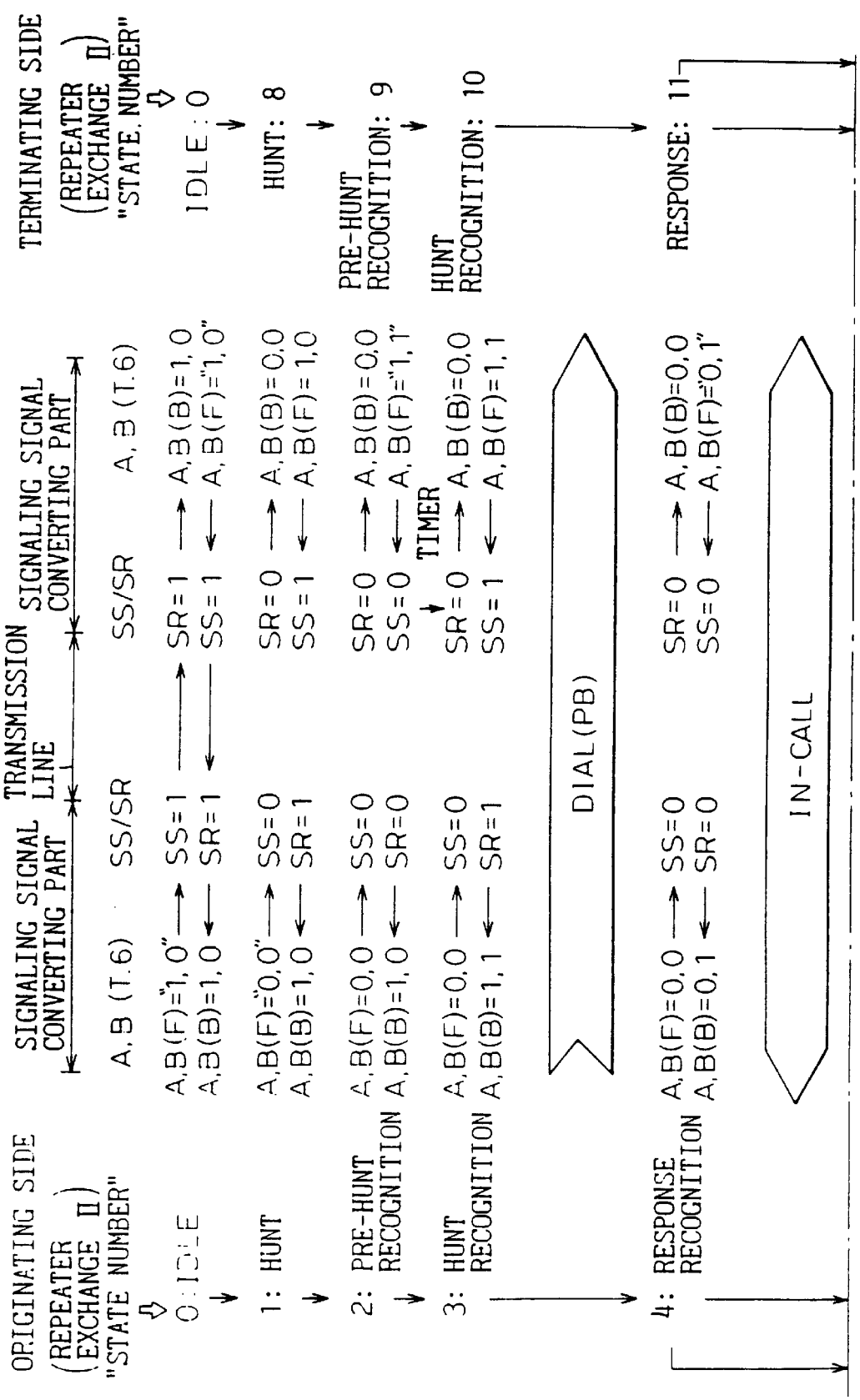
FIG. 12 is a first part of a view of a signaling signal conversion sequence from the T.6 (originating side) to T.6 (terminating side);.
Figure 13:
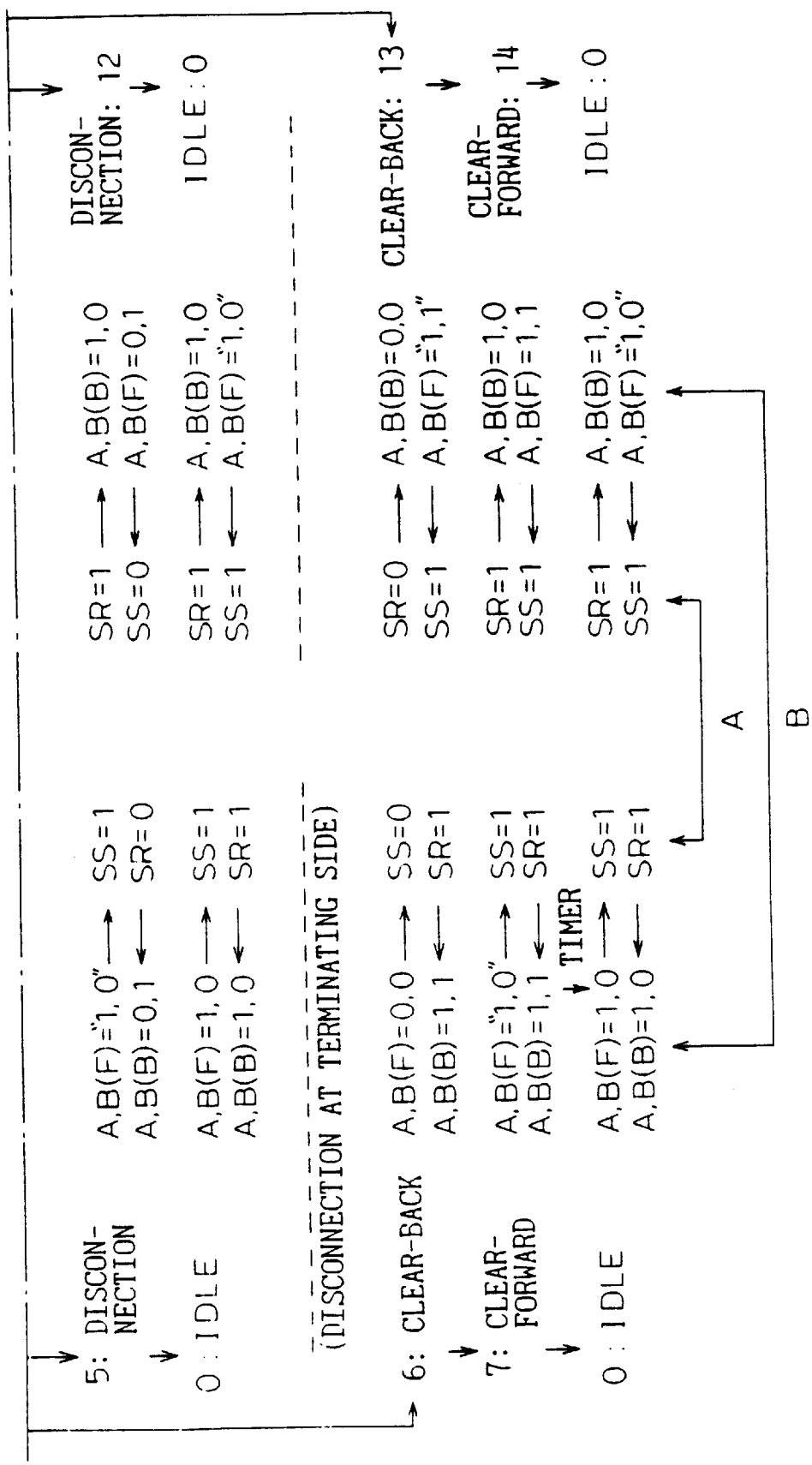
FIG. 13 is a second part of a view showing the signaling signal conversion sequence from the T.6 (originating side) to T.6 (terminating side)

FIG. 8 and FIG. 9 are parts of a view of a signaling signal conversion sequence from the T.6 (originating side) to SS/SR (terminating side) system. FIG. 10 and FIG. 11 are parts of a view of a signaling signal conversion sequence from the SS/SR (originating side) to T.6 (terminating side) system. FIG. 12 and FIG. 13 are parts of a view of a signaling signal conversion sequence from the T.6 (originating side) to T.6 (terminating side) system.

First, an explanation will be made of the way to view these figures using FIG. 8 as a representative case. Referring to FIG. 8, as shown in the upper section in the figure, the center part is the signaling signal converting part according to the present invention. This corresponds to the package 10 shown in FIG. 1 and FIG. 2. Sandwiching this signaling signal converting part, the originating side repeater exchange is located on the left side and the terminating side repeater exchange is located on the right side. In the example of the present figure, the originating side is the repeater exchange II and is controlled by a T.6 signaling signal. Further, the terminating side is the repeater exchange I (including also the analog exchange (refer to FIG. 50 and FIG. 51)) and is controlled by the SS/SR signaling signal.

The signaling signal converting part (package 10) performing the mutual conversion between two kinds of signaling signals assumes the various states explained in FIGS. 4 and 5 and FIGS. 6 and 7 as the state information and changes the state in a certain sequence. This state information is indicated as the state information ST (ST') in FIG. 1 and FIG. 2. In the embodiment mentioned here, this state information is defined as a "state number". This state number changes from, such as, 0→1→2→3. Specifically, different states are allocated to the numbers, i.e., the above "IDLE" state is allotted to 0, the above "HUNT" state is allotted to 1, the above "HUNT RECOGNITION" state is allotted to 3, the above "RESPONSE RECOGNITION" state is allotted to 4, the above "DISCONNECTION" state is allotted to 5, . . . .

As one example, when paying attention to the "IDLE" state (state where neither transmission nor reception are started in the exchange) of the uppermost stage, from the transmitting side repeater exchange II, 2-bit transmitting signaling signals A (F) and B (F) (in the figure, represented as A, B (F) for simplicity, same also for A, B (B)) are transferred as A, B (F)=1, 0.

This A, B (F)=1, 0 is converted, at the signaling signal converting part, to SS=1 as the transmitting signaling signal equivalent to the SS/SR signaling system. In the figure, "→" means that one mutual conversion is made from A, B (F)=1, 0 to SS=1. Note that, this SS=1 is transferred to the transmitting side repeater exchange I as it is, so this is received as SR=1 in this exchange I.

Similarly, in this "IDLE" state (state number 0), from the terminating side repeater exchange I, one bit of the transmitting signaling signal is transferred as SS=1 to the signaling signal converting part. This SS=1 is received as it is at this signaling signal converting part as SR=1 of the received signaling signal.

This SR=1 is converted, in the signaling signal converting part, to A, B (B)=1, 0 as the equivalent received signaling signal in the T.6 signaling system. In the figure, "←" means that one mutual conversion from SR=1 to A, B (B)=1, 0 is made.

Below, the signal mutual conversion such as "HUNT" of state number 1 is represented by a similar method of expression. In the figure, in this state number 1, the logic of A, B (F) is represented by " " as "0, 0". This " " indicates that the related bits quoted has become trigger bits for causing the state change (same below).

Since the way of looking at FIGS. 8 to 13 was explained above, take note of FIG. 8 again.

First, under the SS/SR signaling system shown in FIG. 4 and FIG. 5, SS=1 and SR=1 in the "IDLE" state. Similarly, under the T.6 signaling system shown in FIG. 6 and FIG. 7, A, B (F)=1, 0 and A, B (B)=1, 0 [1, 0, 1, 0] in the "IDLE" state. Accordingly, the state as "IDLE" in the present signaling signal conversion sequence is defined as the state of transmitting SS=1 and A, B (B)=1, 0 when receiving A, B (F)=1, 0 and SR=1, respectively. The state numbers 0, 1, 2, . . . of the state information are respectively allotted to these states and are temporarily held in the signaling state holding means 12 shown in FIG. 1 and FIG. 2. Then, at the reception of the signaling signals, at the corresponding channel (for example CH1 mentioned later), after one multiframe (2 msec: refer to the E1 interface format of FIGS. 36 and FIG. 37 and FIGS. 42 and 43 explained later), the present signaling signal conversion sequence is set so that new state numbers and values of SS and A, B (B) are output from the signaling converting means 11 shown in FIG. 1 and FIG. 2 from the values of the newly received T.6 type transmitting signaling signals A, B (F) and SS/SR type received signaling signal SR, and the preceding state number periodically read from the signaling signal state holding means 12 at a cycle of 8 k. Accordingly, if the preceding state is the "IDLE" state of the state number 0, and then there is no change in the above A, B (F)=1, 0 and SR=1, no state change occurs, so also the new state becomes the "IDLE" state of state number 0 as it is.

Assuming that the T.6 type repeater exchange II becomes the state of "HUNT" from the "IDLE" state, the transmitting signaling signals thereof become A, B (F)="0, 0", therefore the state changes to the state of "HUNT" of state number 1 by using this case as trigger, and the signaling signal converting part changes only SS to 0. The state at this time corresponds to the off hook state (OFF HOOK) in the SS/SR signaling sequence of FIG. 4 (state immediately after the receiver is picked up at the telephone set).

As the state caused next, in the T.6 signaling sequence, there is a state "HUNT RECOGNITION" (FIG. 6). In the SS/SR signaling sequence, however, as apparent from FIG. 4, a state corresponding to the above state does not exist. Namely, there is a partial mismatch of states between the T.6 sequence and the SS/SR sequence, i.e., a complete match cannot be obtained between the two.

In order to absorb such a mismatch of states, assume that a "wink" operation is started in the SS/SR type repeater exchange I and analog exchange (refer to "WINK" on right end of FIG. 8). At the start of this wink operation, only at the time of termination, if SR=0 is received in the "IDLE" state, SS is once made equal to 0, then soon returned to SS=1, whereby it is notified to the signaling signal converting part that a state corresponding to the "HUNT RECOGNITION" under the T.6 signaling system occurs on the originating side. Accordingly, the repeater exchange II on the originating side does not start the dial send (dial transmission) if the SR does not receive 1→0→1.

When the operating in such a wink start mode has started and the repeater exchange I on the terminating side transmits SS=0 by the wink operation, if SR=0 is received, the state of "HUNT" of state number 1 is changed to the state of the newly defined "PRE-HUNT RECOGNITION" of state number 2. Note, at this time, in the state where A, B (B)=1, 0 and SS=0, the value is the same as the value in the "HUNT" state of state number 1 and not changed. At the end of the wink start mode, when SS becomes equal to 1 again, the signal conversion is carried out so that the state changes to the state of "HUNT RECOGNITION" of state number 3, that is, A, B (B)=1, 1 by SR=1 changed in the signaling converting part due to the reception of SS=1.

The situation where a mismatch of states occurs other than the above case is a state where "DISCONNECTION" is performed from the terminating side (repeater exchange I and analog exchange) in FIG. 9, i.e., a case where the state is returned from the state of "CLEAR FORWARD" of state number 7 to the state of "IDLE" of state number 0. At this time, when viewing the state in the SS/SR sequence where "CLEAR FORWARD" occurs under the T.6 signaling sequence, under this SS/SR signaling sequence, the state already has changed to the "IDLE" state. Then, it becomes impossible to return the T.6 type exchange II to A, B (B)=1, 0 as the "IDLE" state.

Therefore, in the sequence shown in FIG. 9, the timer is started simultaneously with the signaling signal converting part receiving A, B (F)=1, 0, from originating side, from the state of "CLEAR-BACK" of state number 6 and the state becomes the state of "CLEAR FORWARD" of state number 7. This timer is a timer means 13 shown in FIG. 1 and FIG. 2. When the time runs out in this timer, the state is compulsorily changed by using this (time-out signal TO shown in FIG. 1 and FIG. 2) as a trigger. Here, it can be returned to the original "IDLE" state. Namely, the concept of changing the state by a simple hardware structure of the ON/OFF operation of a timer is adopted.

Similar to this, a case where the state is changed by a simple hardware structure of the ON/OFF operation of a timer is a case where the state changes from the state of "HUNT" of state number 8 on the terminating side to the state of "HUNT RECOGNITION" of state number 10 in FIG. 10. In this case, to match with the wink start of the repeater exchange I on the originating side, when the signaling signal converting part receives A, B (F)=1, 1 from the repeater exchange II on the terminating side, the state is changed to a state such as the newly defined "PRE-HUNT RECOGNITION" of state number 9, and SS is made equal to 0. Simultaneously, the timer is started (refer to "TIMER" of FIG. 10). This timer is a timer means 13 mentioned above. Then, when the time runs out at this timer, the signaling signal converting part compulsorily changes above SS=0 to SS=1 and creates the state of "HUNT RECOGNITION" of state number 10.

As explained above, the mismatch of states among different kinds of signaling systems can be absorbed. Namely, the states respectively represented by the SS/SR signaling signal and the T.6 signaling signal are compared with each other and a change in state is compulsorily created by the ON/OFF operation of the timer at situations where the mismatch of the above states occurs to make the mutual conversion of the signaling signals possible while absorbing the mutual mismatch of the states between signaling sequences. As explained above, FIGS. 8 and 9 show the signaling signal conversion sequence of T.6 (origination)→SS/SR (termination); FIGS. 10 and 11 show the signaling signal conversion sequence of SS/SR (origination)→T.6 (termination); and FIGS. 12 and 13 show the signaling signal conversion sequence of T.6 (origination)→T.6 (termination).

In the present invention, as already explained, by the interposition of the package 10, the signals are all standardized to the SS/SR signaling signals and transmitted on the dedicated line (transmission line). By this, even in exchange control between two repeater exchanges II, both of which are controlled by the same T.6 signaling signal, the signaling signal converting part must be interposed between the two exchanges. The above FIG. 12 and FIG. 13 show the signaling signal conversion sequence for such a case. However, the thinking of the signal conversion is quite similar to that explained referring to FIG. 8 to FIG. 11.

In FIG. 12 and FIG. 13, at the originating side, the T.6 signaling signal is converted to the SS/SR signaling signal, and at the terminating side, the SS/SR signaling signal is converted to the T.6 signaling signal. In this case, when viewing only the originating and terminating SS/SR signaling sequences (indicated by A of the bottom end in FIG. 13) and only the originating and terminating T.6 signaling sequences (indicated by B of the bottom end in FIG. 13), it is seen that the situations other than the change of state by the ON/OFF operation of the timer completely correspond to the signaling sequences represented in FIGS. 4 and 5 and FIGS. 6 and 7.

A supplementary explanation will be further made of FIG. 8 to FIG. 11 mentioned above. This is for the disconnection sequence at the termination of a call. Referring to FIGS. 8 and 9, at the originating side, the sequence <1> when disconnecting a call from the originating side is represented by the state numbers as follows:

<1>: 0→1→2→3→4→5→0

On the other hand, at the originating side, the sequence <2> when disconnecting a call from the terminating side is represented by the state numbers as follows:

<2>: 0→1→2→3→4→6→7→0

Next, referring to FIG. 10 and FIG. 11, at the terminating side, the sequence <3> when a call is disconnected from the originating side is represented by the state numbers as follows:

<3>: 0→8→9→10→11→12→0

On the other hand, at the terminating side, the sequence <4> when a call is disconnected from the terminating side is represented by the state numbers as follows:

<4>: 0→8→9→10→11→13→14→0

Figure 14:
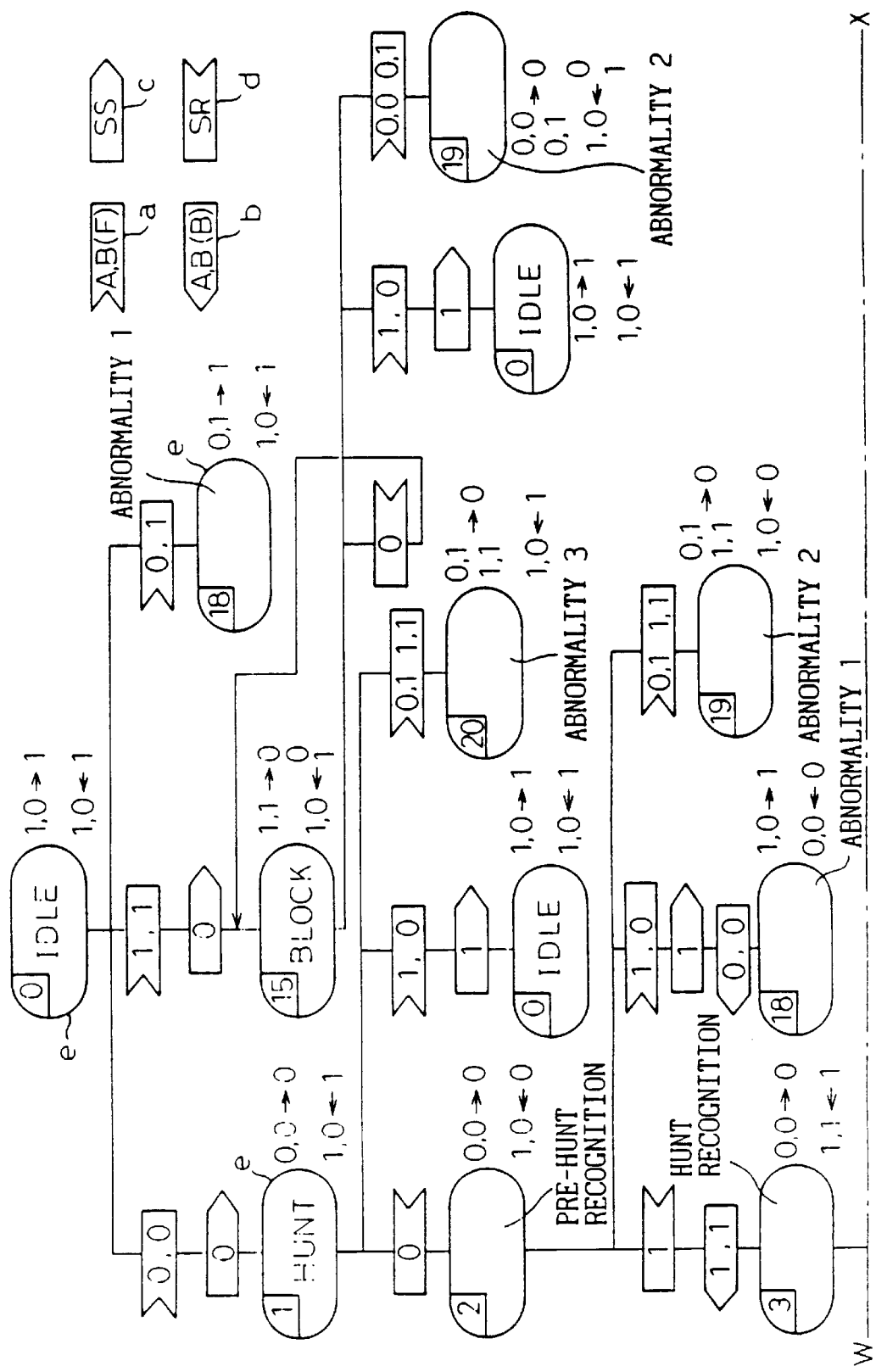
FIG. 14 is a first part of a state transition chart of a signaling signal conversion on the originating side.
Figure 15:
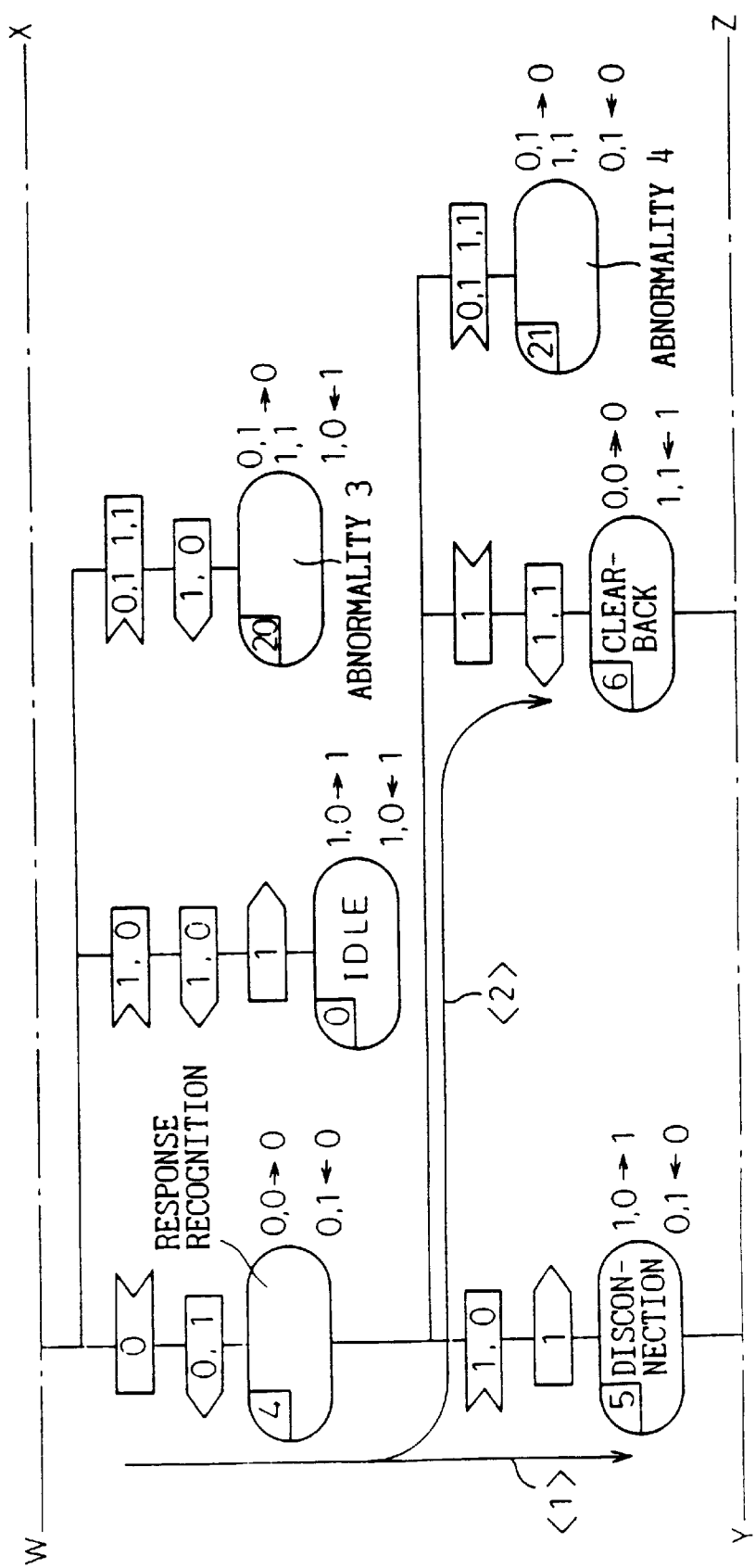
FIG. 15 is a second part of a state transition chart of the signaling signal conversion on the originating side.
Figure 16:
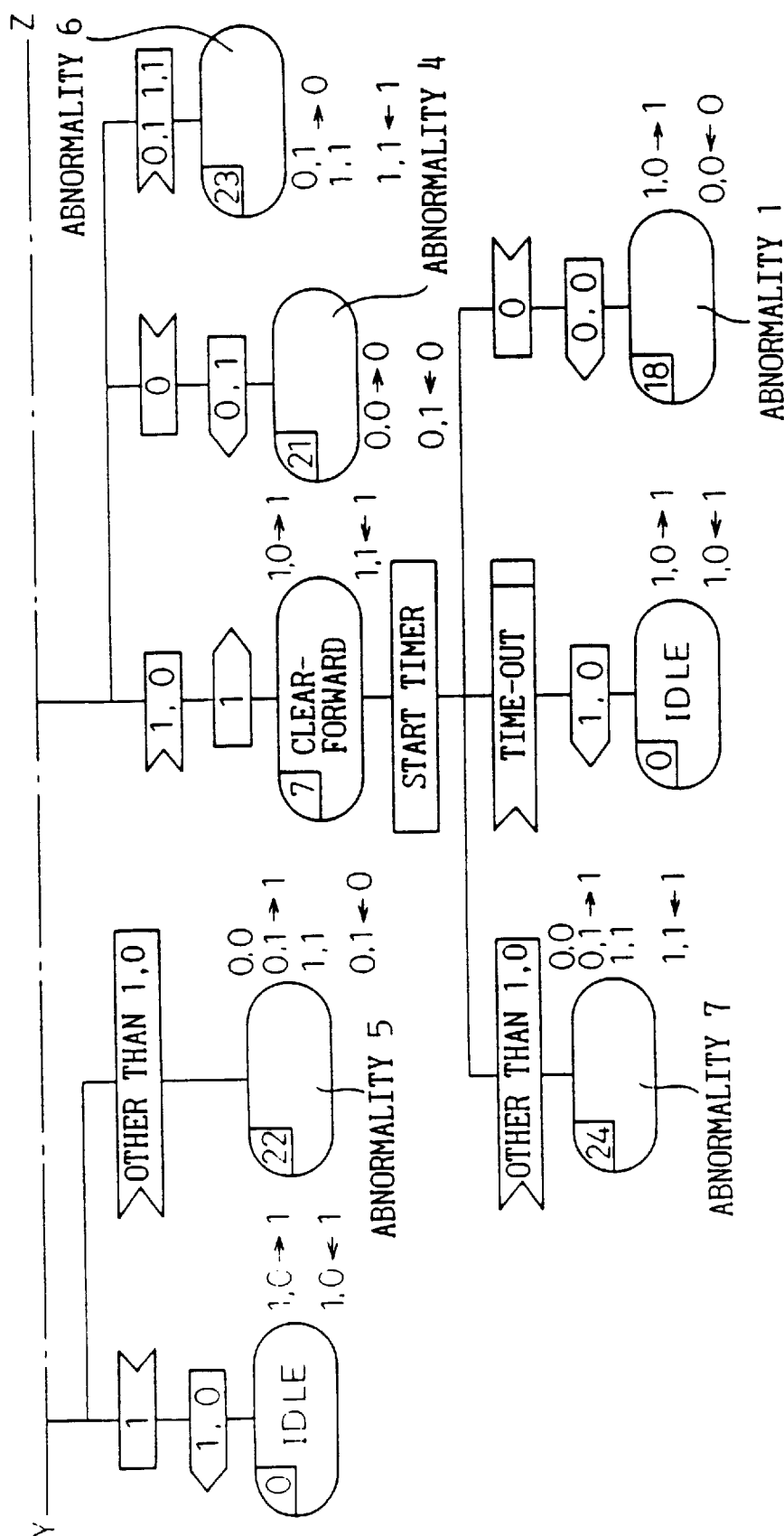
FIG. 16 is a third part of a state transition chart of the signaling signal conversion on the originating side.
Figure 17:
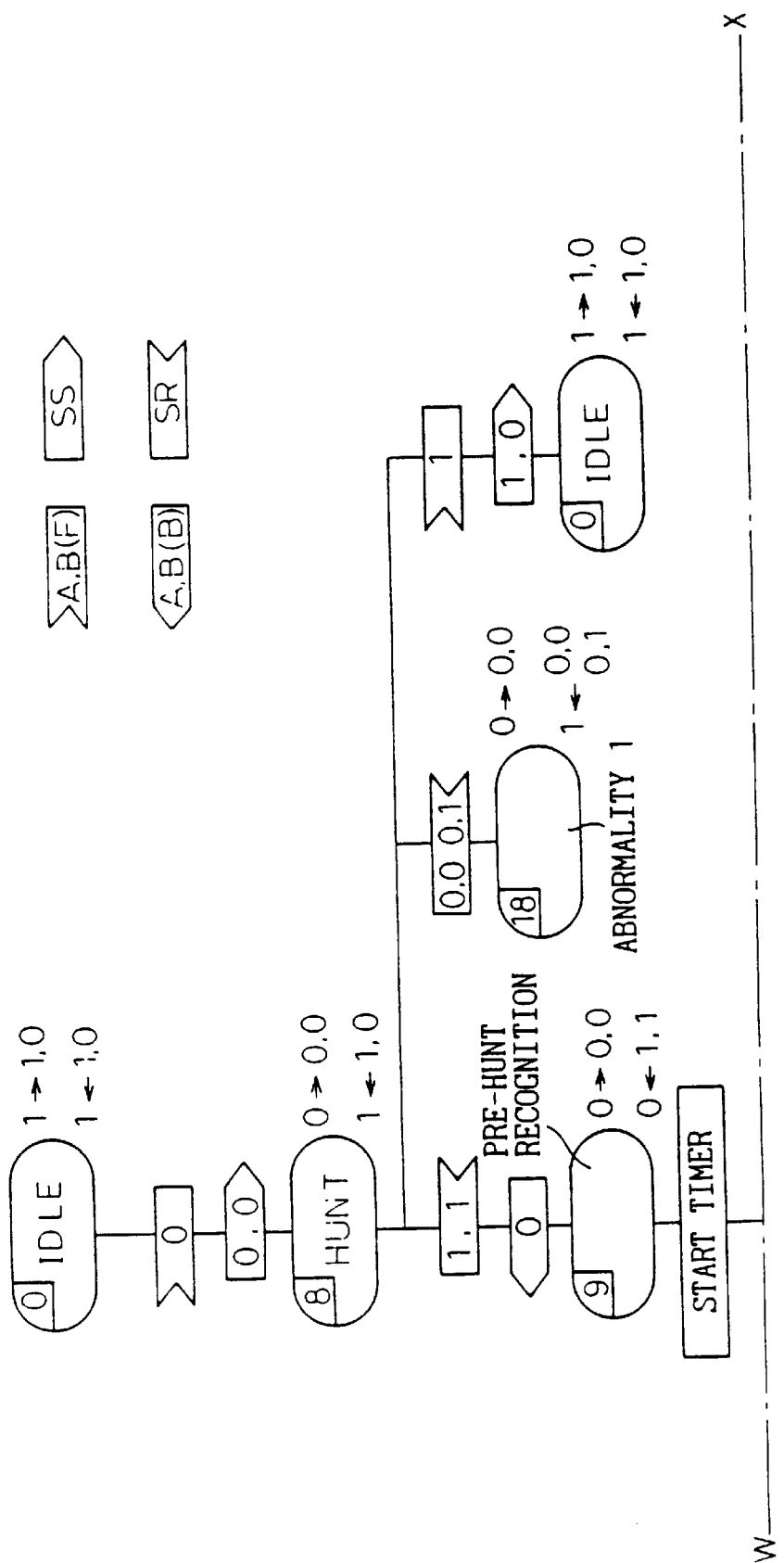
FIG. 17 is a first part of a state transition chart of the signaling signal conversion on the terminating side.
Figure 18:
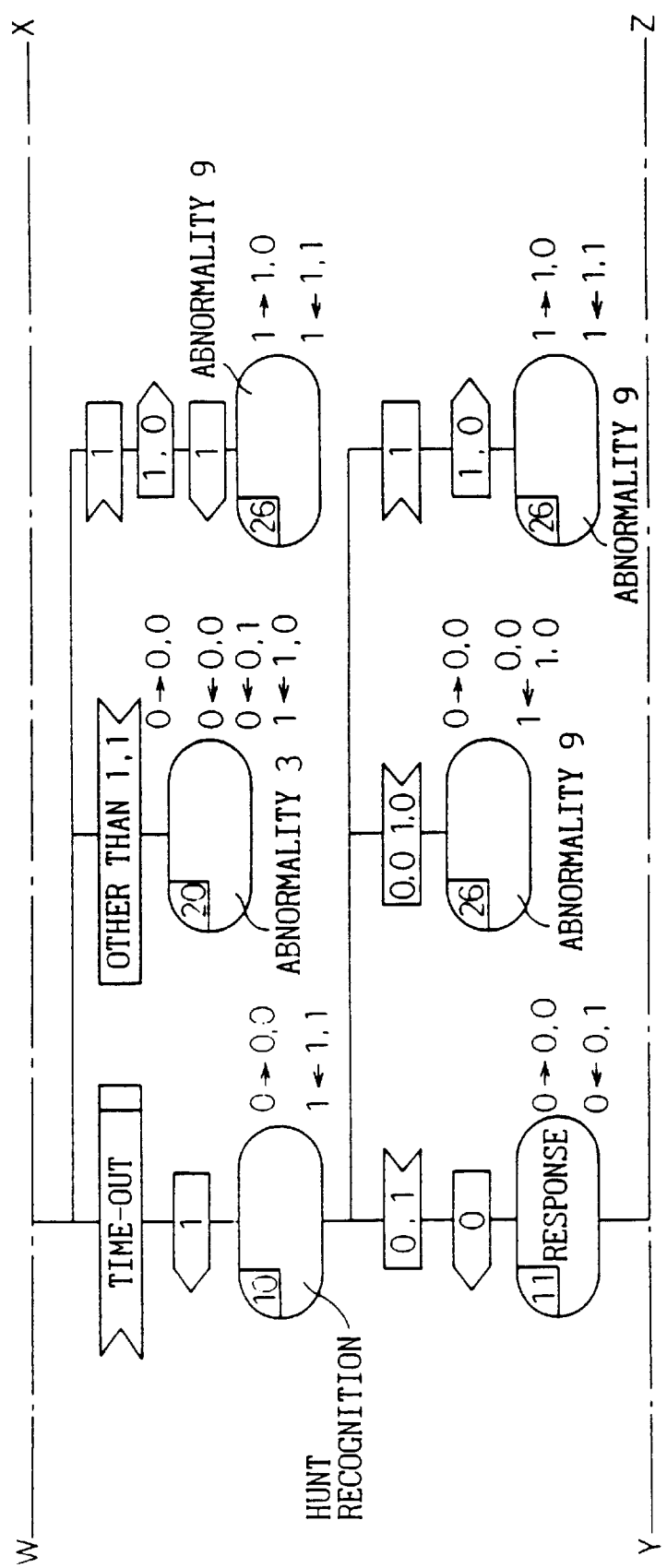
FIG. 18 is a second part of a state transition chart of the signaling signal conversion on the terminating side.
Figure 19:
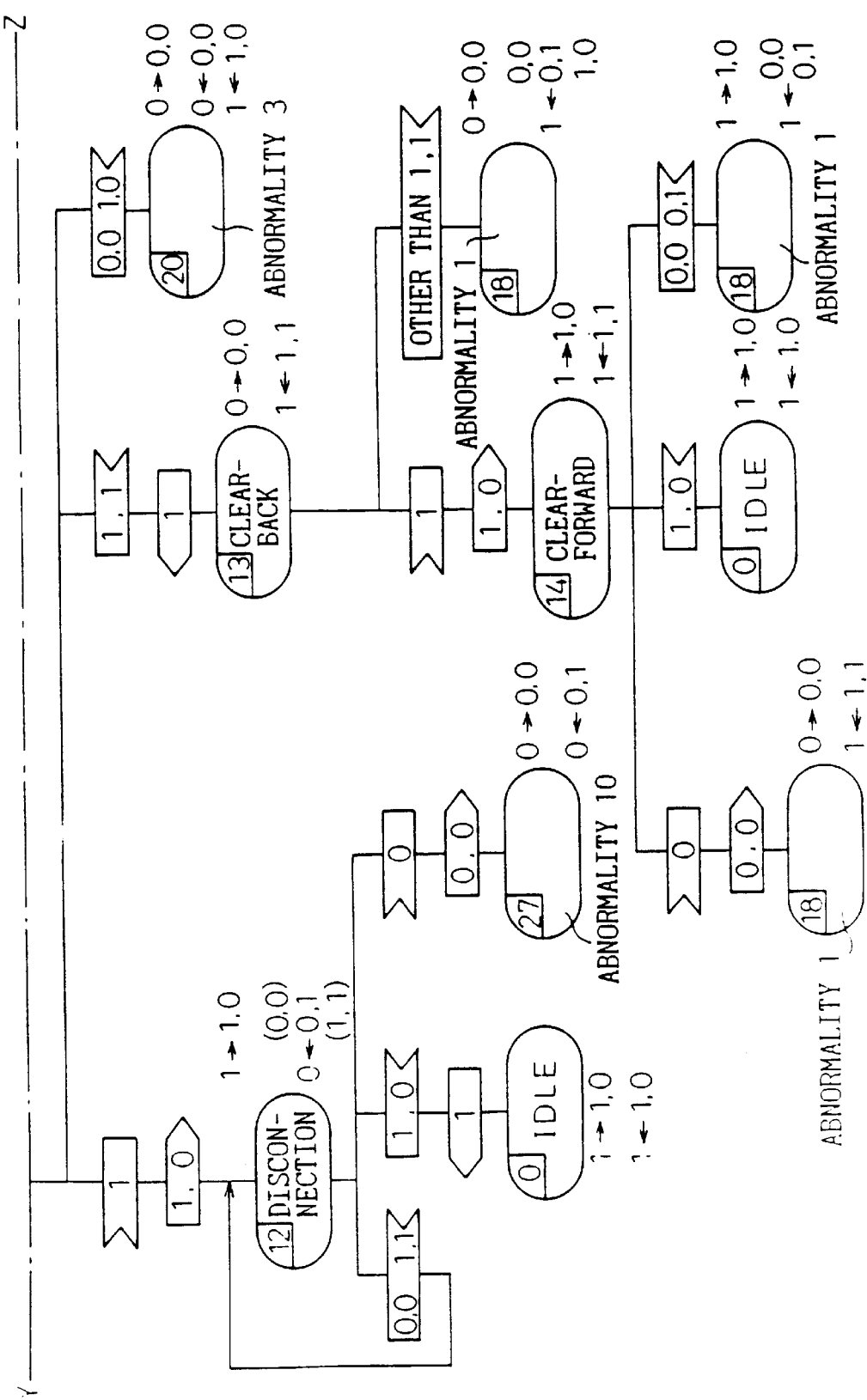
FIG. 19 is a third part of a state transition chart of the signaling signal conversion on the terminating side.
Figure 20:
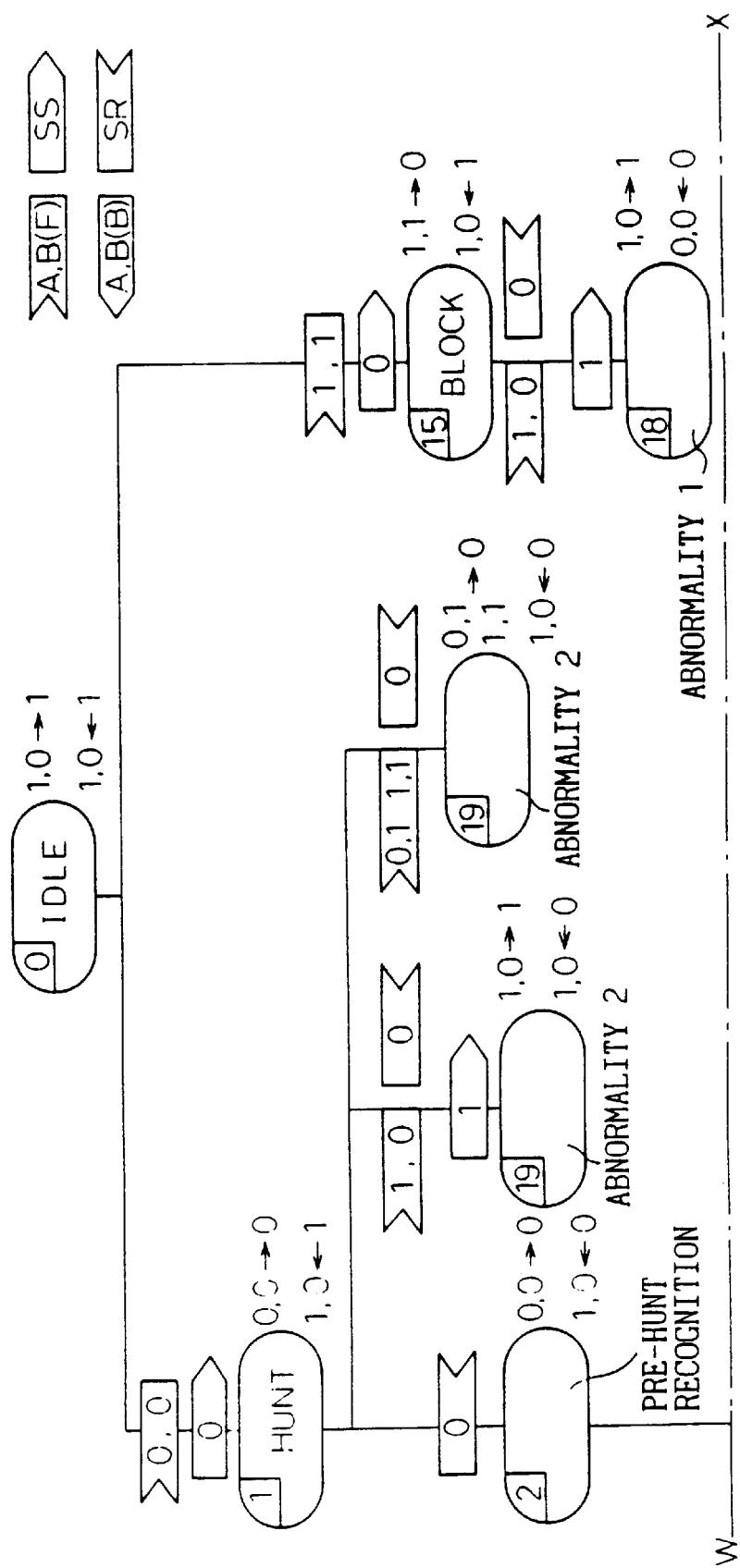
FIG. 20 is a first part of a state transition chart of the signaling signal conversion on the originating side where a simultaneous call termination occurs.
Figure 21:
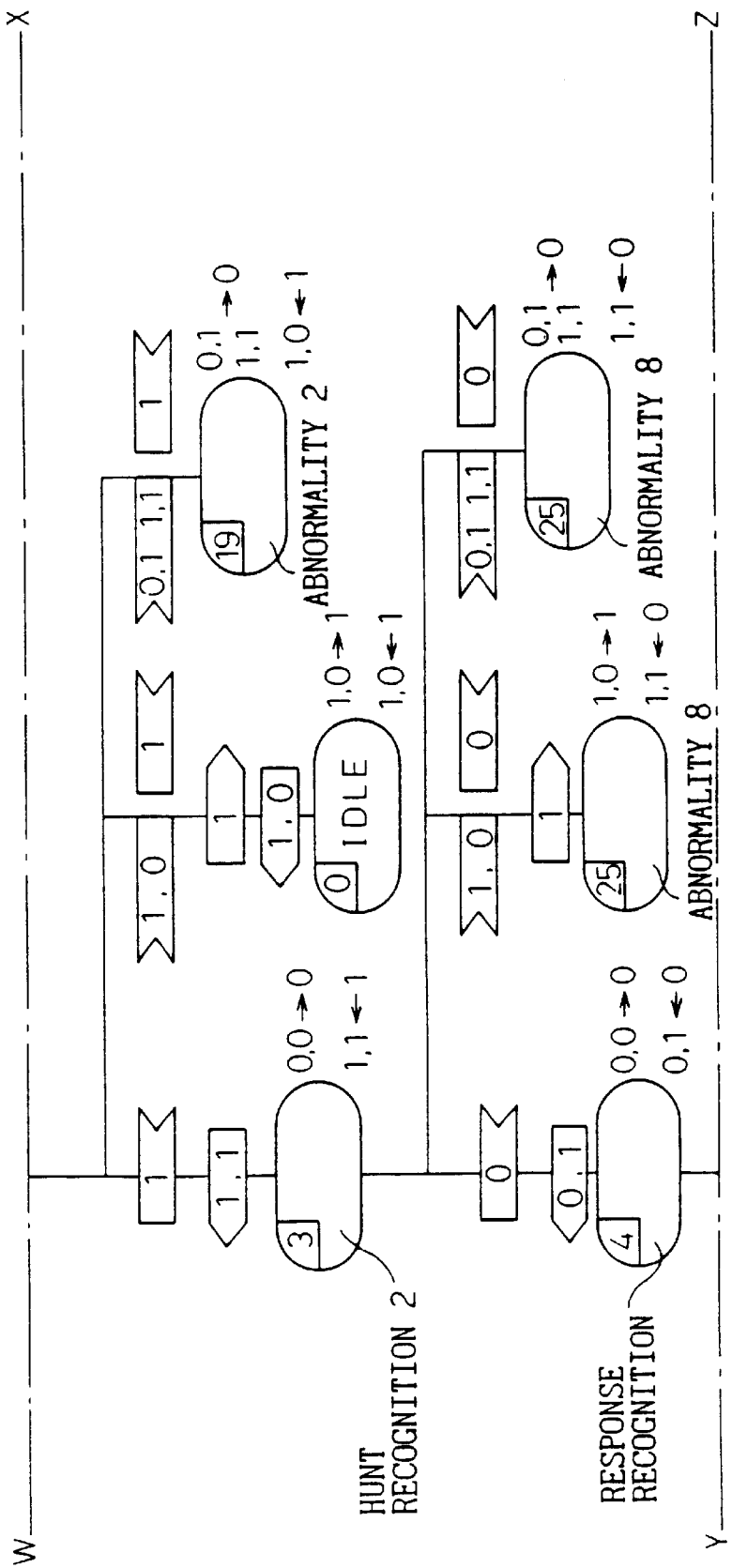
FIG. 21 is a second part of a state transition chart of the signaling signal conversion on the originating side where the simultaneous call termination occurs.
Figure 22:
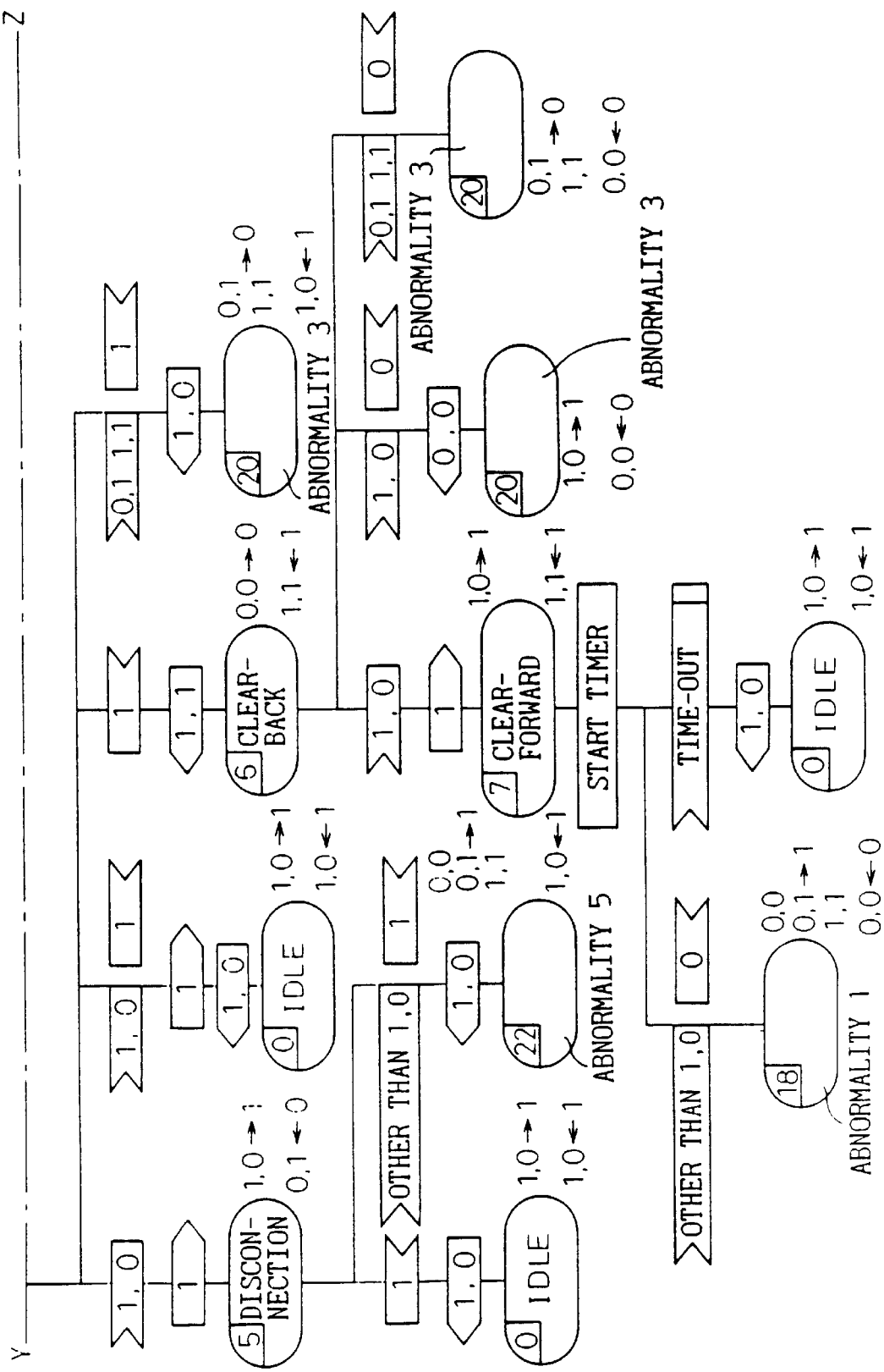
FIG. 22 is a third part of a state transition chart of the signaling signal conversion on the originating side where the simultaneous call termination occurs.
Figure 23:
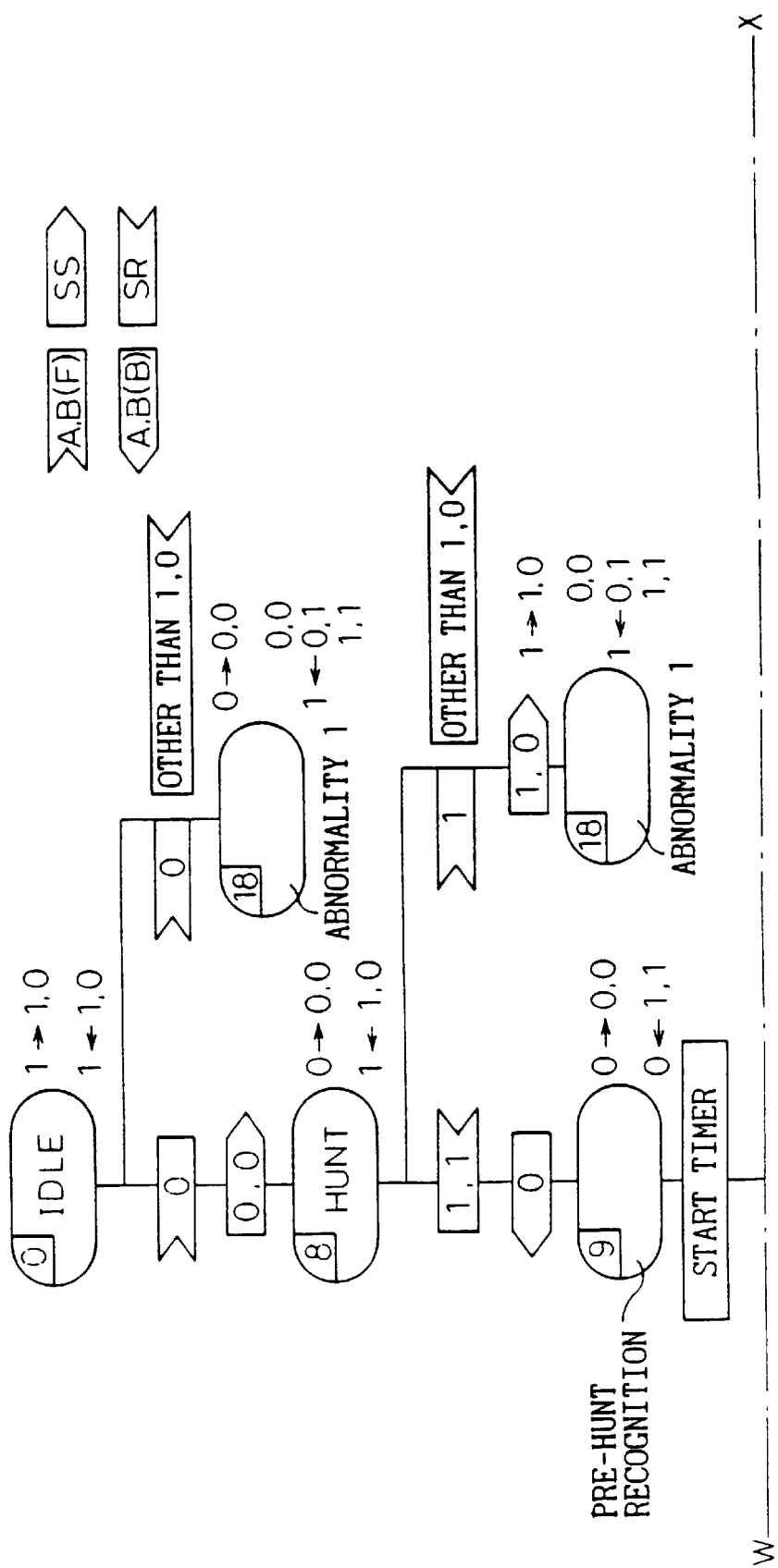
FIG. 23 is a first part of a state transition chart of the signaling signal conversion on the terminating side where the simultaneous call termination occurs.
Figure 24:
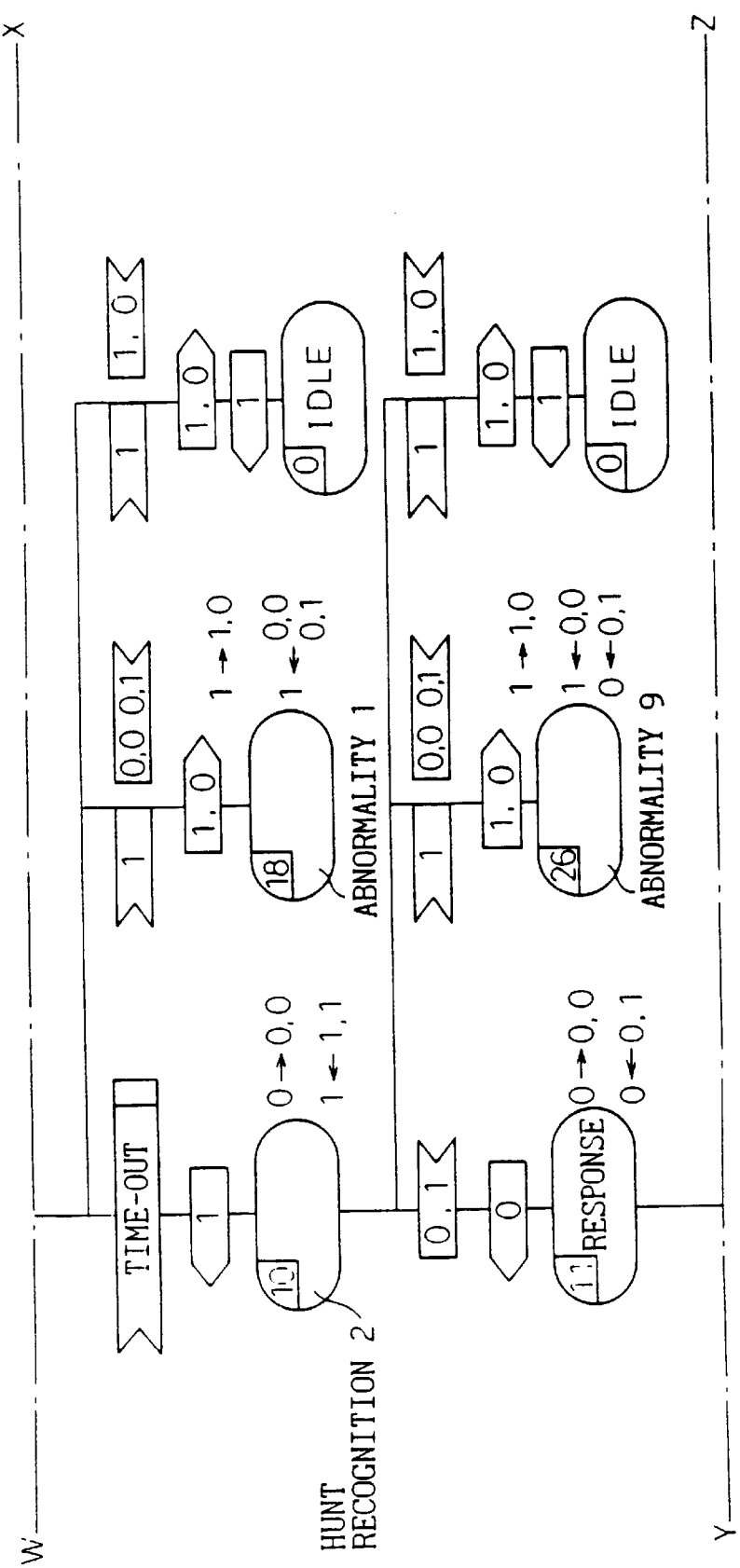
FIG. 24 is a second part of a state transition chart of the signaling signal conversion on the terminating side where the simultaneous call termination occurs.
Figure 25:
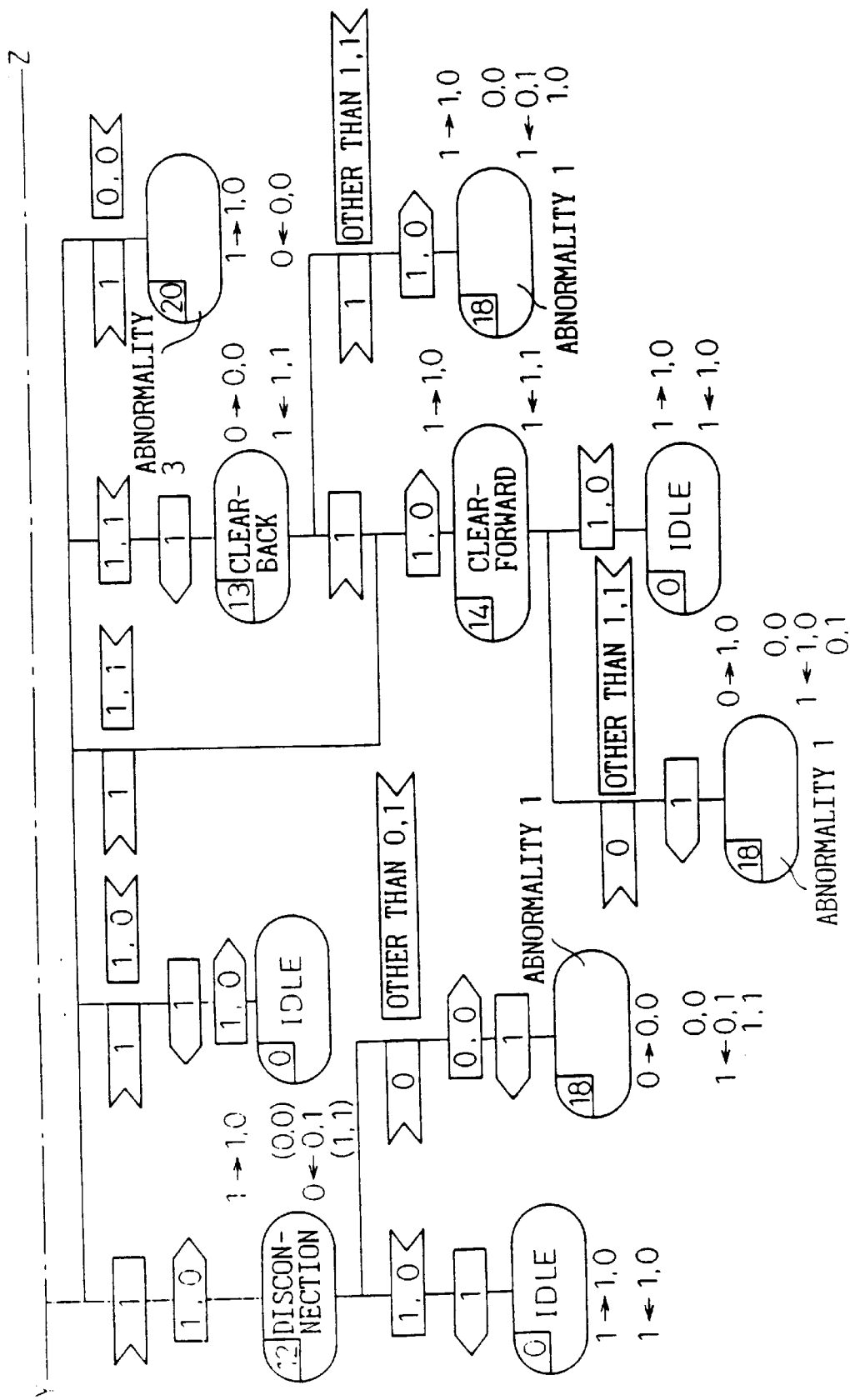
FIG. 25 is a third part of a state transition chart of the signaling signal conversion on the terminating side where the simultaneous call termination occurs.

FIG. 14, FIG. 15, and FIG. 16 are parts of a state transition chart of the signaling signal conversion at the originating side. FIG. 17, FIG. 18, and FIG. 19 are parts of a state transition chart of the signaling signal conversion at the terminating side. FIG. 20, FIG. 21, and FIG. 22 are parts of a state transition chart of the signaling signal conversion at the originating side where a simultaneous termination occurs. FIG. 23, FIG. 24, and FIG. 25 are parts of a state transition chart of the signaling signal conversion at the terminating side where a simultaneous termination occurs.

Where the signaling signal conversion sequence is realized by a ROM sequencer (sequence circuit) mentioned later, and further this is mounted and used in the time-division multiplexer, in addition to the sequences of the normal operations, sequences at abnormal operations when trouble such as an abnormal operation due to a transmission line error in the dedicated line (transmission line) and malfunctions at exchanges and holding of an abnormal state (to fall into a state where the state no longer changes at all until the power supply is disconnected) occurs must be considered. For this purpose, FIG. 14 to FIG. 25 show the state changes of the signaling signal conversion taking also various possible abnormal states into account in advance.

Explaining this in further detail, FIGS. 14 to 25 are state transition charts at the time of the signaling signal conversion of T.6←→SS/SR, in which FIGS. 14 to 16 are signaling signal conversion state transition charts of T.6←→SS/SR where T.6 serves as the originating side; FIGS. 17 to 19 are signaling signal conversion state transition charts of T.6←→SS/SR where T.6 serves as the terminating side; FIGS. 20 to 22 are signaling signal conversion state transition charts of T.6←→SS/SR where T.6 serves as the originating side, and then A, B (F) and SR simultaneously terminate; and FIGS. 23 to 25 are signaling signal conversion state transition charts of T.6←→SS/SR where T.6 serves as the terminating side, and then A, B (F) and SR simultaneously terminate.

The ways of viewing these figures are exactly the same, therefore FIG. 14 will be explained as a representative case. The four symbols a, b, c, and d shown at the right top of FIG. 14 denote the following:

Symbol a: Transmitting signaling signal (A, B (F)) from the T.6 repeater exchange II;

Symbol b: Received signaling signal (A, B (B)) at the T.6 repeater exchange II;

Symbol c: Transmitting signaling signal (SS) from the SS/SR repeater exchange I; and Symbol d: Received signaling signal (SR) at the SS/SR repeater exchange I.

Further, the blocks indicated by the reference symbol e are blocks showing the various states mentioned above. Accordingly, the numeral shown in the left top corner of each block represents the already mentioned state number. This state number becomes an input of the above ROM sequencer and also becomes the output.

The logic (0, 1) shown in the vicinity of each block represents the conversion of the signaling signal. For example, 1, 0→1 of the upper row shown adjoining the right of the block e of the "IDLE" state (state number 0) shown in the uppermost part of FIG. 14 indicates that, at the ROM sequencer, the transmitting signaling signal 1, 0 of two bits (A, B) are received from the T.6 repeater exchanges II to output SS=1, and thereby the received signaling signal of one bit (SR) to the SS/SR repeater exchange I becomes 1.

Further, 1, 0←1 of the lower row indicates that, at the ROM sequencer, the transmitting signaling signal of one bit (SS) is received as SR=1 from the SS/SR repeater exchange I to output the received signaling signal of two bits (A, B) as 1, 0, and thereby the signals A(B) and B(B) to the T.6 repeater exchange II become 1, 0. The same is true for the other blocks.

In actuality, the above conversions are not performed independently. Namely, as mentioned before, if the ROM sequencer receives, as its inputs, both the A, B(F)=1, 0 and SR=1 and also both the preceding station information ST and the time-out signal TO, and thus, a new state is determined to be "IDLE", the resultant signals A, B(B) and SS become A, B(B)=1 and SS=1.

In FIGS. 14 to 16, the route <1> indicated at the left side of FIG. 15 is the above normal sequence <1>, where the state number changes as 0→1→2→3→4→5→0. Further, similarly, a route <2> is the above other normal sequence <2>, where the state number changes as 0→1→2→3→4→6→7→0.

The blocks not existing on these routes are in an "ABNORMAL" state or "IDLE" state. Here, just this "ABNORMAL" state will be touched upon.

FIG. 26 and FIG. 27 are parts of a view of various abnormal states envisioned as occurring in the conversion process of the signaling signal.

In FIG. 8 to FIG. 13, the states from the state number 1 to the state number 14 were shown. FIGS. 26 and 27 show the states further added to these states as state numbers 18 to 26. Note that, the state numbers 15, 16, and 17 missing. As these three state numbers, states of various tests or loopback are allotted.

The state changes to the above abnormal states where A, B (F) or SR does not change according to the sequence. If the states of A, B (B) and SS were changed unsystematically at this time, it would become necessary to take into account all states and operations of all kinds of repeater exchanges and analog exchanges receiving this when thinking of the sequence. Therefore, in the case of an abnormal state, basically, the preceding states are held as they are and the states of A, B (B) and SS are not changed. Therefore, the abnormal states are set classified according to cases by taking into account the fact that the values of A, B (B) and SS are different according to the state number from which the state enters into the abnormal state. A table of the abnormal states is given in FIG. 26 and FIG. 27. In FIG. 26 and FIG. 27, the asterisks mean that either 0 or 1 can be taken. Further, where the state changes to an abnormal state, by receiving A, B (F)=1, 0 and SS=1, that state is maintained until the state is returned to "IDLE". This utilizes the fact that generally a exchange originally has a procedure for returning the state to the IDLE (release) state in the case of time running out when waiting to receive a signal.

A further explanation will be added referring to FIG. 14 to FIG. 16 again. In the figure, a normal sequence is a case where A, B (F)=0, 0 is received and the state becomes from IDLE to the "HUNT" state of the state number 1. When A, B (F)=0, 1 is received, it is an abnormal sequence, therefore the state changes to the state as abnormality 1 of state number 18. The state changes now from IDLE of state number 0, therefore A, B (B)=1, 0 and SS=1 quite equivalent to this IDLE are output as they are. In order to escape from this state, A, B (F) must be made equal to 1, 0 without a change of the value of SR.

After this, the operation routine cannot advance to the normal sequence unless A, B (F) becomes equal to 1, 0 and therefore the state once returns to IDLE of state number 0. Note, the case where A, B (F)=1, 1 is received after IDLE of state number 0 is an exceptional case. This is a state of "BLOCK" for restricting the origination and termination from the repeater exchange II. This is the state which cannot be defined as either a normal sequence or abnormal state.

Further, a case where a transmission line error on the transmission line and malfunctions in the exchanges occur simultaneously with a normal operation can be considered. Such a case is also an abnormal state, therefore the changes in state where A, B (F) and SR simultaneously terminate are shown in FIGS. 20 to 22 and FIGS. 23 to 25. FIGS. 20 to 22 are state transition charts of the signaling signal conversion of T.6←→SS/SR in the case where the T.6 repeater exchange II serves as the originating side and then A, B (F) and SR simultaneously terminate; and FIGS. 23 to 25 are state transition charts of the signaling signal conversion of T.6←→SS/SR in the case where the T.6 repeater exchange II serves as the terminating side and then A, B (F) and SR simultaneously terminate.

For example, in FIGS. 20 to 22, where the state is "HUNT" of state number 1, SR=0 is received and the state changes to the state of "PRE-HUNT RECOGNITION" of state number 2 in the normal mode. At this time, simultaneously with this, A, B (F)=1, 0, etc. are received due to the malfunction of the exchange and a connection failure of the cable for connecting the exchange and the time-division multiplexer, the system enters into the abnormal sequence, and the state becomes abnormality 2 of state number 19. The bits (logic) of A, B (B) and SS at this time are made to coincide with SS=0 and A, B (B)=1, 0 of state number 1 immediately before entering into the abnormal state, that is, "HUNT". Note, where A, B (F)=1, 0 is received, it is regarded that the exchange performs the operation of returning the state to IDLE only in this case, and SS is made equal to 1. Also the terminating side is set up so as to change the state to "IDLE".

The basic configuration for actually performing the mutual conversion between the SS/SR signaling signal and the T.6 signaling signal has been already explained referring to FIGS. 1, 2, and 3 based on the above explained sequences and state transitions. Therefore, the following explanation will be made of embodiments for concretely realizing this basic configuration.

Figure 28:
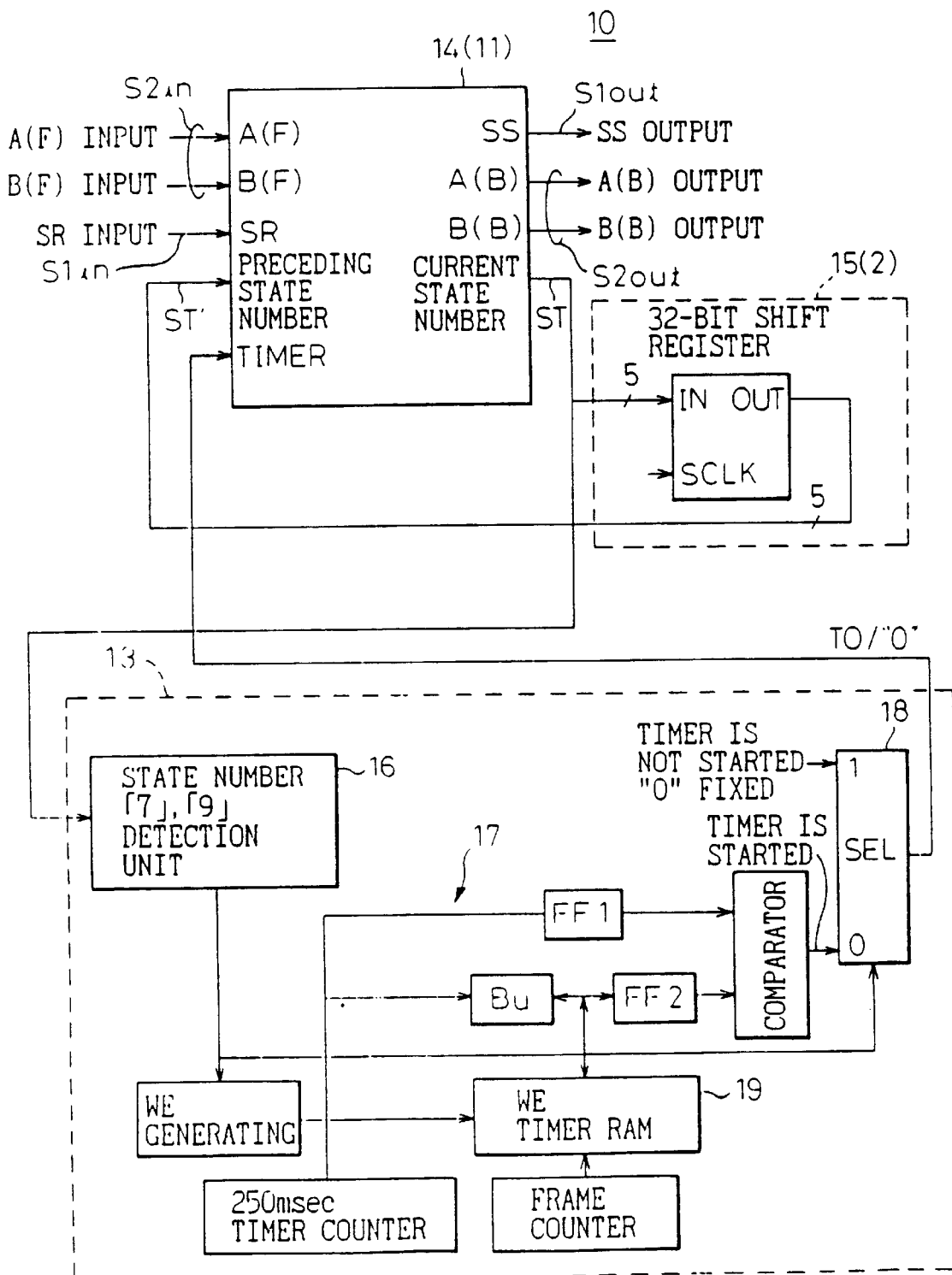
FIG. 28 is a view of an embodiment of the package shown in FIG. 1.

FIG. 28 is a view of an embodiment of the package shown in FIG. 1. In the package 10 shown in FIG. 1, the above signaling signal converting means 11 comprises a ROM 14. This ROM 14 receives as its inputs:

1) both the input first signaling signal S1in and second signaling signal S2in which should be mutually converted;

2) a time-out signal TO from the timer means (13 of FIG. 1); and 3) current state information held in the signaling signal holding means (12 of FIG. 1), i.e., preceding state information ST'.

Then, it acts as a sequencer which reads and outputs the mutually converted both first signaling signal S1out and second signaling signal S2out and current state information ST corresponding to the state transitions along a predetermined series of state transitions in accordance with these inputs.

Further, the above signaling state holding means 12 comprises a shift register 15. This shift register 15 acts so as to feed back to the signaling signal converting means 11 (ROM 14) as the above preceding state information ST' while holding the current state information ST until a frame containing the next signaling signal appears.

Further, the above timer means 13 is constituted by:

1) a state information detecting unit 16 for detecting that current state information ST matching with predetermined state information appears;

2) a counter unit 17 started when this state information detecting unit 16 detects the appearance; and 3) a selector unit (SEL) 18 which applies the second logic ("0") to the signaling signal converting means 11 (ROM 14) in place of the time-out signal TO of the first logic ("1") in a fixed manner when this state information detecting unit 16 does not detect the appearance, while applies the time-out signal TO of the first logic ("1") to the signaling signal converting means 11 (ROM 14) in place of the second logic ("0") when this state information detecting unit 16 detects the appearance.

The embodiment of FIG. 28 will be explained in further detail. The ROM 14 is constituted as a so-called signaling state machine. The signaling signal conversion sequence and state transitions explained before are written in this. This signaling state machine becomes a sequencer which receives as its inputs the illustrated A (F) input, B (F) input, SR input, and preceding state number (ST') and the time-out input (TO) and outputs the SS output, A (B) output, B (B) output, and the current state number (ST).

The signaling state holding means 12 is constituted by a 32-bit shift register 15 and holds the current state number (ST) until the bit comparison is carried out again at the same channel in the next frame.

The timer means 13 is constituted by a timer RAM 19 and a peripheral circuit thereof, detects whether the state number (ST) output from the signaling state machine (ROM 14) is the state number 7 of "CLEAR FORWARD" which is the condition under which the timer means 13 must be started or the state number 9 of the "PRE-HUNT RECOGNITION" at the state information (number) detecting unit 16. Where the state number becomes either of them, the selector unit 18 is switched to its timer starting side and, at the same time, issues WE (Write Enable) to the timer RAM 19. After the timer RAM 19 is brought to the writing state, the count output from the 250 msec timer counter counting up one for every 2.5 msec from 0 to 99 is written into the timer RAM 19 via a buffer Bu. The buffer Bu is employed to use the timer RAM 19 in a time-division manner for reading and writing.

The count output from the 250 msec timer counter written into the timer RAM 19 is read out whenever the channel of each frame arrives in accordance with the frame synchronization output from the frame counter and is held at a flip-flop FF2. Further, the value obtained by counting up the 250 msec timer counter by one is held at a flip-flop FF1. These two held values are compared at a comparator. When both values coincide, the time-out signal TO is output from the timer means 13. In this way, as shown in FIGS. 29 to 32 mentioned later, 30 channels of signaling worth of multiplex processing by the 250 msec timer operation is carried out. Thus, by the package 10, conversion among the different kinds of signaling signals of SS/SR signaling signal and T.6 signaling signal is realized.

FIG. 29 to FIG. 32 are parts of a timing chart representing the operation of the package 10 shown in FIG. 28.

Figure 29:
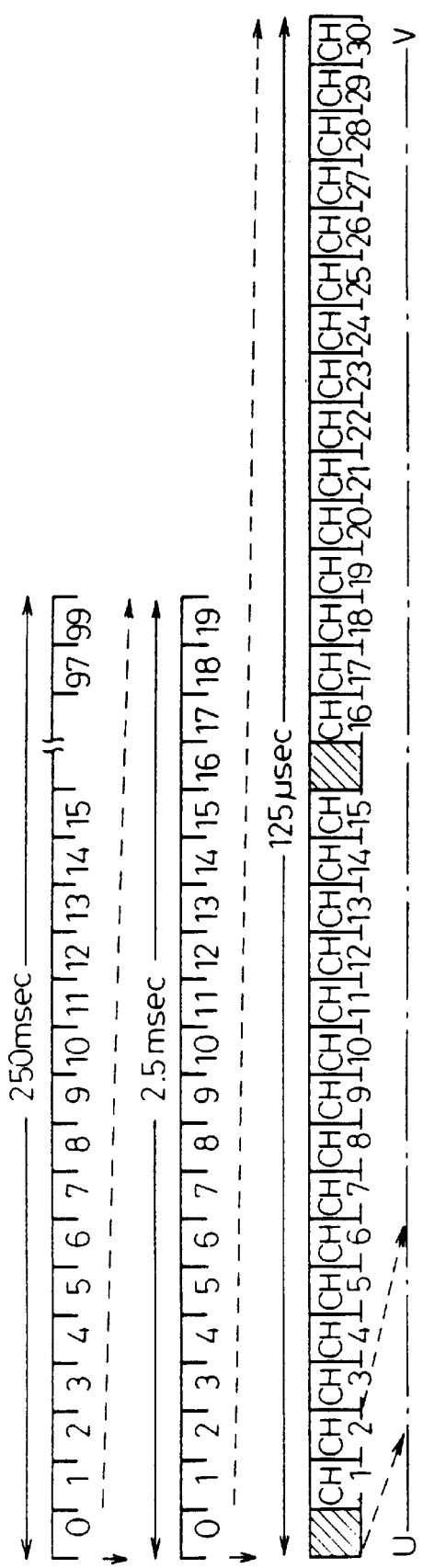
FIG. 29 is a first part of a timing chart representing an operation of a package 10 shown in FIG. 28.

In FIG. 29, the upper part shows the count value counted up every 2.5 msec from 0 to 99. The middle part shows in an enlarged fashion each count value in the upper part. Each count value corresponds to 2.5 msec. This 2.5 msec corresponds to 20 frames. The lower parts indicates one frame of the middle part in an enlarged fashion and corresponds to 125 μsec. This 125 μsec is segmented into 30 channels (CH)+2 channels.

Figure 30:
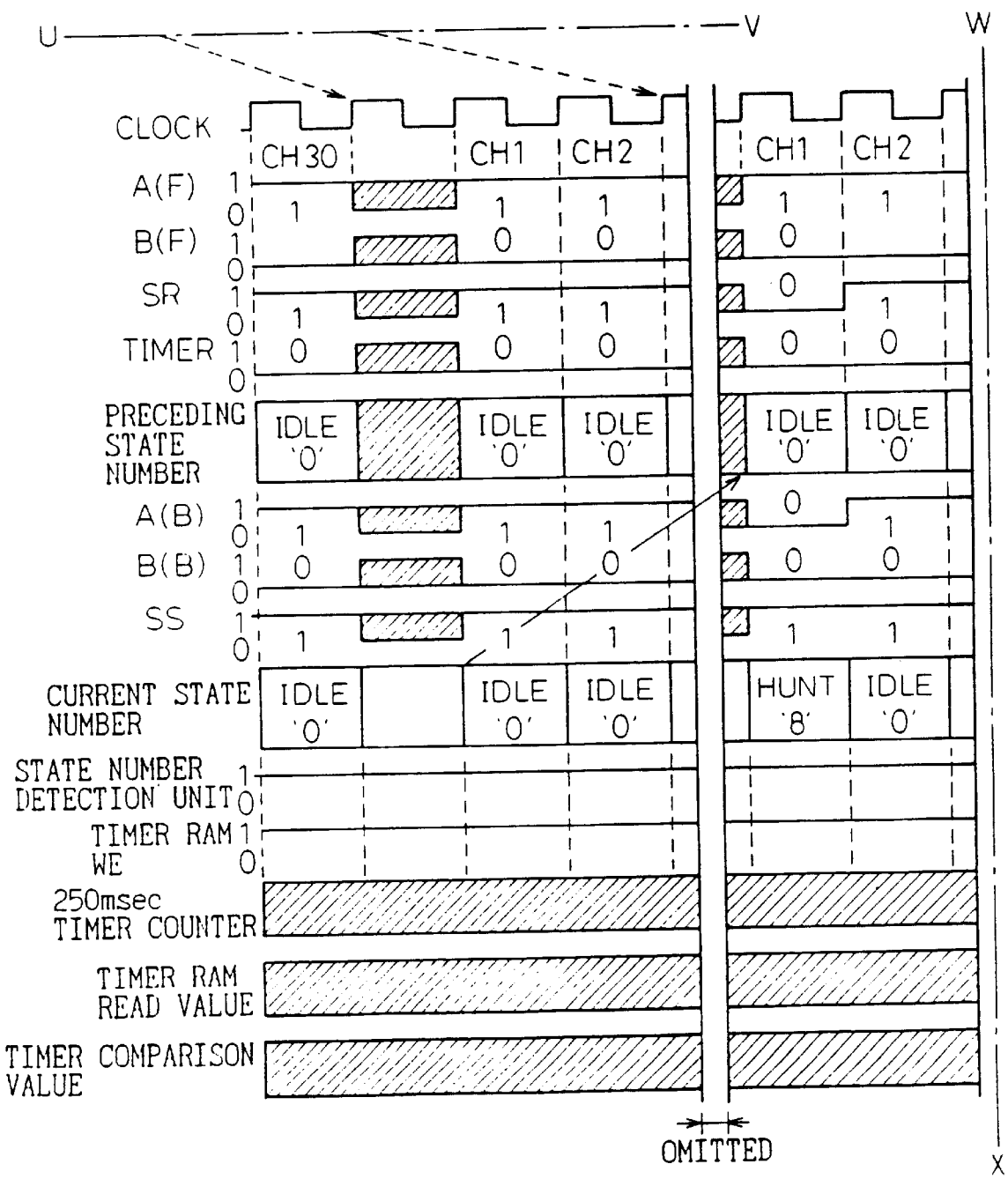
FIG. 30 is a second part of a timing chart representing the operation of the package 10 shown in FIG. 28.

The items of the timing chart, that is, A (F), B (F), SR, . . . are shown at the left side of FIG. 30. Each item is disclosed in the structure of FIG. 28 explained above. Note, each item of the timing chart is shown with the first channel CH1 as the center.

Figure 31:
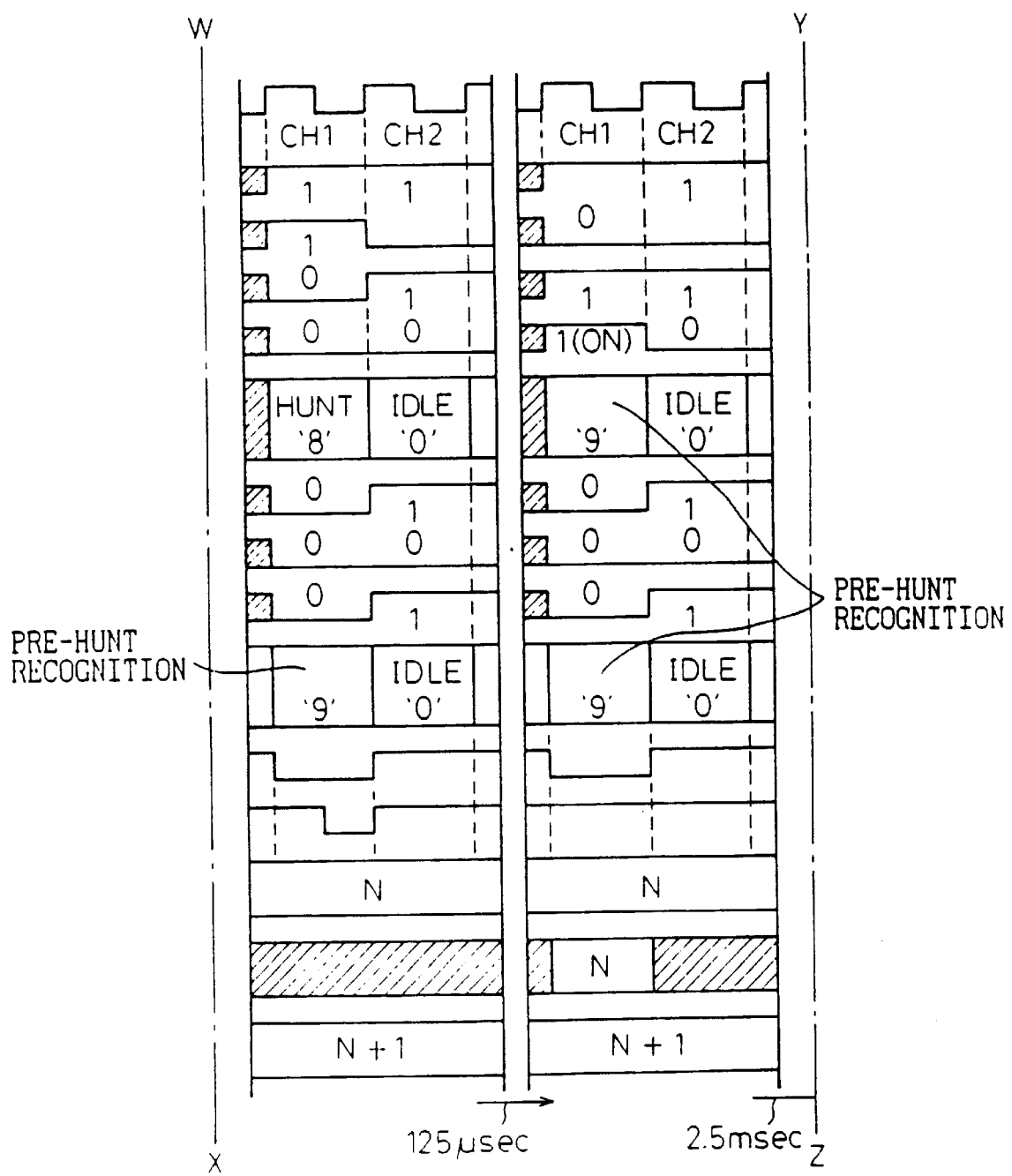
FIG. 31 is a third part of a timing chart representing the operation of the package 10 shown in FIG. 28.
Figure 32:
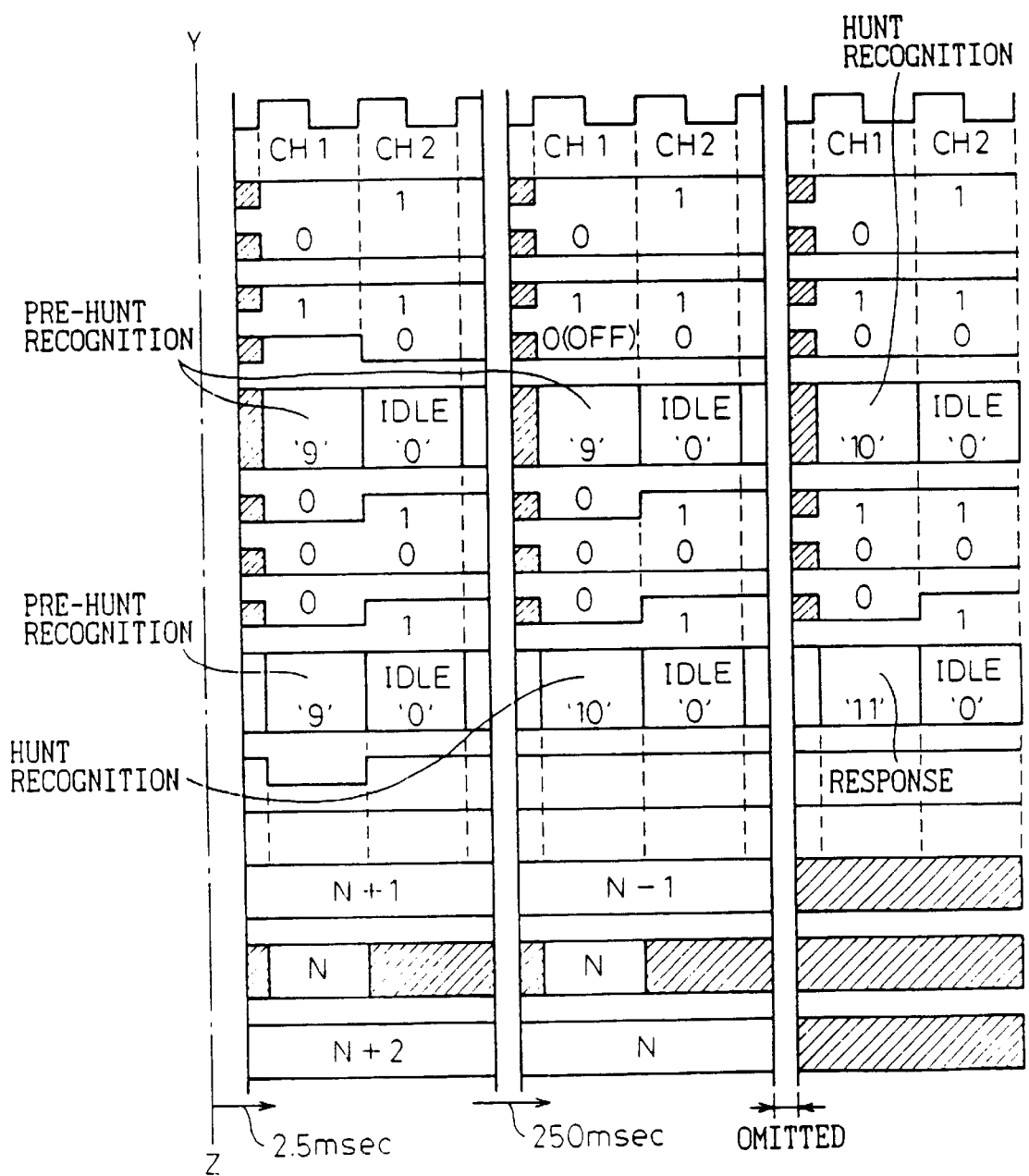
FIG. 32 is a fourth part of a timing chart representing the operation of the package 10 shown in FIG. 28.

In FIG. 30, in the timing chart showing "current state number", "IDLE" appearing second (state number 0) is fed back as "IDLE" (state number 0) appearing fourth in the part of the timing chart representing "preceding state number" in the next frame (refer to right-up arrow in the figure). Other than this, also "HUNT" (8) and "PRE-HUNT RECOGNITION" (9) shown in FIG. 31 are similarly fed back to the shift position along the above right-up arrow. Note that, the regions of hatching in the figure are regions where any state may be present (Don't care).

In FIG. 30, concerning "SR" and "TIMER", the logic was (1, 0) in CH1 of the initial first frame, but changes to (0, 0) in CH1 of the next second frame. At this time, "preceding state number" is 0 (IDLE), and, at the same time, A (F) and B (F) are (0, 0), therefore in CH1 of the second frame, "current state number" becomes 8 (=HUNT). The conversion outputs A (B) and B (B) and SS at this time are (0, 0, 1). The same explanation applies to below.

Further, in FIG. 31, the timer means is activated as represented by the lower three parts of the timing chart when the "current state number" becomes 9 (=PRE-HUNT RECOGNITION) in FIG. 31. Then, in FIG. 32, when both values shown in the lower two parts of the timing chart become N and coincide, the "current state number" shifts to 10, that is "HUNT RECOGNITION".

Figure 33:
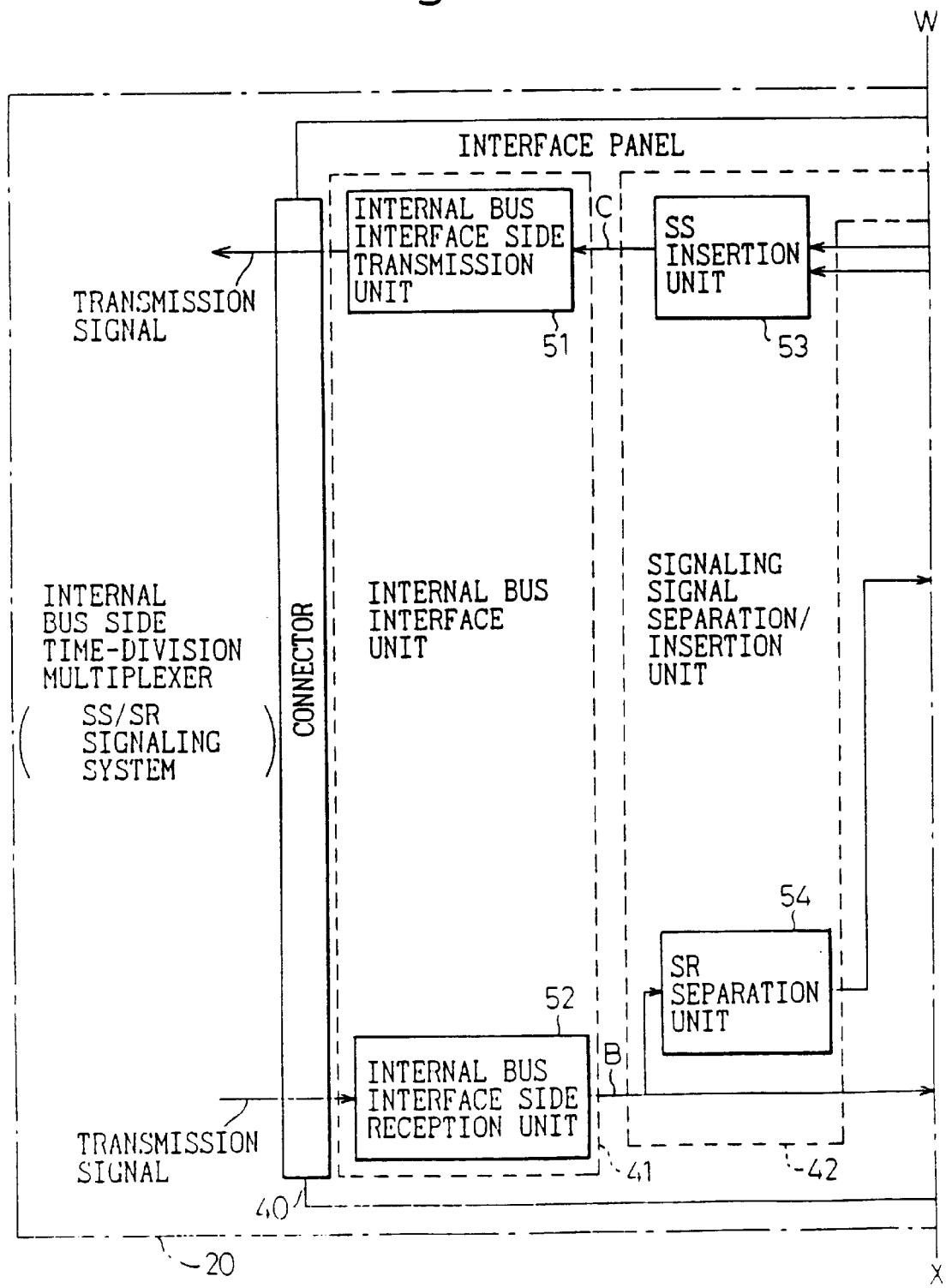
FIG. 33 is a first part of a view of a concrete example of a time-division multiplexer shown in FIG. 2.
Figure 34:
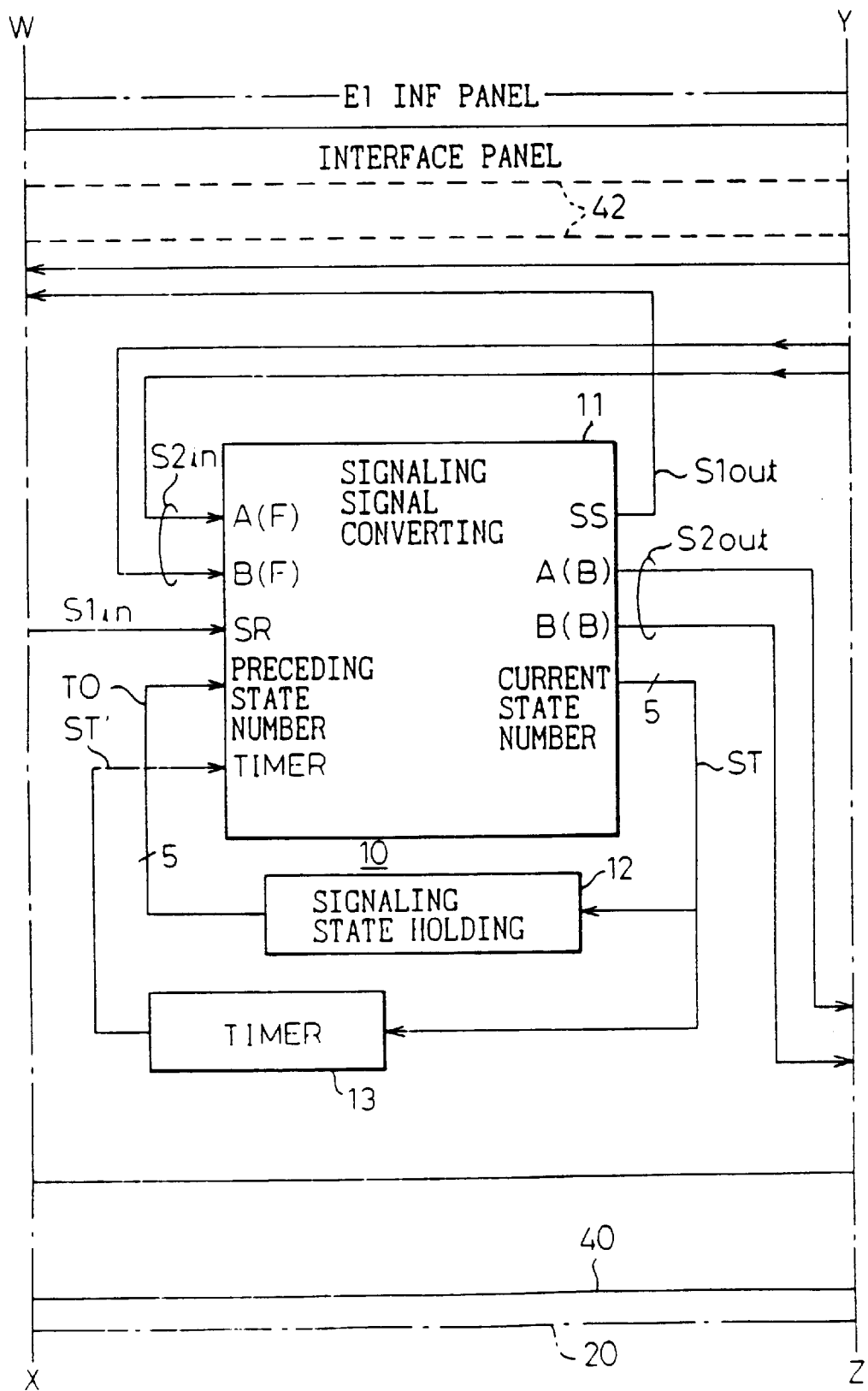
FIG. 34 is a second part of a view of a concrete example of the time-division multiplexer shown in FIG. 2.
Figure 35:
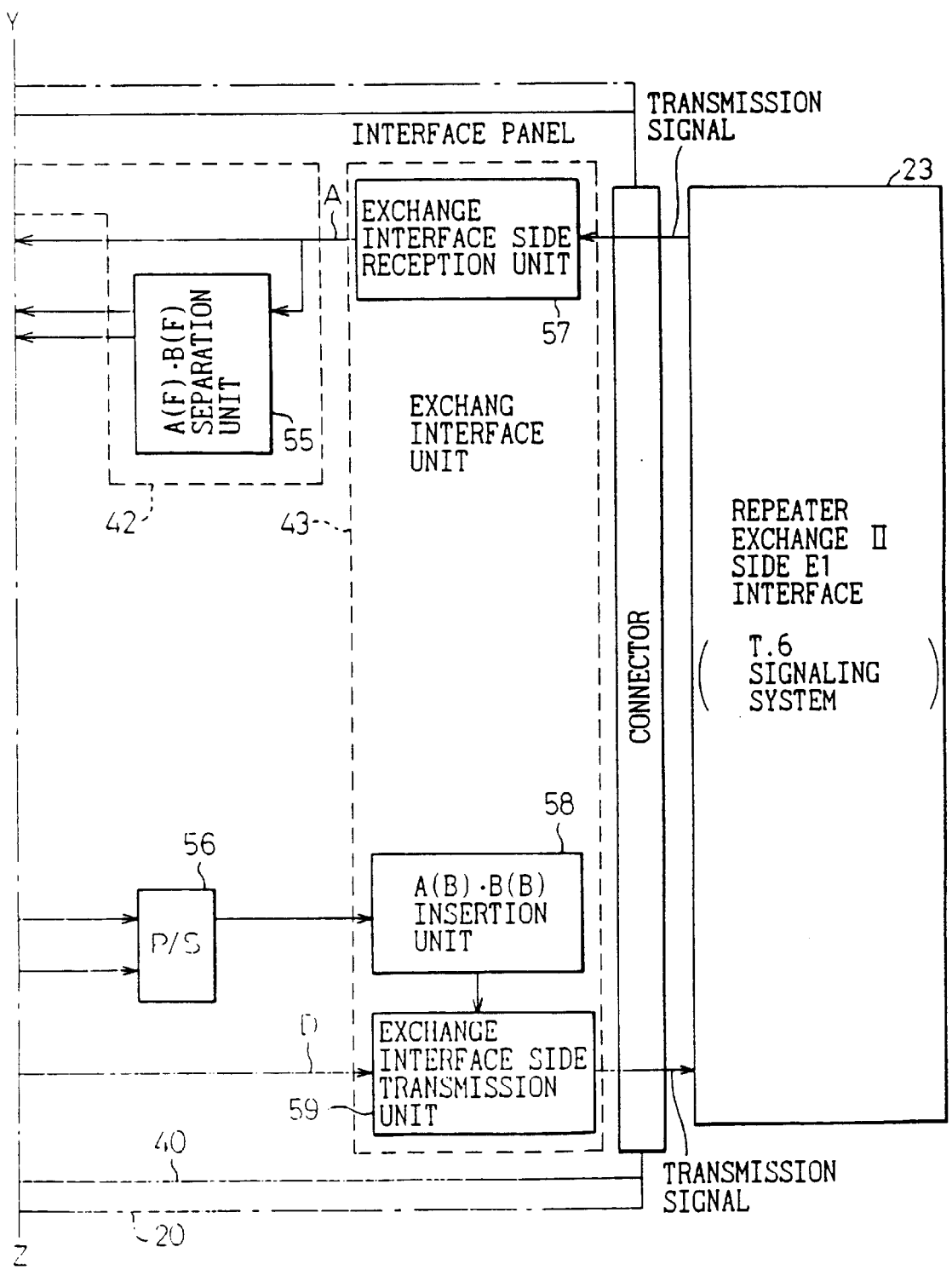
FIG. 35 is a third part of a view of a concrete example of the time-division multiplexer shown in FIG. 2.

FIG. 33, FIG. 34, and FIG. 35 are parts of a view of a concrete example of the time-division multiplexer shown in FIG. 2.

One of the characteristic features of the present invention resides in the fact that the above package 10 is incorporated in the time-division multiplexer 20. Namely, it resides in the time-division multiplexer integrally including the package 10 performing the mutual conversion between the first signaling signal S1 and the second signaling signal S2. Here, the package 10 comprises, as mentioned above, <1> the signaling signal converting means 11 for outputting the mutually converted both first signaling signal S1out and second signaling signal S2out and outputting the current state information ST based on the preceding state information ST' represented by the preceding both first signaling signal S1 and second signaling signal S2 and the current both first signaling signal S1 and second signaling signal S2; <2> the signaling state holding means 12 for holding the current state information ST up to the frame where the next signaling signal appears; and <3> the timer means 13 which is started when detecting that current state information ST matching with predetermined state information appears and outputting a time-out signal after an elapse of the predetermined time. The signaling signal converting means 11 is constituted so as to receive input both the first signaling signal S1in and second signaling signal S2in which should be mutually converted, receive the current state information ST held in the signaling state holding means 12 as the preceding state information ST', and further receive the time-out signal TO from the timer means 13 and output the mutually converted both first signaling signal S1out and second signaling signal S2out and the current state information ST in accordance with the combination of these received signals, respectively.

Referring to FIGS. 33 to 35, the time-division multiplexer 20 has an interface panel 40 (FIGS. 33 to 35) mounting the package 10 (FIG. 34) thereon. This interface panel 40 mainly comprises a signaling signal separation/insertion unit 42, internal bus interface unit 41, and an exchange interface unit 43.

The signaling signal separation/insertion unit 42 respectively separates the first signaling signal S1 and second signaling signal S2 from each transmission signal on the transmission side and reception side transmitted via the time-division multiplexer 20, inputs the same to the package 10, and, at the same time, inserts both the first signaling signal S1out and second signaling signal S2out which are mutually converted at this package 10 into each transmission signal.

The internal bus interface unit 41 is connected to the internal bus (refer to 62 of FIG. 44) provided in each time-division multiplexer 20 for performing the transmission and reception control of the first signaling signal S1.

The exchange interface unit 43 is for performing the transmission and reception control of the second signaling signal S2 with an external exchange 23 (FIG. 35).

According to the embodiment of FIGS. 33 to 35, first, the internal bus interface unit 41 (FIG. 33) comprises an internal bus interface side reception unit 51 and an internal bus interface side transmission unit 52.

Further, the signaling signal separation/insertion unit 42 (FIGS. 33 to 35) comprises an SS insertion unit 53, an SR separation unit 54, and A (F), B (F) separation unit 55. SS and SR are one example and represent the 5 transmission and reception signaling signals of the first signaling signal (SS/SR signaling signal).

Further, the exchange interface unit 43 (FIG. 35) comprises an exchange interface side reception unit 57, exchange interface side transmission unit 59, and A (B), B (B) insertion unit 58 giving insertion signaling bits to this transmission unit 59.

The above A (F), B (F) and A (B) and B (B) are one example and are the two bits of transmission and two bits of reception of the above second signaling signal (T.6 signaling signal), respectively.

Note that, a block (P/S) 56 shown in FIG. 35 is a parallel/serial converter and converts the two bits of A (B) and B (B) in total to a serial bit train.

As a detailed example of the time-division multiplexer 20 of FIGS. 33 to 34 mentioned above, the interface panel 40 is an E1 interface panel. Further, the exchange interface unit 43 is an E1 interface unit. Accordingly, the exchange interface side reception unit 57 is an E1 interface reception unit, and the exchange interface side transmission unit 59 is an E1 interface transmission unit. The external exchange 23 opposing to these units is the repeater exchange II (including the E1 interface of the T.6 signaling system).

Below, the operation in the case of the above detailed example will be explained, but before this, a simple description will be made of the data format and signaling format in relation to the operation of this detailed example by referring to FIG. 36 to FIG. 43.

Figure 36:
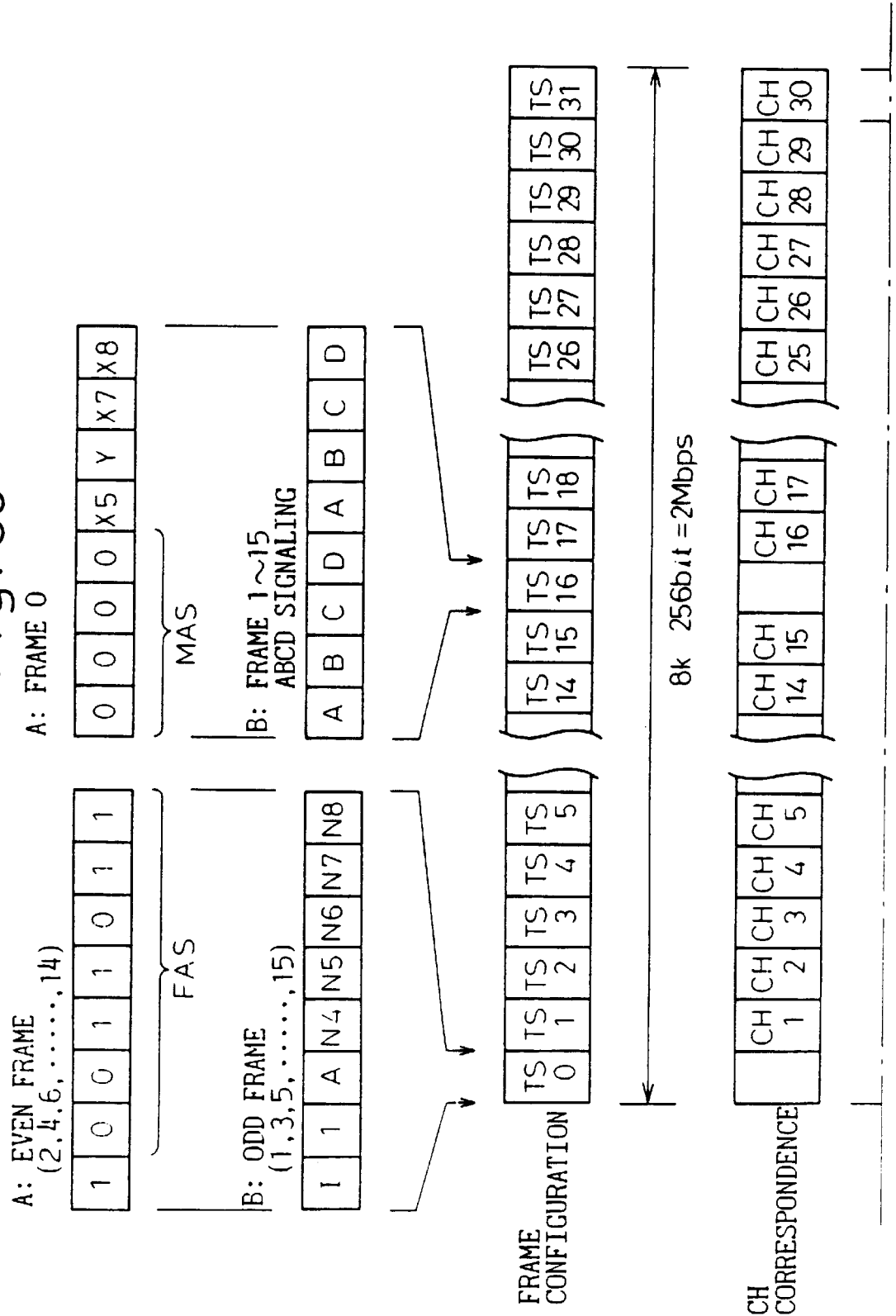
FIG. 36 is a first part of a view of a format of an E1 interface data.
Figure 37:
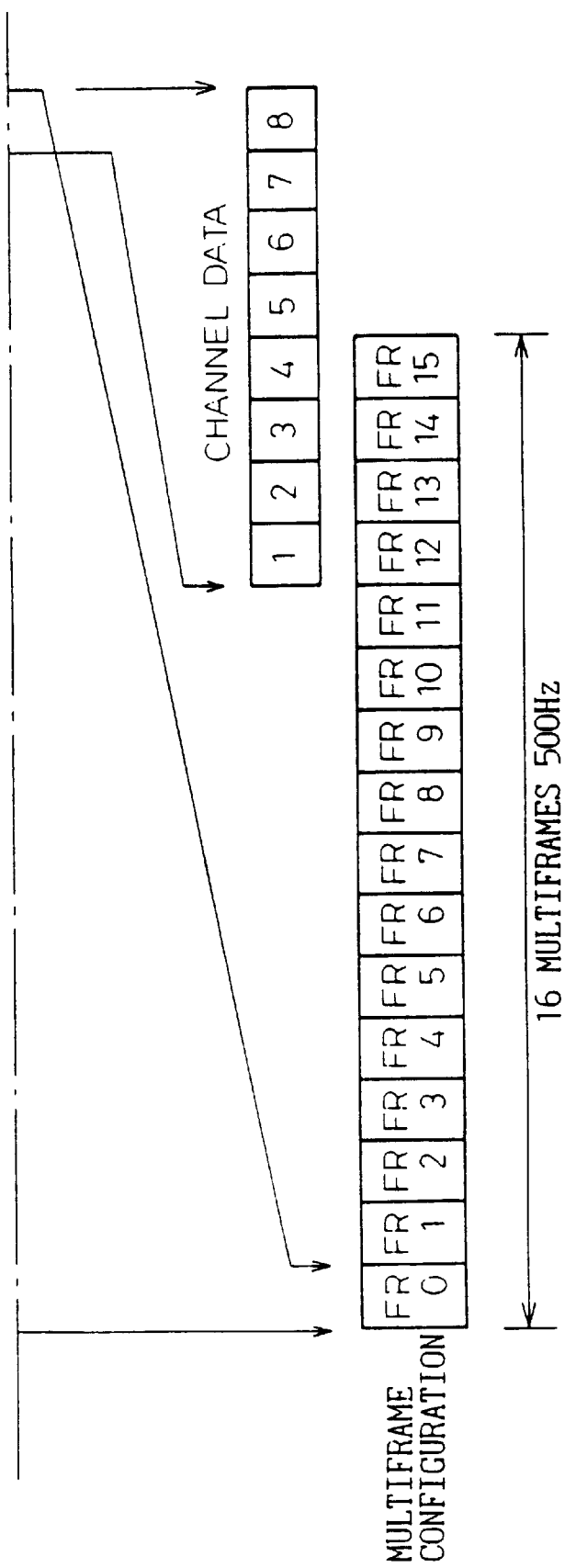
FIG. 37 is a second part of a view of the format of the E1 interface data.

FIG. 36 and FIG. 37 are views of the format of the E1 interface data.

In these figures, the parts having a particular relationship with the present invention are the ABCD signaling bits shown in FIG. 36. Note, the bits of C and D are unused.

The above signaling bits A and B are placed in the time slot 16 (TS16) in frames composed of 32 time slots (TS0 to TS31). These time slots are set to correspond with 30 channels (CH1 to CH30) for placing the speech data among transmission signals (=speech data+signaling bits). The signaling bits are transferred in the above time slot TS16 to which these channels (CH) are not allotted.

Each of the channels containing the speech data is comprised by 8-bit channel data shown in FIG. 37. 30 channels (CH1 to CH30) each comprising that channel data and signaling bits form one multiframe composed of 16 frames FR0 to FR15.

Note that, the meanings of main symbols A, Y, ... shown in FIG. 36 are clearly described in the lowermost part of FIG. 37.

FIG. 38 and FIG. 39 are parts of a format diagram showing the bit configuration of the time slot TS16 in FIG. 36 for every frame (FR).

For example, referring to FIG. 38, in the second frame FR1 of the TS16, the signaling bits A to D for speech data of CH1 and signaling bits (A to D) for speech data of CH16 are shown. Similarly, signaling bits A to D corresponding to the channels (CH) in the frames FR2, FR3, ... are shown. Note that, as mentioned above, C and D among the signaling bits A to D are unused and are always fixed to C=0 and D=1.

Figure 40:
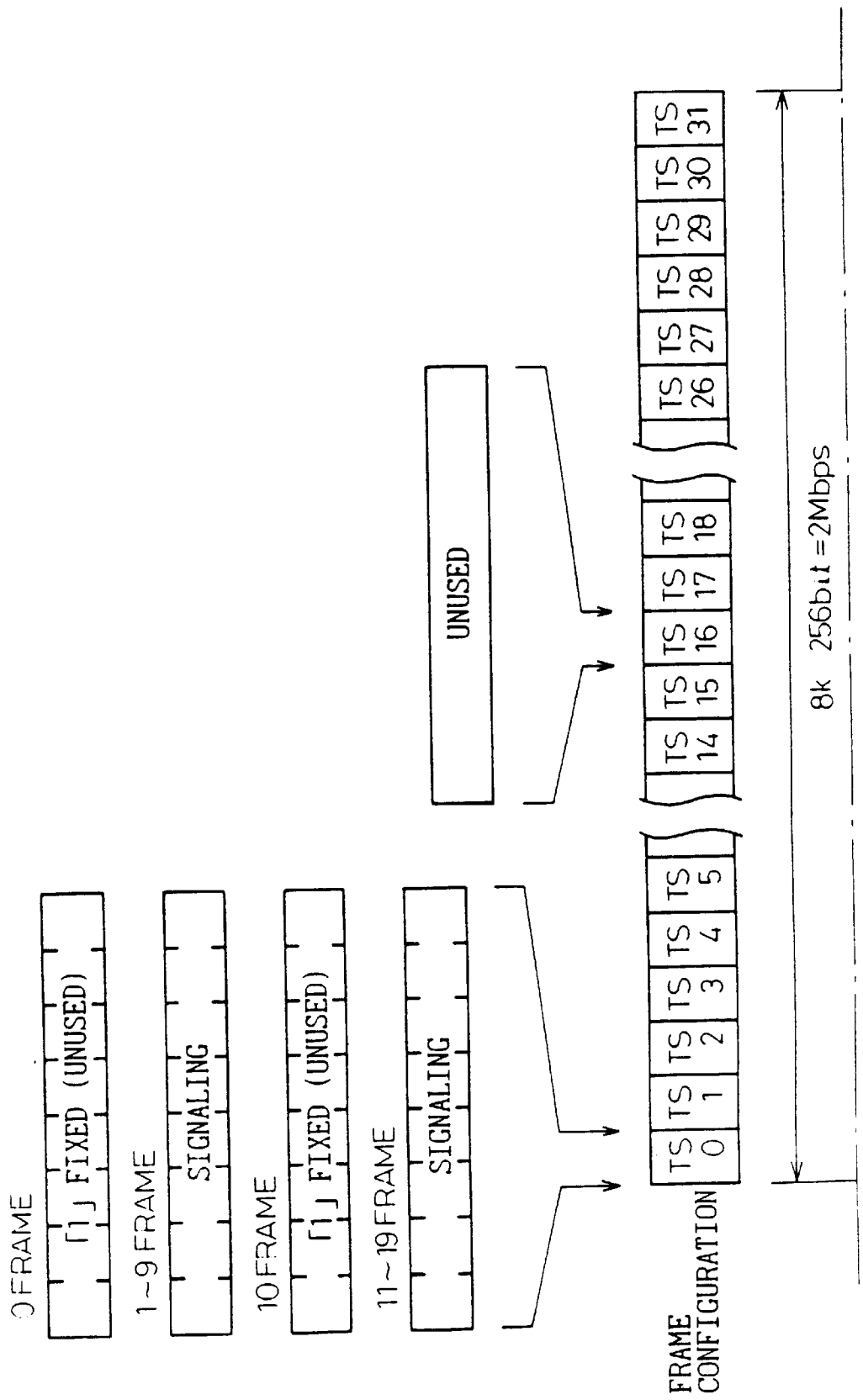
FIG. 40 is a first part of a format diagram of data in the time-division multiplexer 20.
Figure 41:
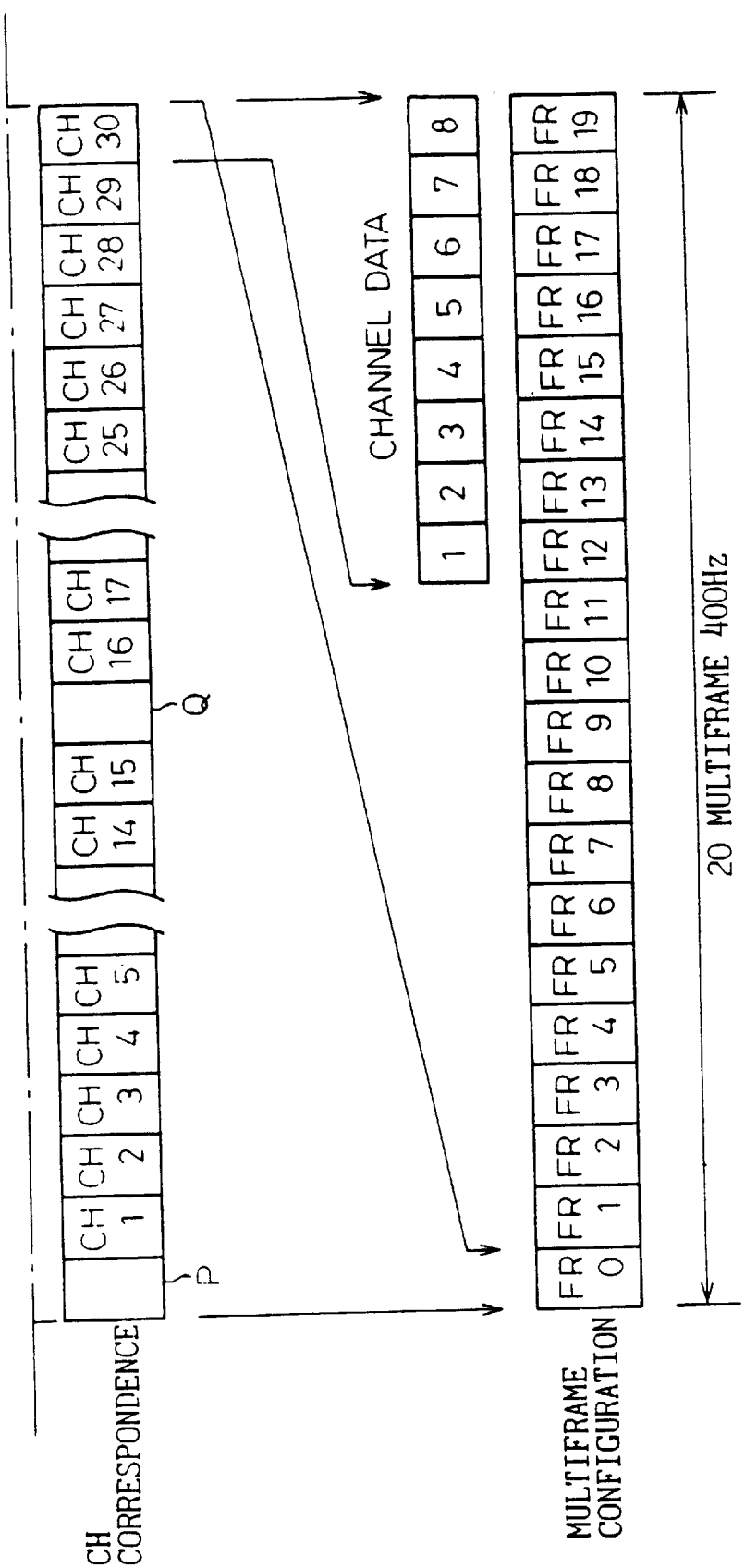
FIG. 41 is a second part of a format diagram of data in the time-division multiplexer 20.

FIG. 40 and FIG. 41 are parts of a format diagram of the data in the time-division multiplexer 20.

In the time-division multiplexer 20, the signaling bits are inserted into the time slot TS0 of FIG. 40. 32 time slots up to TS31 containing this TS0 are set corresponding to the channels (for speech data) CH1 to CH30 shown in FIG. 41 and channels P and Q for data other than the speech data. Each channel contains the channel data of 8 bits as shown in FIG. 41. CH1 to CH30+P+Q comprise one frame (FR), and these 20 frames compose multiframes (FR0 to FR19).

Figure 42:
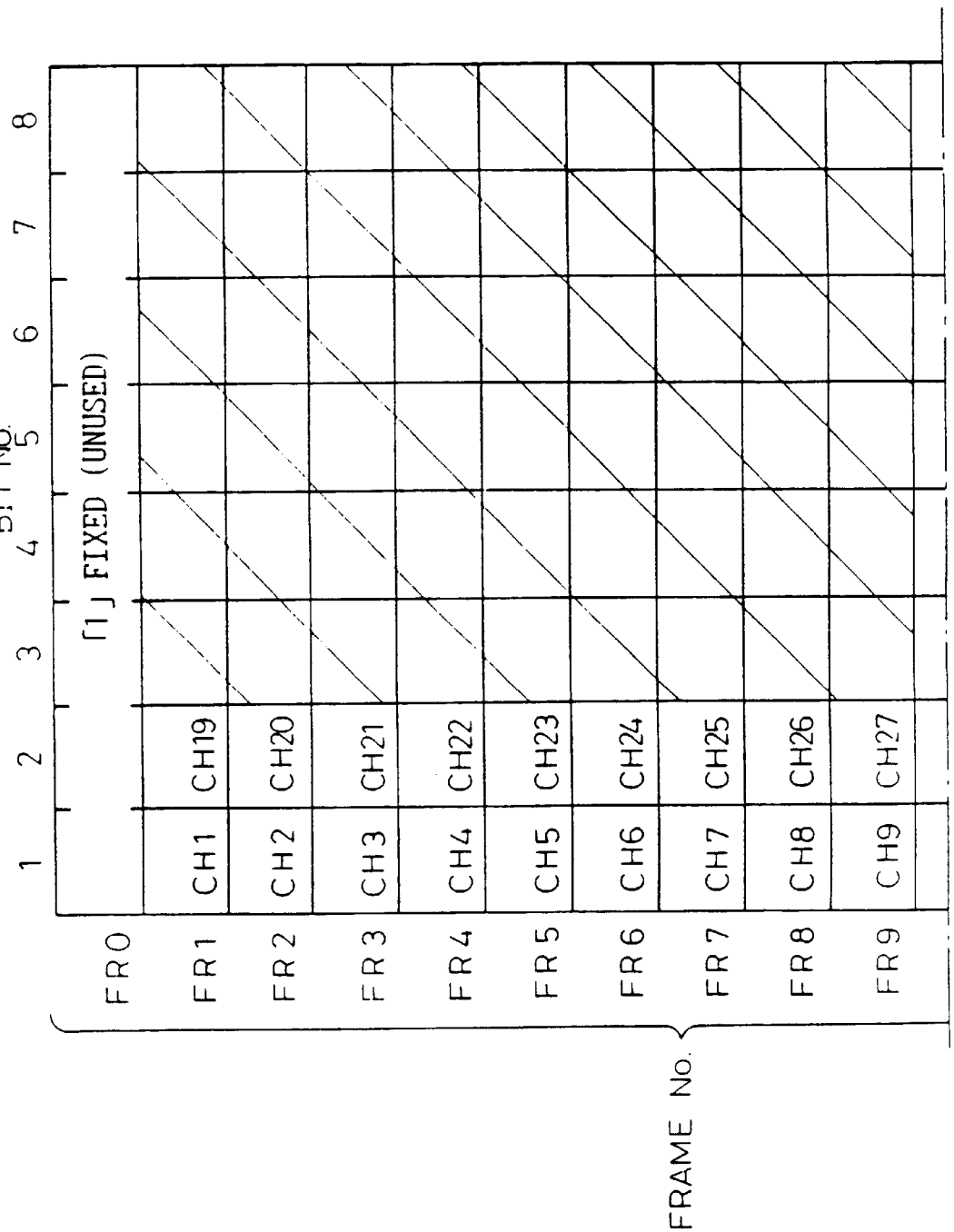
FIG. 42 is a first part of a format diagram representing a signaling bit in the time slot TS0 in FIG. 40 by correspondence with each channel for each frame.

FIG. 42 and FIG. 43 are parts of a format diagram representing the signaling bits in the time slot TS0 in FIG. 40 by correspondence between the frames and channels.

In each frame, 2 bits among 8 bits (first bit and second bit in the figure) are disposed respectively allotted to a pair of channels (CH1, CH19), (CH2, CH20), ... The remaining six bits are unused and are always fixed to 1.

Returning to FIGS. 33 to 35 again, the operation of the detailed example of the time-division multiplexer will be explained. First, data having the E1 frame format shown in FIGS. 36 and 37 transmitted from the repeater exchange II (external exchange 23) of FIG. 35 is received. Frame synchronization of E1 and the multiframe synchronization are established at the E1 interface reception unit (exchange interface side reception unit 57) in the E1 interface unit (exchange interface unit 43) and applied to the internal portion of the card (interface panel 40) (A of FIG. 35). Thereafter, all received data are written into a RAM (not illustrated) existing in the A (F), B (F) separation unit 55 in the signaling signal separation/insertion unit 42. Only the A (F) and B(F) signaling signals placed in TS16 in the E1 frame shown in FIGS. 38 and 39 are read from the RAM. By this, the signaling bits A (F) and B (F) are separated. Here, simultaneously, also a sampling conversion to the signaling signal of 400 Hz which is the signaling format of the internal portion of the card shown in FIGS. 42 and 43 from the signaling signal of 500 Hz in the E1 frame is carried out. The speech data is sent to the internal bus interface unit 41 of FIG. 33 as it is.

Further, 2 Mbps worth of data, which is the frame length of the E1 interface, is fetched from the internal bus of the card via the internal bus interface unit 41 and sent to the internal portion of the card (B of FIG. 33). This 2 Mbps is equivalent to 64 kbps×32 TS. In actuality, there is a TS to which the frame of E1 is added in the E1 interface transmission unit 59 in the E1 interface unit (43), therefore 30 TS (CH) worth of speech data and 1 TS worth of the signaling data are received from the internal bus of the card.

Thereafter, all data received from the internal bus interface unit 41 are written into a RAM (not illustrated) placed in the SR separation unit 54 of the signaling signal separation/insertion unit 42, and only the SR signaling signal is read, thereby separating the SR signaling signal. The speech data is sent to the direction of the E1 interface unit 43 as it is.

The signaling signals A (F), B (F), and SR separated in this way are sent to the signaling signal converting means 11, where the state transition for the signaling signal conversion is controlled under the input of these signals. This signaling signal converting means 11 comprises a ROM as already mentioned and has become a sequencer for operating the state transition for the signaling signal conversion as shown in FIGS. 8 and 9 and FIGS. 10 and 11. In the operation surrounding this sequencer, as mentioned referring to the previous FIG. 28, first, as the input of this ROM sequencer (11), other than the A (F), B (F), and SR, the preceding state number and ON/OFF value of the timer (13) are input. Under these inputs, A (B), B (B), SS, and the current state number are output. The output current state number is sent to the signaling state holding means 12, where the value of the state number is held until the state transition at the same CH which arrives again is carried out, and then the value of the state number is fed back as the input of the preceding state number with respect to the ROM sequencer (11).

Further, the timer includes a hard timer of 250 msec (250 msec timer counter of FIG. 28) and forms the input (TIMER) of the ROM sequencer (11). When there is an appearance of the pre-hunt recognition of state number 9 during the conversion such as T.6 signaling signal (origination)→SS/SR signaling signal (termination), an appearance of the clear forward of state number 7 due to the disconnection from the terminating side, and conversion such as SS/SR signaling signal (origination)→T.6 signaling signal (termination), the above input becomes ON (1). The state is changed when that input becomes OFF (0) by the time-out (TO).

It is also one of the characteristic features of the present invention that the state of the timer is directly input as the input of the ROM sequencer in this way and the mutual state conversion is carried out.

Next, after the output signaling signal SS is written into the RAM (not illustrated) placed in the SS insertion unit 55 of the signaling signal separation/insertion unit 42 of FIG. 33, the signaling signal SS is read at a timing where the signalings of respective CHs coincide with the signaling formats shown in FIGS. 42 and 43 among the data formats used inside the card shown in FIGS. 40 and 41 and is inserted into TS0 in the transmission signal sent from the E1 interface unit 43 of FIG. 35, and by this, is transmitted to the internal bus of the card from the internal bus interface side transmission unit 52 in the internal bus interface unit 41.

Thereafter, the speech data passes through the speech compression panel→8 k rate data multiplexer panel→line interface panel mentioned later, while the signaling signal passes through the signaling multiplexer panel→8 k rate data multiplexer panel→line interface panel mentioned later. The two are multiplexed and pass through the dedicated line (transmission line) to be sent to the opposing similar time-division multiplexer (20). Further, A (B) and B (B) are converted to serial bits at the P/S converter 56 of FIG. 35, and then sent to the E1 interface unit 43 of FIG. 35, inserted into the transmission signal sent from the internal bus interface side reception unit 52 in the internal bus interface unit 41 of FIG. 33 here, recomposed to the E1 frames and multiframes, and transmitted to the repeater exchange II (23) of FIG. 35.

In actuality, the E1 interface unit 43 of FIG. 35 uses a reception unit having functions of detection of synchronization of the E1 frames and multiframes and an LSI device having a function of insertion of the signaling signals A (B) and B (B) into the transmission signal and a function of formatting to the E1 frames and the multiframes.

By such a device and hardware structure, mutual conversion among different kinds of signaling systems such as SS/SR signaling signals and T.6 signaling signals is possible and, at the same time, an incorporation of the package into a time-division multiplexer is possible, so a time-division multiplexer equipped with the function of converting among different kinds of signaling systems can be easily realized.

Figure 44:
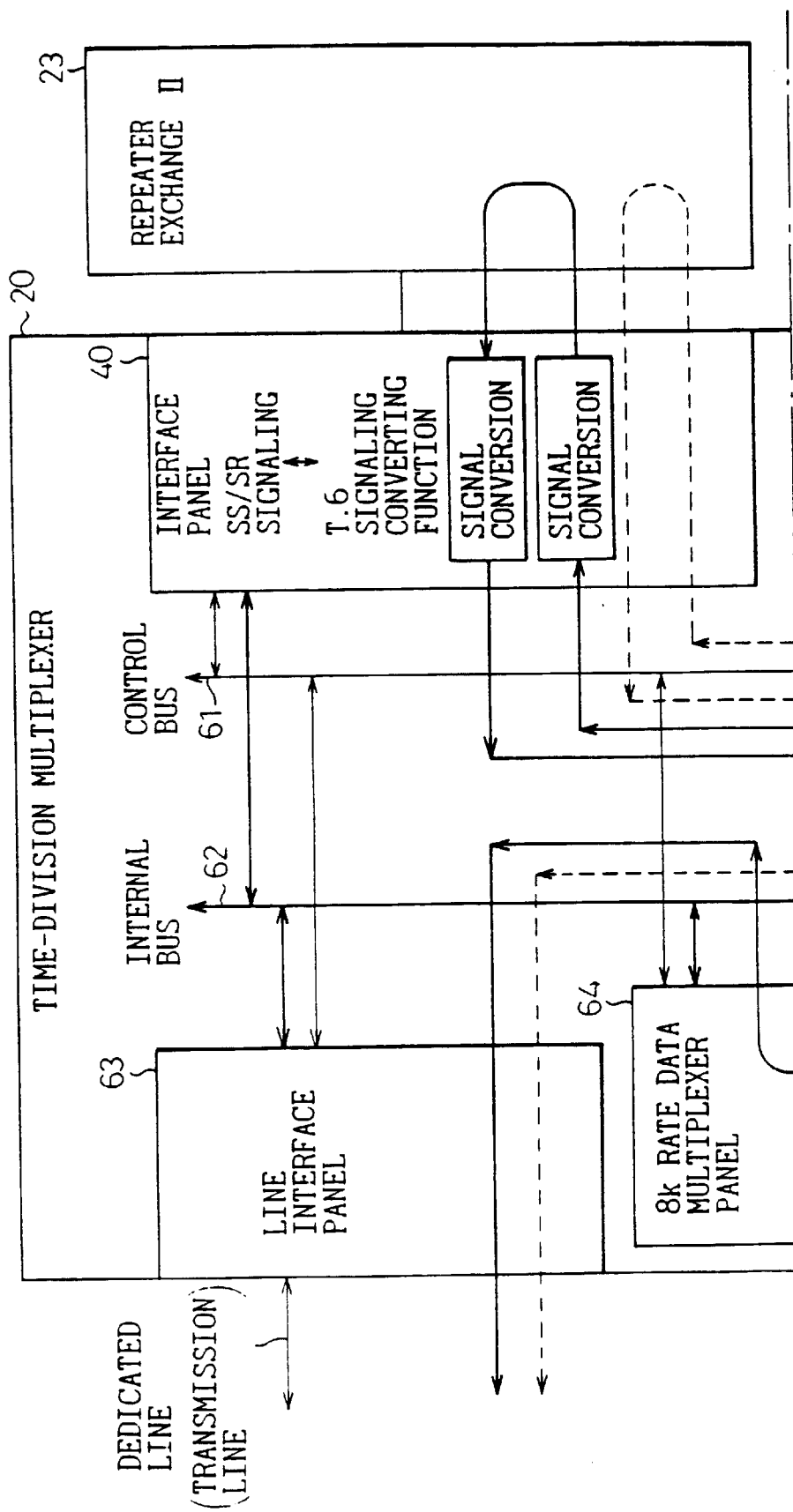
FIG. 44 is a first part of a view of a detailed example of the time-division multiplexer 20 according to the present invention.
Figure 45:
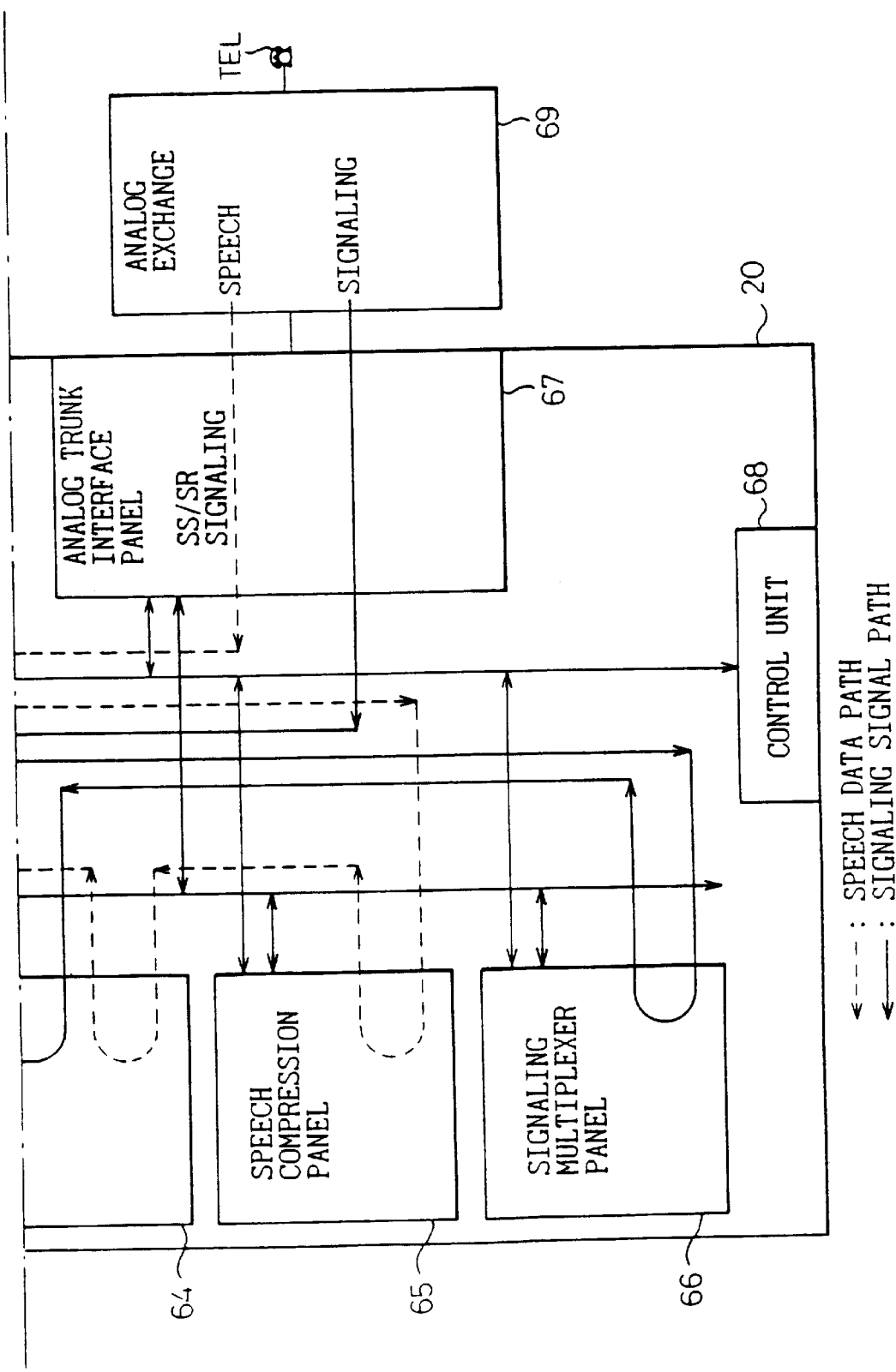
FIG. 45 is a second part of a view of a detailed example of the time-division multiplexer 20 according to the present invention.

FIG. 44 and FIG. 45 are parts of a view of a detailed example of the time-division multiplexer 20 according to the present invention.

In these figures, the interface panel 40 shown in detail in FIG. 33 to FIG. 35 is drawn at opposing position of the external exchange (repeater exchange II) 23 in FIG. 44.

First, a brief explanation will be made of each structural block appearing in FIGS. 44 and 45.

Control unit 68: A card for setting up the parameters of the cards and setting up the internal data paths according to various system startup data (set-up data) at the turning on of the power source and for supervising the state of the internal portion of the time-division multiplexer after the completion of the system startup.

Line interface panel 63: A card for terminating the frame for connection to the digital dedicated line such as BRI (I.430) and PRI (I.431) serviced by NTT in Japan and electric level (layer 1) and connecting this to the internal bus 62.

E1 interface panel 40: A card characterizing the present invention shown in FIGS. 34 and 35.

Speech compression panel 65: A card for compressing or decompressing 64 kbps of speech PCM data received from the exchange or analog interface panel to a 8 k rate data such as 32 kbps or 16 kbps in order to raise the multiplex efficiency of the dedicated lines.

Signaling multiplex panel 66: A card for multiplexing or demultiplexing only the signaling signal received from the E1 interface panel 40 or analog trunk interface panel 67 mentioned next to or from one time slot (TS) as the 8 k rate data.

Analog trunk interface panel 67: A card having an interface with the analog exchange 69 for performing the analog/digital conversion for the speech data and signaling signal and connecting this to the internal bus 62 in the time-division multiplexer 20. Note that, the signaling signal subjected to the analog/digital conversion is transmitted as the SS/SR signaling signal.

8 k data multiplex panel 64: A card for multiplexing or demultiplexing the 8 k rate data from the speech compression panel 65 or signaling multiplex panel 66 to or from one time slot (TS).

In FIGS. 44 and 45, the above E1 interface panel 40 is a card including the package 10 having a facility of mutually converting the SS/SR signaling signal and T.6 signaling signal explained heretofore as one embodiment. Other than this, in order to construct a speech handling network comprising the time-division multiplexer 20 and the exchange, in the time-division multiplexer 20, the above line interface panel 63, speech compression panel 65, analog trunk interface panel 67, signaling multiplex panel 66, 8 k rate data multiplex panel 64, control unit 68, etc. are mounted.

The line interface panel 63 performs the termination of the physical layer for connection to the dedicated line and performs the connection with the bus 62 inside the time-division multiplexer. The speech compression panel 65 compresses the PCM data of 64 kbps to an 8 k rate data such as 32 kbps or 16 kbps so as to raise the multiplex efficiency on the dedicated line.

The analog trunk interface panel 67 performs the connection termination with the analog exchange 69 as mentioned above, performs the analog/digital conversion, and performs the connection with the bus 62 inside the time-division multiplexer.

The signaling multiplex panel 66 performs the multiplexing or demultiplexing of the signaling signal of 400 Hz to or from the 8 k rate data format as mentioned above.

The 8 k rate data multiplex panel 64 performs the multiplexing or demultiplexing of the 8 k rate data as mentioned above.

The control unit 68 sets the conditions and monitors the state of these cards.

Inside the time-division multiplexer, there are an internal bus 62 and control bus 61. From which time slot of the internal bus 62 each card performs the transmission and reception of the data is set from the control unit 68 via the control bus 62. By this setting, each card is connected via the internal bus 62, and the speech data path and signaling signal path described in the lowermost part of FIG. 45 are formed.

According to the present invention, a speech handling network of a new type can be constructed. Namely, this is the speech handling network of the type shown in FIG. 3.

Figure 46:
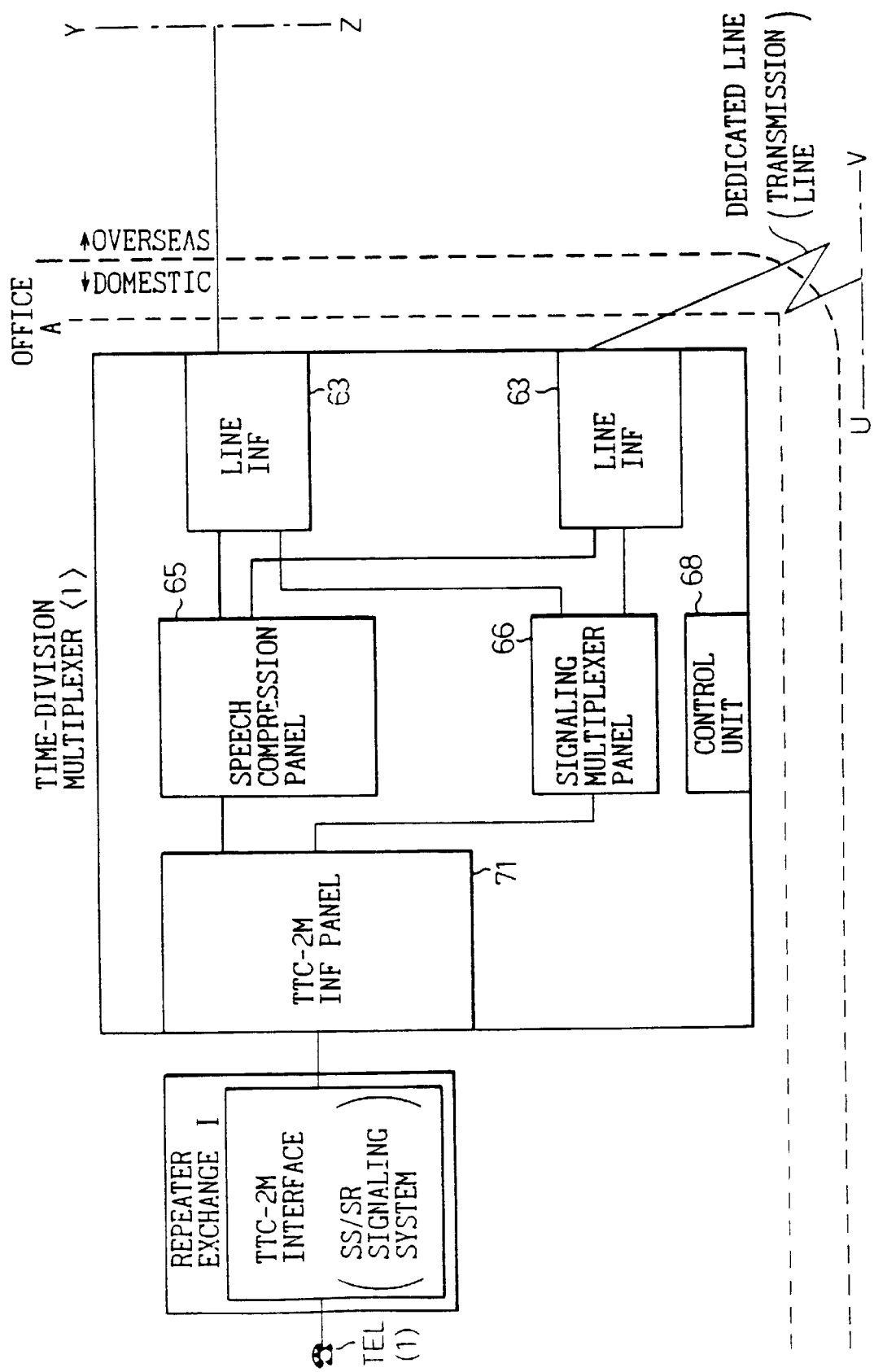
FIG. 46 is a first part of a view of an example of the configuration of a speech handling network according to the present invention.
Figure 47:
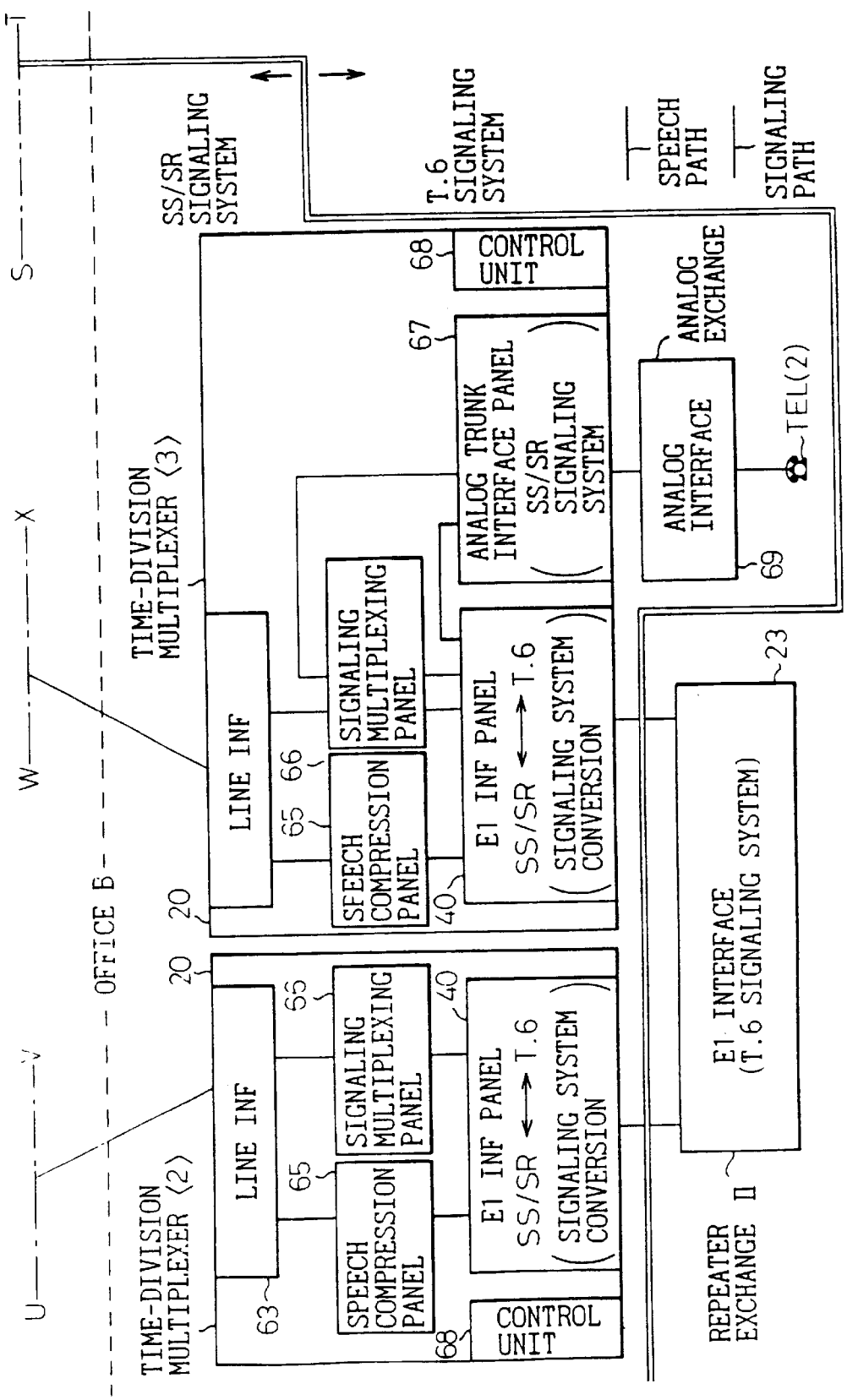
FIG. 47 is a second part of a view of an example of the configuration of a speech handling network according to the present invention.
Figure 48:
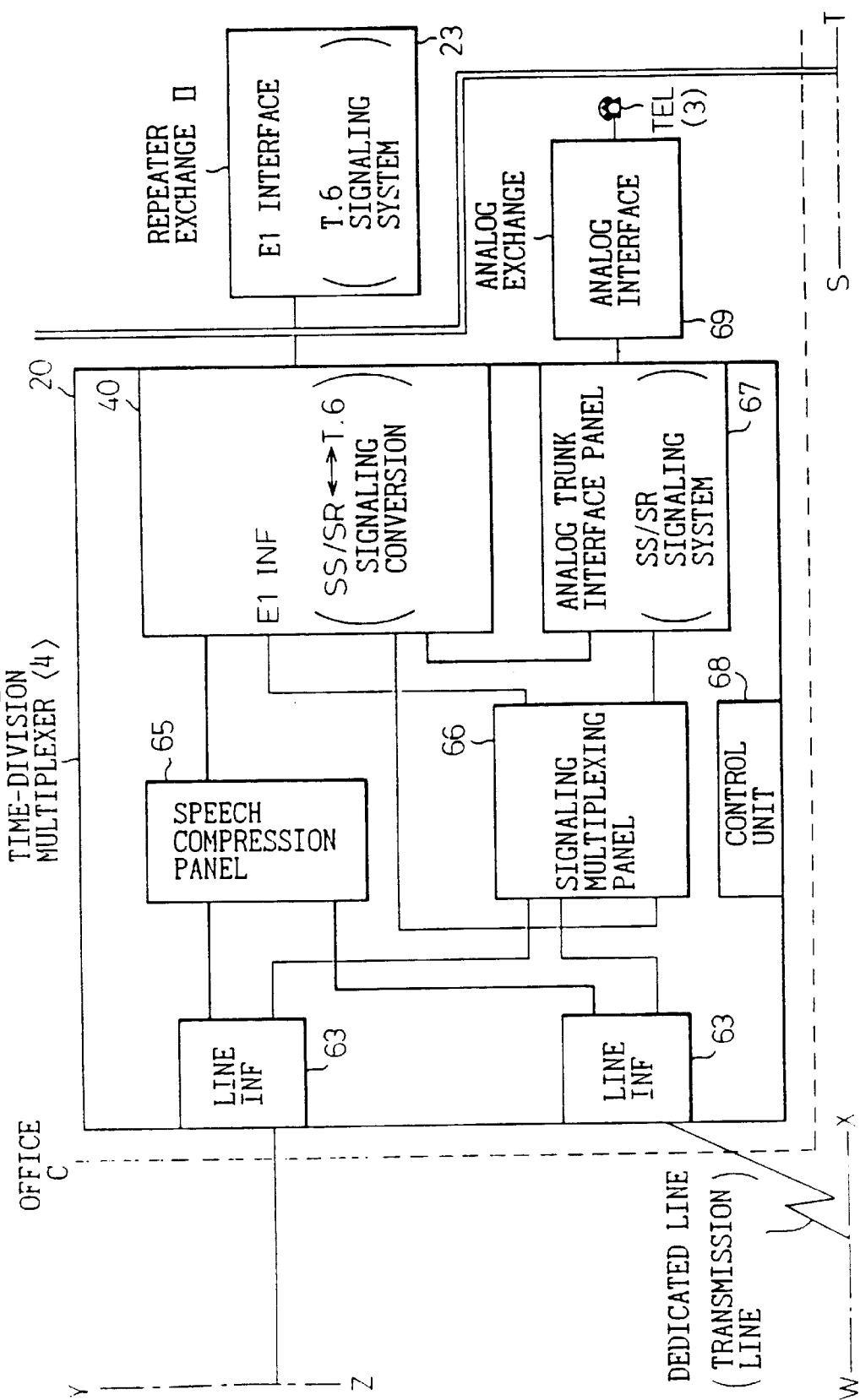
FIG. 48 is a third part of a view of an example of the configuration of a speech handling network according to the present invention.

FIG. 46, FIG. 47, and FIG. 48 are parts of a view showing an example of structure of the speech handling network according to the present invention.

The network shown in these figures basically corresponds to the conventional speech handling network shown in FIGS. 49, 50, and 51 mentioned first. Note that, in FIGS. 46 to 48, similar constituent elements to already mentioned constituent elements are indicated by the same reference numerals or symbols. The way of viewing these figures is the same as the way of viewing FIGS. 49 to 51.

An explanation has not been made of the TTC-2M interface panel 71 shown in FIG. 46, so it will be briefly explained here. This TTC-2M interface panel 71 is a card for terminating the TTC-2M digital interface of the Japanese standard prescribed by JJ-20.11 and JJ-20.12 and connecting the data from the exchange to the internal bus 62 of the time-division multiplexer 20. Further, when additionally explaining the already mentioned various exchanges, the analog exchange 69 performs the determination of the route, i.e., to which route the connection should be made according to the number plan set in advance by the dial number received from the intra-line side to which the telephone TEL is connected. Since this is analog, one physical port becomes necessary for one channel CH. Further, the repeater exchange I has a facility of performing the determination of route, i.e. to which channel CH of the TTC-2M interface (TTC: Telecommunications Technology Committee) should the connection be made according to the number plan set in advance by the dial number received from the intra-line side to which the telephone is connected and a repeater exchanging facility for connection from a certain channel CH of the TTC-2M interface to the other channel CH of the TTC-2M interface (not connected to the telephone set side) together. The repeater exchanges in Japan are generally formed by this specification and is defined as the repeater exchange I for discrimination from the overseas repeater exchange II having only the repeater exchange function. This repeater exchange II is an exchange setting up of the route, in the E1 interface, by connection from a certain channel CH to another channel CH by the received call number. The overseas repeater exchange cannot perform connection of the telephone set to the intra-line side and has only the repeater exchange function. As mentioned above, by the time-division multiplexer 20 having the facility of conversion among different signaling systems such as SS/SR signaling signals and T.6 signaling signals, in a speech handling network 30 comprising time-division multiplexers and exchanges, common use of the signaling between the exchange II controlled by the T.6 signaling signal and the exchange I controlled by the SS/SR signaling signal becomes possible, and a mixing of exchanges of different signaling systems can be easily realized.

Here, in FIGS. 46 to 48, the reason why the signal conversion as previously mentioned is always carried out for also the time-division multiplexers <3> and <4> opposing the repeater exchange II of the T.6 signaling system and only one bit of the SS/SR system is transmitted on the transmission line and the effect by this will be explained.

First, where the signaling signal is transmitted in the form of 2 bits in the section opposing the repeater exchange II of the T.6 signaling system like the above multiplexers <3> and <4> in FIGS. 46 to 48 without performing the conversion of the signaling signal, there is a defect that a larger band on the transmission line than that of the case where the signaling signal is transmitted in the form of one bit (SS/SR signaling system) becomes necessary, and the multiplex efficiency is lowered. Further, where the path is set in the device 20 from the control unit 68, there is a defect that excessive set-up information such as whether or not the conversion of the signaling signal is performed or whether the signaling is sent by 1 bit or 2 bits becomes necessary as the set-up of the E1 interface card. Accordingly, in order to solve these defects, the signaling signal is always converted from 2 bits in the T.6 signaling system to one bit in the SS/SR system and transmitted without regard as to the opposing signaling system even in a section where the repeater exchanges II of the T.6 signaling system oppose each other. By this, there is an advantage that also the transmission efficiency is enhanced in comparison with the case where 2 bits are sent in addition to the advantage that the path setting information of the time-division multiplexer 20 can be reduced.

As explained above, according to the present invention, by just mounting the package 10 in the time-division multiplexer 20, the mutual conversion between the T.6 signaling signal and the SS/SR signaling signal is easily realized, and even if exchanges of SS/SR signaling system and exchanges of the T.6 signaling system are mixed in the speech handling network 30, it becomes possible to easily perform the signaling control even between exchanges of these different kinds of signaling systems.

Thus, it becomes possible to easily cope with a case where the mixing of exchanges of different kinds of signaling systems can not be avoided, which is particularly liable to occur in an overseas network etc.

While the invention has been described with reference to specific embodiments chosen for purposes of illustration, it should be apparent that numerous modifications could be made thereto by those skilled in the art without departing from the basic concept and scope of the invention.

What is claimed is:

1. A package having a facility for mutual conversion among different kinds of signaling signals for performing mutual conversion between a first signaling signal and a second signaling signal, comprising:

a signaling signal converting means for outputting mutually converted both said first signaling signal and second signaling signal and outputting current state information based on a preceding state information represented by a preceding both first signaling signal and second signaling signal and current both first signaling signal and second signaling signal;

a signaling state holding means for holding said current state information up to a frame in which a next signaling signal appears; and a timer means started when detecting that current state information matching with predetermined state information appears and outputting a time-out signal after an elapse of a predetermined time;

said signaling signal converting means receiving as input said first signaling signal and second signaling signal which should be mutually converted, receiving said current state information held in said signaling state holding means as said preceding state information, and further receiving said time-out signal from said timer means and respectively outputting said mutually converted first and second signaling signals and said current state information in accordance with the combination of these received signals.

2. A package according to claim 1, wherein said signaling signal converting means comprises a ROM; and the ROM is a sequencer which receives as its inputs said input first signaling signal and second signaling signal which should be mutually converted, said time-out signal from said timer means, and said current state information held in said signaling state holding means as said preceding state information and reads and outputs said mutually converted first and second signaling signals and said current state information, corresponding to each state transition along a predetermined series of state transitions.

3. A package according to claim 1, wherein said signaling state holding means comprises a shift register; and the shift register feeds back said current state information to said signaling signal converting means as said preceding state information while holding the current state information until the frame containing said next signaling signal appears.

4. A package according to claim 1, wherein said timer means comprises:
 a state information detecting unit for detecting that current state information matching with said predetermined state information appears;
 a counter unit started when the state information detecting unit detects the appearance thereof; and
 a selector unit which applies a second logic in place of said time-out signal of a first logic to said signaling signal converting means in a fixed manner when said state information detecting unit does not detect the appearance thereof, and while applies said time-out signal of the first logic in place of the second logic to the signaling signal converting means when the state information detecting unit detects the appearance thereof.

5. A package according to claim 1, wherein said first signaling signal is a signaling signal having a 1-bit configuration; and said second signaling signal is a signaling signal of a 2-bit configuration.

6. A package according to claim 5, wherein said first signaling signal is a signaling signal used in an SS/SR signaling system; and said second signaling signal is a signaling signal used in a T.6 signaling system.

7. A time-division multiplexer having a facility for mutual conversion among different kinds of signaling signals integrally including a package performing the mutual conversion between a first signaling signal and second signaling signal, characterized in that:
 the package comprises
 a signaling signal converting means for outputting mutually converted both said first signaling and second signaling signal and outputting current state information based on preceding state information represented by a preceding both first signaling signal and second signaling signal and current both first signaling signal and second signaling signal;
 a signaling state holding means for holding said current state information up to the frame in which next signaling signal appears; and
 a timer means started when detecting that current state information matching with the predetermined state information appears and outputting a time-out signal after an elapse of a predetermined time;
 said signaling signal converting means is constituted so as to receive input said first signaling signal and second signaling signal which should be mutually converted, receive said current state information held in said signaling state holding means as said preceding state information, and further receive said time-out signal from said timer means and respectively output said mutually converted first and second signaling signals and said current state information in accordance with the combination of these received signals.

8. A time-division multiplexer according to claim 7 wherein:
 it has an interface panel for mounting said package; and
 the interface panel further mounts
 a signaling signal separation/insertion unit which separates said first signaling signal and second signaling signal from transmission signals on the transmission side and reception side transmitted via said time-division multiplexer and inputs the separated signals to said package and, at the same time, inserts the first and second signaling signals mutually converted in the package into each transmission signal,
 an internal bus interface unit connected to the internal bus provided in said time-division multiplexer for performing the transmission and reception control of said first signaling signal, and
 an exchange interface unit for performing the transmission and reception control of said second signaling signal with an external exchange.

9. A time-division multiplexer according to claim 8 wherein said first signaling signal is a signaling signal having a 1-bit configuration; and said second signaling signal is a signaling signal of a 2-bit configuration.

10. A time-division multiplexer according to claim 9 wherein: said first signaling signal is the signaling signal used in the SS/SR signaling system; and said second signaling signal is the signaling signal used in the T.6 signaling system.

11. A speech handling network comprising a first exchange which is equipped with a first time-division multiplexer and performs transmission/reception control by a first signaling signal, a second exchange which is equipped with a second time-division multiplexer and performs transmission/reception control by a second signaling signal, and a dedicated line connecting the first and second exchanges via the first and second time-division multiplexers, characterized in that:
 said second time-division multiplexer merely integrally includes a package for performing mutual conversion between said first signaling signal and said second signaling signal while avoiding an insertion of a converter between said second exchange and said second time-division multiplexer without changing a connection relationship of a relay line; and only the transmission signals controlled by the first signaling signal are transferred on said dedicated line,
 said package comprising:
 a signaling signal converting means for outputting mutually converted both said first signaling signal and second signaling signal and outputting current state information based on a preceding state information represented by a preceding both first signaling signal and second signaling signal and current both first signaling signal and second signaling signal;
 a signaling state holding means for holding said current state information up to a frame in which a next signaling signal appears; and
 a timer means started when detecting that current state information matching with predetermined state information appears and outputting a time-out signal after an elapse of a predetermined time;
 said signaling signal converting means receiving as input said first signaling signal and second signaling signal which should be mutually converted, receiving said current state information held in said signaling state holding means as said preceding state information, and further receiving said time-out signal from said timer means and respectively outputting said mutually converted first and second signaling signals and said current state information in accordance with the combination of these received signals.

12. A speech handling network according to claim 11, wherein said first signaling signal is a signaling signal having a 1-bit configuration; and said second signaling signal is a signaling signal of a 2-bit configuration.

13. A speech handling network according to claim 12, wherein said first signaling signal is a signaling signal used in an SS/SR signaling system; and said second signaling signal is a signaling signal used in a T.6 signaling system.

* * * * *